(12) United States Patent
Kanai et al.

(10) Patent No.: US 9,317,681 B2
(45) Date of Patent: Apr. 19, 2016

(54) INFORMATION PROCESSING APPARATUS, INFORMATION PROCESSING METHOD, AND COMPUTER PROGRAM PRODUCT

(75) Inventors: Jun Kanai, Tokyo (JP); Hiroshi Isozaki, Kanagawa (JP); Ryuiti Koike, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 920 days.

(21) Appl. No.: 13/533,077

(22) Filed: Jun. 26, 2012

(65) Prior Publication Data
US 2013/0055340 A1 Feb. 28, 2013

(30) Foreign Application Priority Data
Aug. 26, 2011 (JP) ................................. 2011-184767

(51) Int. Cl.
*G06F 7/04* (2006.01)
*G06F 21/53* (2013.01)
*G06F 21/54* (2013.01)
*H04L 29/06* (2006.01)

(52) U.S. Cl.
CPC .............. *G06F 21/53* (2013.01); *G06F 21/54* (2013.01); *H04L 63/20* (2013.01)

(58) Field of Classification Search
CPC .......... H04L 63/20; G06F 21/53; G06F 21/54
USPC .................................................. 726/1, 2, 27
See application file for complete search history.

(56) References Cited

U.S. PATENT DOCUMENTS 7,836,188 B1* 11/2010 Dodrill et al. ................. 709/227
8,813,174 B1* 8/2014 Koeten et al. ..................... 726/1
2004/0139349 A1* 7/2004 Henn et al. ..................... 713/201
2005/0262345 A1* 11/2005 Moreau ......................... 713/173
2007/0044095 A1* 2/2007 Banerjee ....................... 717/176
2007/0174424 A1* 7/2007 Chen et al. .................... 709/217
2009/0100518 A1* 4/2009 Overcash ........................ 726/22
2009/0138592 A1* 5/2009 Overcash et al. ............. 709/224
2009/0177972 A1 7/2009 Dasari et al.
2009/0210925 A1* 8/2009 Ogata ............................. 726/2
2009/0293102 A1* 11/2009 Klein et al. ...................... 726/2
2010/0250903 A1* 9/2010 Jensen .......................... 712/220
2012/0005600 A1* 1/2012 Ito ................................. 715/760

OTHER PUBLICATIONS http://dev.w3.org/html5/spec/Overview.html; W3C HTML5.
OMTP BONDI Architecture & Security Requirements, http://www.omtp.org/1.11/security/BONDI_Architecure_and-Security_v1.1.pdf.

* cited by examiner

*Primary Examiner* — Saleh Najjar
*Assistant Examiner* — Peiliang Pan
(74) *Attorney, Agent, or Firm* — Amin, Turocy & Watson LLP; Gregory Turocy

(57) ABSTRACT

According to an aspect of the embodiment, an information processing unit includes a browser unit that receives page files and execute a web application; an application range management unit that receives application range information at the start of execution of the web application, and stores that information in a memory unit; a termination detecting unit that, when the page file being processed by the browser unit changes, determines whether or not the web application being executed has terminated depending on whether or not the new page file is included in the application range information; a usability determining unit that determines whether or not an add-on for which a call request is issued is allowed to be used in the web application being executed; and an add-on calling unit that calls an add-on when determined that the add-on is allowed to be used in the web application being executed.

13 Claims, 42 Drawing Sheets

| ADD-ON IDENTIFIER | FUNCTION NAME | INITIAL STORING ADDRESS |
|---|---|---|
| video/dlna-player | play | 12345 |
| video/dlna-player | stop | 23456 |
| video/dlna-player | forward | 34567 |
| video/dlna-player | getfilelist | 45678 |
| application/file-manager | getfilelist | 56789 |
| application/file-manager | removefile | 67890 |
| ⋮ | ⋮ | ⋮ |

FIG.5A

| |
|---|
| PAGE DISPLAY INFORMATION/ ARRANGEMENT INFORMATION |
| APPLICATION CONFIGURATION INFORMATION START IDENTIFIER |
| LOCATION IDENTIFIER INFORMATION START IDENTIFIER |
| LOCATION IDENTIFIER (URL) 1 |
| LOCATION IDENTIFIER (URL) 2 |
| ⋮ |
| LOCATION IDENTIFIER (URL) n |
| LOCATION IDENTIFIER INFORMATION END IDENTIFIER |
| ADD-ON USAGE CERTIFICATE START IDENTIFIER |
| USAGE CERTIFICATE 1 START IDENTIFIER |
| TARGET ADD-ON IDENTIFIER FOR USAGE CERTIFICATE 1 |
| USAGE CERTIFICATE 1 END IDENTIFIER |
| USAGE CERTIFICATE 2 START IDENTIFIER |
| ⋮ |
| USAGE CERTIFICATE n END IDENTIFIER |
| ADD-ON USAGE CERTIFICATE END IDENTIFIER |
| APPLICATION CONFIGURATION INFORMATION END IDENTIFIER |
| PAGE DISPLAY INFORMATION/ ARRANGEMENT INFORMATION |

FIG.5B

| PAGE DISPLAY INFORMATION/ARRANGEMENT INFORMATION |
|---|
| <appinfo> |
|   <url_list> |
|     http://hoge.com/index.html |
|     http://hoge.com/page/contents.html |
|     ⋮ |
|     http://foo.com/ad.html |
|   </url_list> |
|   <cert_list> |
|     <cert_elem> |
|       <plugin mimetype="video/dlna-player" /> |
|     </cert_elem> |
|     <cert_elem> |
|     ⋮ |
|     </cert_elem> |
|   </cert_list> |
| </appinfo> |
| PAGE DISPLAY INFORMATION/ARRANGEMENT INFORMATION |

FIG.12

| |
|---|
| APPLICATION CONFIGURATION INFORMATION START IDENTIFIER |
| LOCATION IDENTIFIER INFORMATION START IDENTIFIER |
| LOCATION IDENTIFIER (URL) 1 |
| LOCATION IDENTIFIER (URL) 2 |
| ⋮ |
| LOCATION IDENTIFIER (URL) n |
| LOCATION IDENTIFIER INFORMATION END IDENTIFIER |
| ADD-ON USAGE CERTIFICATE START IDENTIFIER |
| USAGE CERTIFICATE 1 START IDENTIFIER |
| TARGET ADD-ON IDENTIFIER FOR USAGE CERTIFICATE 1 |
| USAGE CERTIFICATE 1 END IDENTIFIER |
| USAGE CERTIFICATE 2 START IDENTIFIER |
| ⋮ |
| USAGE CERTIFICATE n END IDENTIFIER |
| ADD-ON USAGE CERTIFICATE END IDENTIFIER |
| TRANSITION-DESTINATION PAGE FILE LOCATION IDENTIFIER |
| APPLICATION CONFIGURATION INFORMATION END IDENTIFIER |

FIG.17A

| |
|---|
| ADD-ON IDENTIFIER |
| SECURITY POLICY ELEMENT 1 IDENTIFIER |
| CALLABLE FUNCTION NAME 1 |
| CALLABLE FUNCTION NAME 2 |
| ⋮ |
| CALLABLE FUNCTION NAME x1 |
| SECURITY POLICY ELEMENT 1 END IDENTIFIER |
| SECURITY POLICY ELEMENT 2 IDENTIFIER |
| CALLABLE FUNCTION NAME 1 |
| CALLABLE FUNCTION NAME 2 |
| ⋮ |
| CALLABLE FUNCTION NAME x2 |
| SECURITY POLICY ELEMENT 2 END IDENTIFIER |
| ⋮ |
| SECURITY POLICY ELEMENT n IDENTIFIER |
| CALLABLE FUNCTION NAME 1 |
| CALLABLE FUNCTION NAME 2 |
| ⋮ |
| CALLABLE FUNCTION NAME x3 |
| SECURITY POLICY ELEMENT n END IDENTIFIER |

FIG.17B

| |
|---|
| `<plugin mimetype="video/dlna-player">` |
| `<policy_elem name="dlna-player-policy1">` |
| hoge |
| foo |
| ⋮ |
| bar |
| `</policy_elem>` |
| `<policy_elem name="dlna-player-policy2">` |
| hoge |
| ⋮ |
| bar2 |
| `</policy_elem>` |
| ⋮ |
| `<policy_elem name="dlna-player-policyn">` |
| hoge |
| ⋮ |
| foo2 |
| `</policy_elem>` |

FIG.18A

| |
|---|
| PAGE DISPLAY INFORMATION/ ARRANGEMENT INFORMATION |
| APPLICATION CONFIGURATION INFORMATION START IDENTIFIER |
| LOCATION IDENTIFIER INFORMATION START IDENTIFIER |
| LOCATION IDENTIFIER (URL) 1 |
| LOCATION IDENTIFIER (URL) 2 |
| ⋮ |
| LOCATION IDENTIFIER (URL) n |
| LOCATION IDENTIFIER INFORMATION END IDENTIFIER |
| ADD-ON USAGE CERTIFICATE START IDENTIFIER |
| USAGE CERTIFICATE 1 START IDENTIFIER |
| TARGET ADD-ON IDENTIFIER FOR USAGE CERTIFICATE 1 |
| IDENTIFIER OF SECURITY POLICY ELEMENT IMPLEMENTED TO USAGE CERTIFICATE |
| USAGE CERTIFICATE 1 END IDENTIFIER |
| USAGE CERTIFICATE 2 START IDENTIFIER |
| ⋮ |
| USAGE CERTIFICATE n END IDENTIFIER |
| ADD-ON USAGE CERTIFICATE END IDENTIFIER |
| APPLICATION CONFIGURATION INFORMATION END IDENTIFIER |
| PAGE DISPLAY INFORMATION/ ARRANGEMENT INFORMATION |

FIG.18B

| PAGE DISPLAY INFORMATION/ARRANGEMENT INFORMATION |
|---|
| <appinfo> |
|   <url_list> |
|     http://hoge.com/index.html |
|     http://hoge.com/page/contents.html |
|     ⋮ |
|     http://foo.com/ad.html |
|   </url_list> |
|   <cert_list> |
|     <cert_elem> |
|       <plugin mimetype="video/dlna-player" /> |
|       <policy_elem name="dlna-player-policy2"> |
|     </cert_elem> |
|     <cert_elem> |
|     ⋮ |
|     </cert_elem> |
|   </cert_list> |
| </appinfo> |
| PAGE DISPLAY INFORMATION/ARRANGEMENT INFORMATION |

FIG.24

| |
|---|
| ADD-ON IDENTIFIER |
| CERTIFICATE VERIFICATION PUBLIC KEY |
| SECURITY POLICY ELEMENT 1 IDENTIFIER |
| CALLABLE FUNCTION NAME 1 |
| CALLABLE FUNCTION NAME 2 |
| ⋮ |
| CALLABLE FUNCTION NAME x1 |
| SECURITY POLICY ELEMENT 1 END IDENTIFIER |
| SECURITY POLICY ELEMENT 2 IDENTIFIER |
| CALLABLE FUNCTION NAME 1 |
| CALLABLE FUNCTION NAME 2 |
| ⋮ |
| CALLABLE FUNCTION NAME x2 |
| SECURITY POLICY ELEMENT 2 END IDENTIFIER |
| ⋮ |
| SECURITY POLICY ELEMENT n IDENTIFIER |
| CALLABLE FUNCTION NAME 1 |
| CALLABLE FUNCTION NAME 2 |
| ⋮ |
| CALLABLE FUNCTION NAME x3 |
| SECURITY POLICY ELEMENT n END IDENTIFIER |

FIG.25

| |
|---|
| PAGE DISPLAY INFORMATION/ARRANGEMENT INFORMATION |
| APPLICATION CONFIGURATION INFORMATION START IDENTIFIER |
| LOCATION IDENTIFIER INFORMATION START IDENTIFIER |
| LOCATION IDENTIFIER (URL) 1 |
| LOCATION IDENTIFIER (URL) 2 |
| ⋮ |
| LOCATION IDENTIFIER (URL) n |
| LOCATION IDENTIFIER INFORMATION END IDENTIFIER |
| ADD-ON USAGE CERTIFICATE START IDENTIFIER |
| USAGE CERTIFICATE 1 START IDENTIFIER |
| TARGET ADD-ON IDENTIFIER FOR USAGE CERTIFICATE 1 |
| IDENTIFIER OF SECURITY POLICY ELEMENT IMPLEMENTED TO USAGE CERTIFICATE |
| USAGE CERTIFICATE 1 VERIFICATION DATA |
| USAGE CERTIFICATE 1 END IDENTIFIER |
| USAGE CERTIFICATE 2 START IDENTIFIER |
| ⋮ |
| USAGE CERTIFICATE n END IDENTIFIER |
| ADD-ON USAGE CERTIFICATE END IDENTIFIER |
| APPLICATION CONFIGURATION INFORMATION END IDENTIFIER |
| PAGE DISPLAY INFORMATION/ARRANGEMENT INFORMATION |

FIG.38

| |
|---|
| ADD-ON IDENTIFIER |
| SECURITY POLICY ELEMENT 1 IDENTIFIER |
| TARGET APPLICATION-SPECIFIC DATA |
| CALLABLE FUNCTION NAME 1 |
| CALLABLE FUNCTION NAME 2 |
| ⋮ |
| CALLABLE FUNCTION NAME x1 |
| SECURITY POLICY ELEMENT 1 END IDENTIFIER |
| SECURITY POLICY ELEMENT 2 IDENTIFIER |
| TARGET APPLICATION-SPECIFIC DATA |
| CALLABLE FUNCTION NAME 1 |
| CALLABLE FUNCTION NAME 2 |
| ⋮ |
| CALLABLE FUNCTION NAME x2 |
| SECURITY POLICY ELEMENT 2 END IDENTIFIER |
| ⋮ |
| SECURITY POLICY ELEMENT n IDENTIFIER |
| TARGET APPLICATION-SPECIFIC DATA |
| CALLABLE FUNCTION NAME 1 |
| CALLABLE FUNCTION NAME 2 |
| ⋮ |
| CALLABLE FUNCTION NAME x3 |
| SECURITY POLICY ELEMENT n END IDENTIFIER |

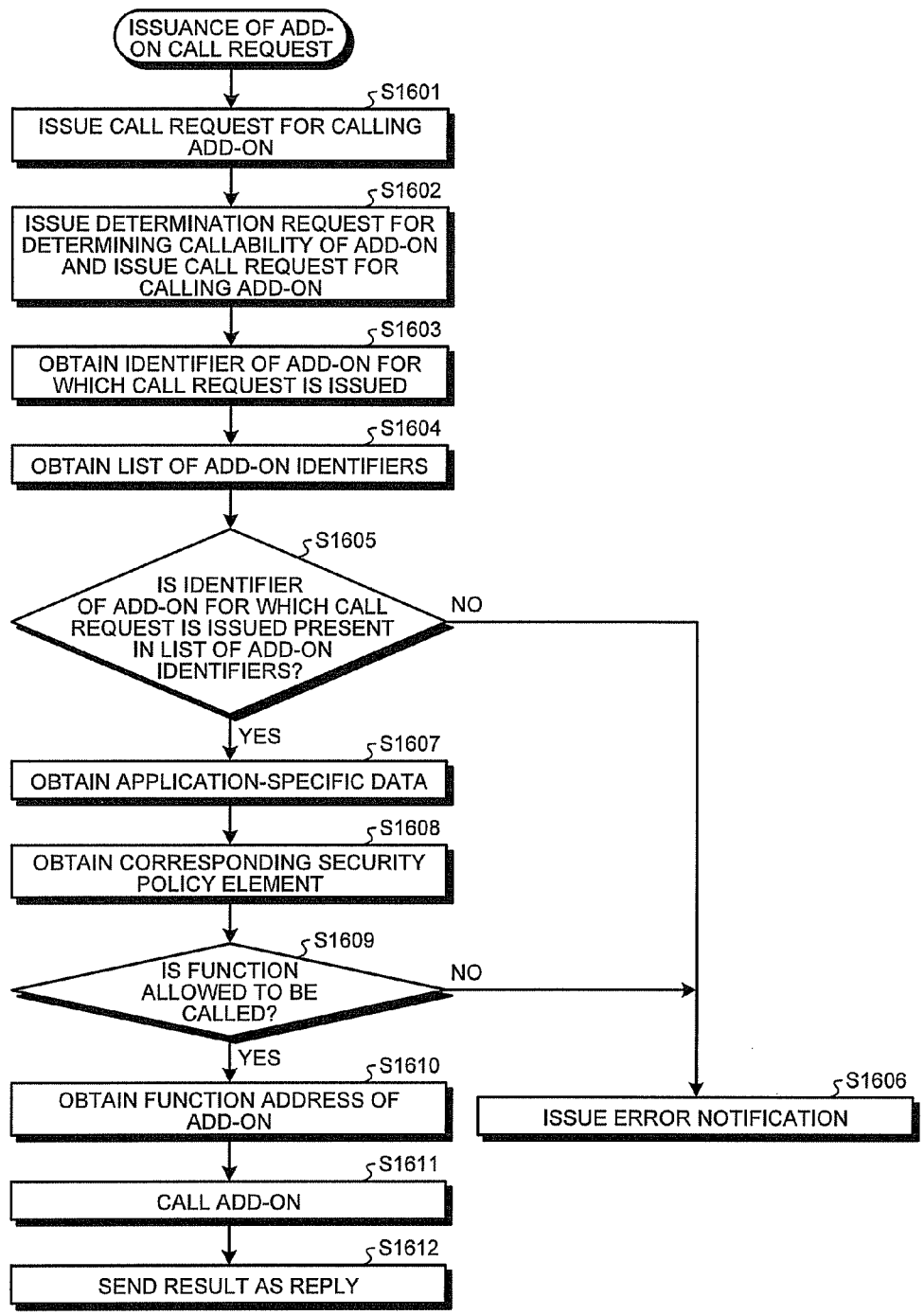

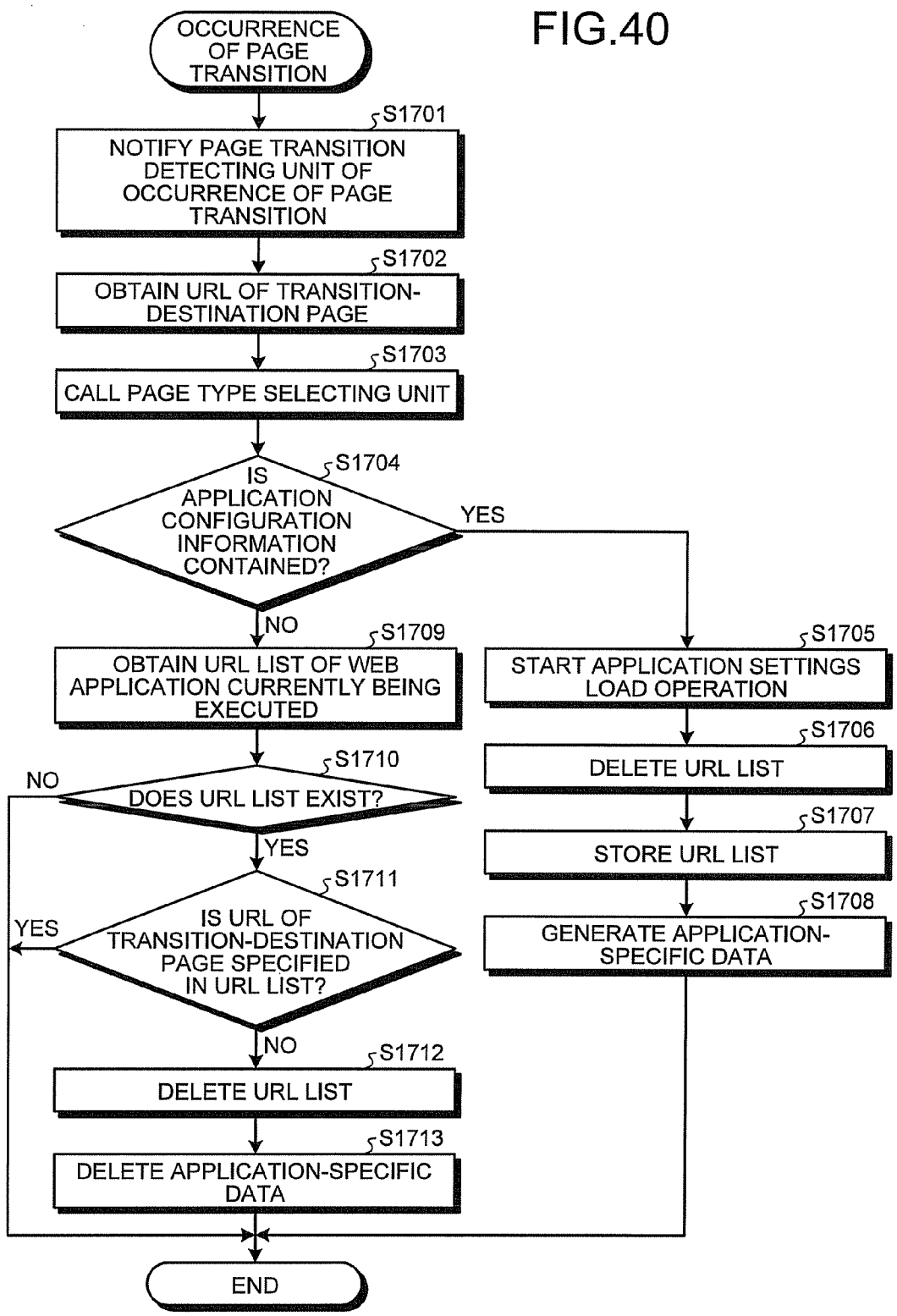

INFORMATION PROCESSING APPARATUS, INFORMATION PROCESSING METHOD, AND COMPUTER PROGRAM PRODUCT

CROSS-REFERENCE TO RELATED APPLICATION(S)

This application is based upon and claims the benefit of priority from Japanese Patent Application No. 2011-184767, filed on Aug. 26, 2011; the entire contents of which are incorporated herein by reference.

FIELD

Embodiments described herein relate generally to an information processing apparatus, an information processing method, and a computer program product.

BACKGROUND

In recent years, it is becoming common practice to write client applications of rich quality (i.e., web applications) with the use of web markup languages such as the hypertext markup language (HTML) or the Java (registered trademark) Script. A web application points to an application software that performs communication of computer programs or data via a network. Even when an application is configured to be executable for a lone client, as long as it is possible to communicate some or all of the computer programs and data of that application via a network, the application is called a web application. With such technology advancement, the applications executed in information processing apparatuses such as digital televisions, slate computers, or smartphones are also written in the form of web applications. For example, in Internet protocol televisions (IPTVs) that are a type of digital televisions, standards have already been developed for displaying menu screens or video replay screens with the use of the web application technology.

A web application is executed in a browser-based runtime environment that is capable of interpreting the HTML or the Java (registered trademark) Script. Generally, a web application is made of a plurality of page files and media files. A media file points to a file for storing dynamic image data in the JPEG format (JPEG stands for Joint Photographic Experts Group), the GIF (which stands for graphics interface format), the MPEG format (MPEG stands for Moving Picture Experts Group), or the like; or points to a file for storing audio data in the MP3 format (MP3 stands for MPEG-1 Audio Layer 3) or the like. A page file points to a file that contains description regarding sentence structures, screen display methods, or screen transitions. More particularly, a page file contains page display information such as display character string data, contains text decoration information such as colors or size of characters, and contains arrangement information indicating the arrangement of images. Besides, a page file may also store therein control programs written in the Java (registered trademark) Script. However, alternatively, the control programs written in the Java (registered trademark) Script may also be provided as independent files.

In the arrangement information specified in a page file, there is a button (link) provided to enable display and running of another page file. The link contains the URL information of that other page file. During the execution of a web application, if that button is selected in response to a user request, then the browser issues a download request regarding a new page corresponding to that button. As soon as the necessary files including media files to be used in that new page file are ready, the browser starts to display and run the new page file. The new page file that is displayed and run may belong to the same application to which the previously displayed and run page file belonged, or may belong to a different web application.

When a new file is displayed and run, it is often easy for the human eye to identify whether or not the previous web application has changed to a different web application. However, as far as the browser operations are concerned, there is no difference between running page files of the same application and running page files of a different web application. Hence, it is difficult to mechanically detect a switchover among web applications.

Meanwhile, functions that cannot be achieved using only the specifications of the HTML or the Java (registered trademark) Script can be implemented as software. In that case, the software components that are made available for use from the HTML or the Java (registered trademark) Script are called extended add-ons or plug-ins. In web applications, it is now common practice to make use of add-ons. The basic functions of a browser include, for example, a simple image display function or a simple character display function, a character string handling function, and a numerical processing function. However, as basic functions, the browser is not equipped with functions such as a video replay function and a local file access function compliant to the digital living network alliance (DLNA) standard, or not equipped with functions such as a channel switching function and a volume changing function for digital televisions. Thus, only the abovementioned basic functions of a browser lead to narrowing of the scope of potential applications. For that reason, in digital televisions, functions that cannot be achieved with the basic functions of a browser are implemented in the form of add-ons; and such add-ons are made callable from the HTML or the Java (registered trademark) Script. A prominent example of an add-on is Flash Player offered by Adobe Systems.

Add-ons are often written in, what is called, the native code; and also have a high degree of freedom as far as the implementable functions are concerned. Hence, for security reasons, there often arises a need to limit the applications in which a particular add-on is to be used. More particularly, in the case of providing the local file access function as an add-on, it carries a risk of leakage of the user information or deletion/tampering of local files. Thus, the local file access function needs to be made available only in specific web applications that have a limited runtime environment.

However, as described above, until now, it has been difficult to mechanically detect a switchover among web applications. As a result, it is difficult to implement separate security policies for separate web applications. For example, it is difficult to limit the usable add-ons in units of web applications.

BRIEF DESCRIPTION OF THE DRAWINGS

FIG. 5A is a diagram illustrating an exemplary data structure of application configuration information according to the first embodiment;

FIG. 5B is a diagram illustrating an example of the application configuration information according to the first embodiment;

FIG. 12 is a diagram illustrating an exemplary data structure of a configuration file according to the second embodiment;

FIG. 17A is a diagram illustrating an exemplary data structure of a security policy according to the third embodiment;

FIG. 17B is a diagram illustrating an exemplary security policy file according to the third embodiment;

FIG. 18A is a diagram illustrating an exemplary data structure of application configuration information according to the third embodiment;

FIG. 18B is a diagram illustrating an example of the application configuration information according to the third embodiment;

FIG. 24 is a diagram illustrating an exemplary data structure of a security policy according to the fourth embodiment;

FIG. 25 is a diagram illustrating an exemplary data structure of application configuration information according to the fourth embodiment;

FIG. 38 is a diagram illustrating an exemplary data structure of a security policy according to the eighth embodiment;

FIG. 39 is a flowchart for explaining a sequence of operations performed at the time of calling an add-on according to the eighth embodiment; and FIG. 40 is a flowchart for explaining a sequence of operations performed at the time of page transition according to the eighth embodiment.

DETAILED DESCRIPTION

In an embodiment, an information processing apparatus includes a browser unit, an application range management unit, a termination detecting unit, a usability determining unit, and an add-on calling unit. The browser unit is configured to receive, from the server device, page files included in a web application and executes the web application by processing the received page files. The application range management unit is configured to, at the time of starting execution of the web application, receive application range information representing the page files included in the web application and stores the application range information in a memory unit. The termination detecting unit is configured to, when there is a change of the page file being processed by the browser unit, determine whether or not the web application being executed has terminated depending on whether or not the page file after the change is included in the application range information. The usability determining unit is configured to, when a call request is issued for an add-on that represents a function not processed by the browser unit, determine whether or not the add-on for which the call request is issued is allowed to be used in the web application being executed. The add-on calling unit is configured to, when it is determined that the add-on for which the call request is issued is allowed to be used in the web application being executed, call the add-on.

Exemplary embodiments of an information processing apparatus, an information processing method, and a computer program product are explained below in detail with reference to the accompanying drawings.

First Embodiment

Figure 1:
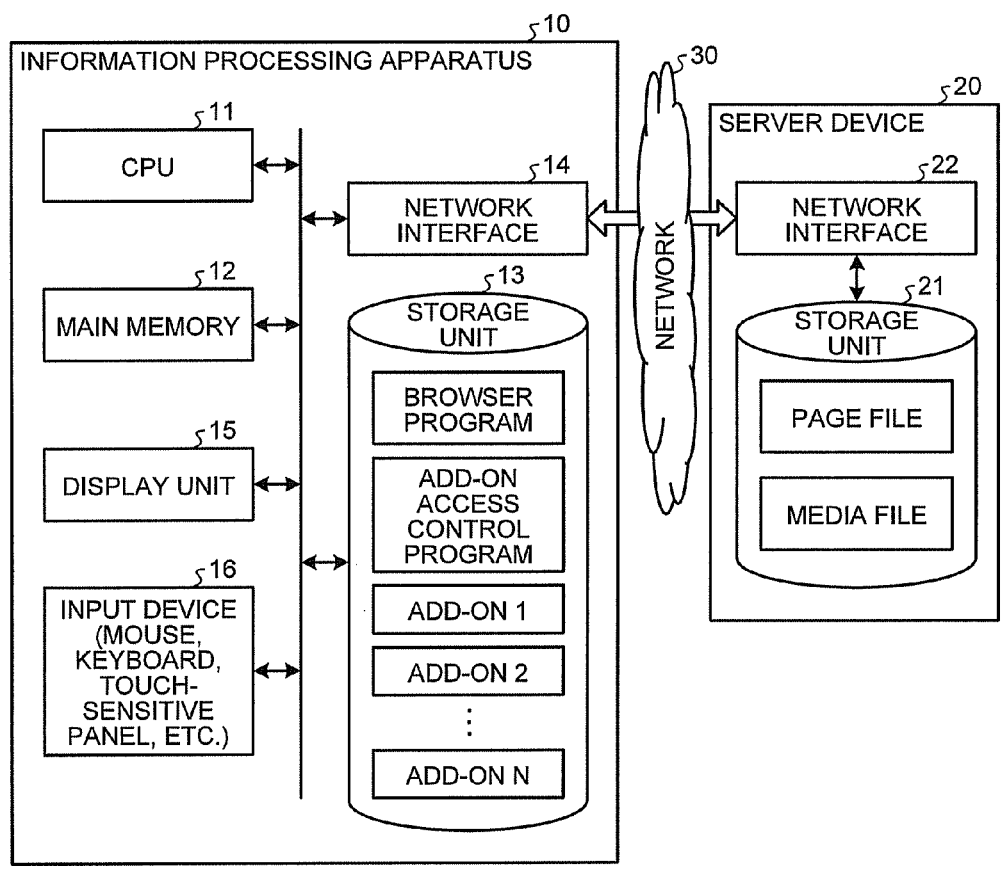
FIG. 1 is a hardware configuration diagram of an information processing system according to a first embodiment.

FIG. 1 is a hardware configuration diagram of an information processing system that includes an information processing apparatus 10 according to the first embodiment. The information processing system illustrated in FIG. 1 includes the information processing apparatus 10 and a server device 20. Herein, the server device 20 provides web applications to the information processing apparatus 10, which serves as the client. The information processing apparatus 10 receives various files required for executing web applications, and executes the web applications. The information processing apparatus 10 and the server device 20 are connected via a network 30 such as the Internet. A web application points to an application software that performs communication of computer programs or data via a network. Even when an application is executable for a lone client, as long as it is possible to communicate some or all of the computer programs and data of that application via a network, the application is called a web application.

As the major hardware configuration, the information processing apparatus 10 includes a central processing unit (CPU) 11, a main memory 12, a storage unit 13, a network interface 14, a display unit 15, and an input device 16. The storage unit 13 is used in storing a browser program, an add-on access control program, and various add-on programs (hereinafter, simply referred to as "add-ons"). The input device 16 is, for example, a mouse, a keyboard, or a touch-sensitive panel.

As the major hardware configuration, the server device 20 includes a storage unit 21 and a network interface 22. The storage unit 21 stores therein page files and media files included in web applications. A page file points to a file containing information required for configuring pages. For example, a page file contains description regarding sentence structures, screen display methods, or screen transitions as the information required for configuring pages. The location of a page files or a media file (i.e., the location of the server device 20 and the location inside the server device 20) is identified with a location identifier called a URL. The information processing apparatus 10 and the server device 20 make use of the network interfaces 14 and 22, respectively, and communicate information with each other via the network 30.

While executing a web application provided by the server device 20, the information processing apparatus 10 firstly runs, as a lead-up, a browser program representing the runtime environment of that web application. More particularly, in response to a user request, a shell program such as the operating system (OS) that is being run by the CPU 11 reads the browser program from the storage unit 13 and stores it in the main memory 12. Then, the CPU 11 runs the browser program that has been stored in the main memory 12. At that time, from the storage unit 13, the CPU reads various add-ons (plug-ins) written as separate computer programs different than the browser program and stores the add-ons in the main memory 12.

The execution of a web application starts when the URL of a page file included in that web application is specified by the user or specified from within a computer program. At that time, the CPU 11 issues a get instruction to the network interface 14 for obtaining the page file identified with the specified URL. Then, the network interface 14 connects with the server device 20, which is identified with the specified URL, and issues a download instruction for downloading the page file identified with the specified URL. In response to the download instruction, the network interface 22 of the server device 20 reads the corresponding page file from the storage unit 21 and sends it to the information processing apparatus 10 serving as the client. Then, the network interface 14 of the information processing apparatus 10 stores the page file, which has been obtained from the server device 20, in the main memory 12. The page file contains a list of URLs of the media files to be used in that page file. In an identical manner to the case of obtaining the page file, the CPU 11 issues a get instruction to the network interface 14 for obtaining those media files. Accordingly, the network interface 14 issues a download instruction to the server device 20 for downloading those media files. In response to the download instruction, the media files are read from the storage unit 21 of the server device 20 and sent to the information processing apparatus 10. Then, the media files are stored in the main memory 12 or the storage unit 13.

As soon as the necessary files for execution of the web application are ready, the browser program converts the page file, which is stored in the main memory 12, into an instruction that is interpretable by the CPU 11. Then, the CPU 11 executes that instruction. The execution result is output to the display unit 15 according to the arrangement information specified in the page file.

The arrangement information contains a link that enables transition to another page file. That link is associated with the URL of the transition-destination page file. When that link is selected by a user operation, the CPU 11 issues a get instruction to the network interface 14 for obtaining the page file identified with the URL that is associated with the selected link. Then, in an identical manner to the description given above, the page file identified with that URL as well as the media files to be used in that page file are obtained from the server device 20; and as soon as the necessary files are ready, the display and running of the new page file is started.

Figure 2A:
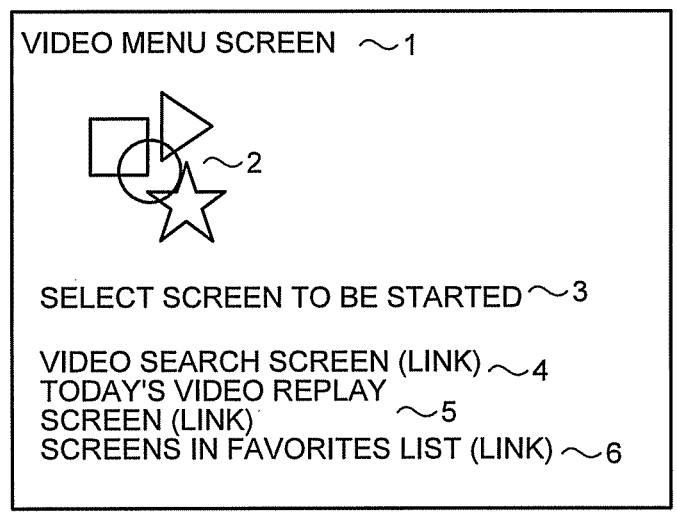
FIG. 2A is a diagram illustrating an exemplary screen displayed on a display unit in the information processing system according to a first embodiment.
Figure 2B:
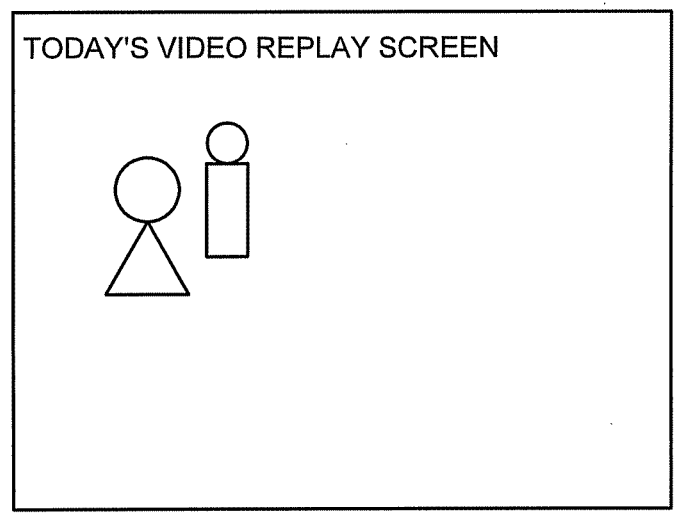
FIG. 2B is a diagram illustrating an exemplary screen displayed on a display unit in the information processing system according to a first embodiment.

FIG. 2A is a diagram illustrating an exemplary screen displayed on the display unit 15 when the CPU 11 executes a page file. The exemplary screen illustrated in FIG. 2A contains character string data 1 representing "video menu screen"; image data 2; character string data 3 representing "select screen to be started"; a link 4 to "video search screen"; a link 5 to "today's video replay screen"; and a link 6 to "screens in favorites list". If any one of the links 4, 5, and 6 is selected by a user operation; then the page file that the selected link represents is run and, for example, the display on the display unit 15 changes as illustrated in FIG. 2B. Herein, FIG. 2B illustrates an exemplary screen displayed on the display unit 15 when the link 5 to "today's video replay screen" is selected.

Figures 3, 4:
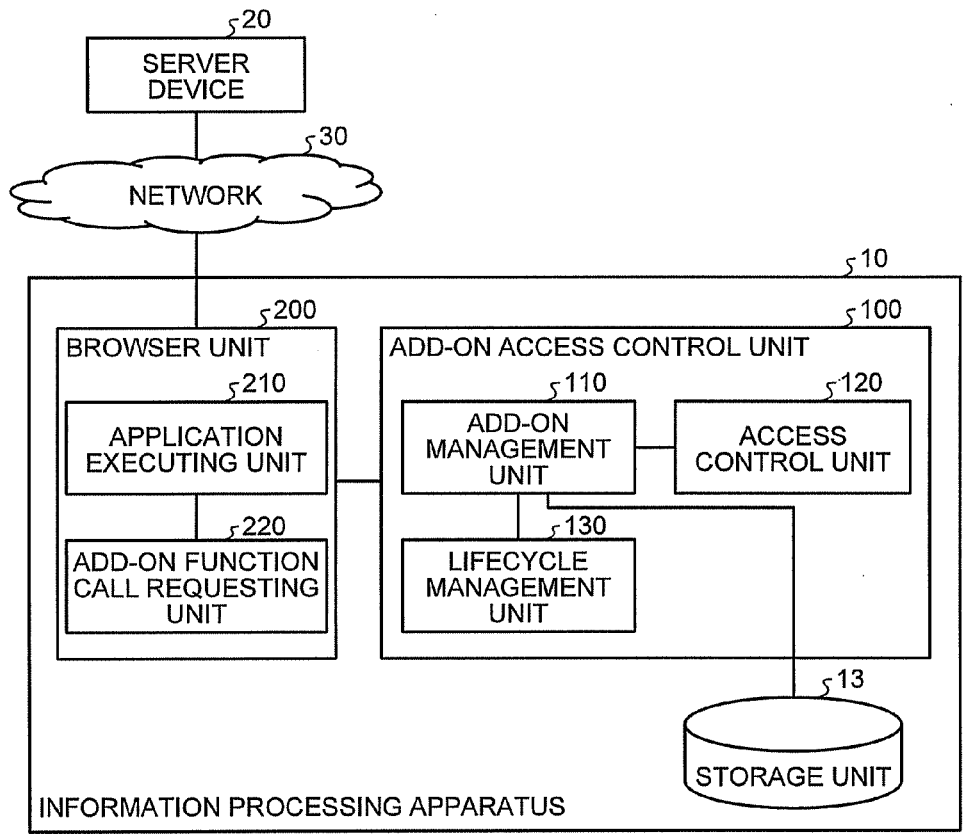
FIG. 3 is a functional block diagram illustrating a functional configuration implemented inside the information processing apparatus according to the first embodiment.
FIG. 4 is a diagram illustrating an example of an add-on management table that is generated and maintained by an add-on management unit in the information processing apparatus according to the first embodiment.

The information processing apparatus 10 according to the first embodiment stores, in the storage unit 13, the browser program as well as the add-on access control program. FIG. 3 is a functional block diagram illustrating a functional configuration implemented inside the information processing apparatus 10 when the CPU 11 of the information processing apparatus 10 runs the browser program and the add-on access control program. As illustrated in FIG. 3, in the information processing apparatus 10; running the browser program results in the implementation of a browser unit 200, and running the add-on access control program results in the implementation of an add-on access control unit 100.

The browser unit 200 includes an application executing unit 210 and an add-on function call requesting unit 220.

In response to an inter-page-file transition request; the application executing unit 210 obtains, from the server device 20 via the network 30, page files as well as the media files to be used in those page files; and displays characters or images on the display unit 15 according to the arrangement information. Moreover, the application executing unit 210 runs a control program that is specified in a page file and that is written in the Java (registered trademark) Script or the like.

When the browser unit 200 is activated, the add-on function call requesting unit 220 requests initialization of the add-ons stored in the storage unit 13. Moreover, the add-on function call requesting unit 220 detects a call to an add-on during the execution of a program specified in a page file, notifies the add-on access control unit 100 of the identifier of the add-on that has been called and the function that has called the add-on, and issues a request to call that add-on.

The add-on access control unit 100 includes an add-on management unit 110 that performs reading and calling of add-ons; an access control unit 120 that determines, when an add-on is called, whether or not that add-on is callable; and a lifecycle management unit 130 that manages application configuration information of the web application being executed.

In the information processing apparatus 10 according to the first embodiment, at the time of activation of the browser unit 200, the add-on function call requesting unit 220 is called. The add-on function call requesting unit 220 requests the add-on access control unit 100 to initialize an add-on. The add-on management unit 110 of the add-on access control unit 100 detects the request for initialization of the add-on, loads the add-on in the main memory 12 from the storage unit 13, and stores the call destination addresses of the instructions (functions) possessed by the add-ons. At that time, it is also possible to load a plurality of add-ons in the main memory 12 from the storage unit 13. For example, if the DLNA video player add-on and the local file access add-on are provided as separate add-ons and are stored in the storage unit 13, then those add-ons are loaded in the main memory 12 from the storage unit 13. The DLNA video player add-on contains a replay instruction, a replay stop instruction, a video list get instruction, and the like. The local file access add-on contains a file delete instruction, a file list get instruction, and the like.

Besides, the add-on management unit 110 stores, in the main memory 12, a list of identifiers that are used in identifying the add-ons. When an add-on calling unit 112 (described later) calls an add-on, the listed identifiers are referred to while deciding the add-on to be called. As the identifiers, more particularly, it is possible to use MIME types (MIME stands for multipurpose Internet mail extensions) or file extensions. For example, while identifying the add-ons using MIME types, the DLNA video player is named as "video/dlna-player" and the local file access add-on is named as "application/file-manager". In the case of independent add-ons, the developer thereof can freely decide on the identifiers.

An add-on can have a plurality of instructions (functions), each of which is called from a web application be specifying the add-on identifier and the function name. The add-on management unit 110 maintains an add-on management table in such a way that, even if the same function name is present in each add-on, the function to be called is differentiated by the corresponding add-on identifier. FIG. 4 is a diagram illustrating an example of the add-on management table that is generated and maintained by the add-on management unit 110. In the add-on management table illustrated in FIG. 4, "video/dlna-player" and "application/file-manager" are present as add-on identifiers; and a function name "getfilelist" is present in each add-on. In response to a call to a function, a set the add-on identifier and the function name is sent. For example, upon receiving a call request from the add-on function call requesting unit 220 regarding a set of the add-on identifier "application/file-manager" and the function name "getfilelist", the add-on management unit 110 refers to the add-on management table illustrated in FIG. 4 and calls the function stored in an address "56789" that corresponds to the specified add-on identifier and the specified function name.

During inter-page-file transition, the application executing unit 210 notifies the add-on management unit 110 of the URL, which serves as the location identifier, of the transition-destination page file and issues a request for updating the application configuration information.

The application configuration information contains application range information as the information representing one or more page files included in the corresponding web application and contains usage certificate information as the information representing the add-ons allowed to be used in that web application. The application range information contains the location information of each page file included in the web application. For example, the application range information is in the form of a list of the location information of each page file included in the web application. More particularly, the application range information is in the form of a list of location identifiers of each page file included in the web application (hereinafter, referred to as "URL list"). The URL list is referred to at the time when the web application makes use of files. At that time, the browser unit 10 can obtain the files from the server device 20 in either an active manner or a passive manner. In the following explanation, although the application range information is assumed to be in the form of list, it is not the only possible case. That is, as long as the location information of each page file included in the web application is identifiable, any format can be used. Meanwhile, the usage certificate information contains a list of usage certificates corresponding to all add-ons that are allowed to be used in the corresponding web application (hereinafter, referred to as "usage certificate list"). Such application configuration information containing a URL list and a usage certificate list is, for example, integrated in the page file that is initially run in the corresponding web application.

FIG. 5A is a diagram illustrating an exemplary data structure of the application configuration information that is integrated in a page file. FIG. 5B is a diagram illustrating an example of the application configuration information written according to the data structure illustrated in FIG. 5A. In the example illustrated in FIG. 5, the application configuration information is the information sandwiched between a tag <appinfo>, which represents "application configuration information start identifier", and a tag </appinfo>, which represents "application configuration information end identifier". Moreover, the URL list is the information sandwiched between a tag <url_list>, which represents "location identifier information start identifier", and a tag </url_list>, which represents "location identifier information end identifier" in the application configuration information. Furthermore, the usage certificate list is the information sandwiched between a tag <cert_list>, which represents "add-on usage certificate start identifier", and a tag </cert_list>, which represents "add-on usage certificate end identifier" in the application configuration information. In the first embodiment, although the URL list is used as a list of page files included in the web application, it is not the only possible case. That is, as long as the range of the web application is identifiable; information other than the URL list, such as a list of file names of the page files included in the web application, can also be used.

The access control unit 120 determines whether the add-on for which the add-on function call requesting unit 220 has issued a call request is callable, and performs access control with respect to add-ons. If the add-on for which the add-on function call requesting unit 220 has issued a call request is determined to be callable, the access control unit 120 issues a call request for that add-on to the add-on management unit 110.

The lifecycle management unit 130 is activated when an update request for updating application configuration information is issued. In response to the update request, the lifecycle management unit 130 updates the application configuration information corresponding to the web application currently being executed. For that reason, the lifecycle management unit 130 is configured to be capable of determining that the transition-destination page file contains application configuration information and capable of determining about starting, ending, and continuing the execution of the web application.

In the information processing apparatus 10 according to the first embodiment, every time page transition occurs during the execution of a web application, the lifecycle management unit 130 automatically determines about starting, ending, and continuing the execution of the web application depending on the details of the transition-destination page. Moreover, if a call request for calling an add-on is issued during the execution of the web application, the access control unit 120 refers to the usage certificate list included in the application configuration information, which is managed by the lifecycle management unit 130, and accordingly performs the access control.

Figure 6:
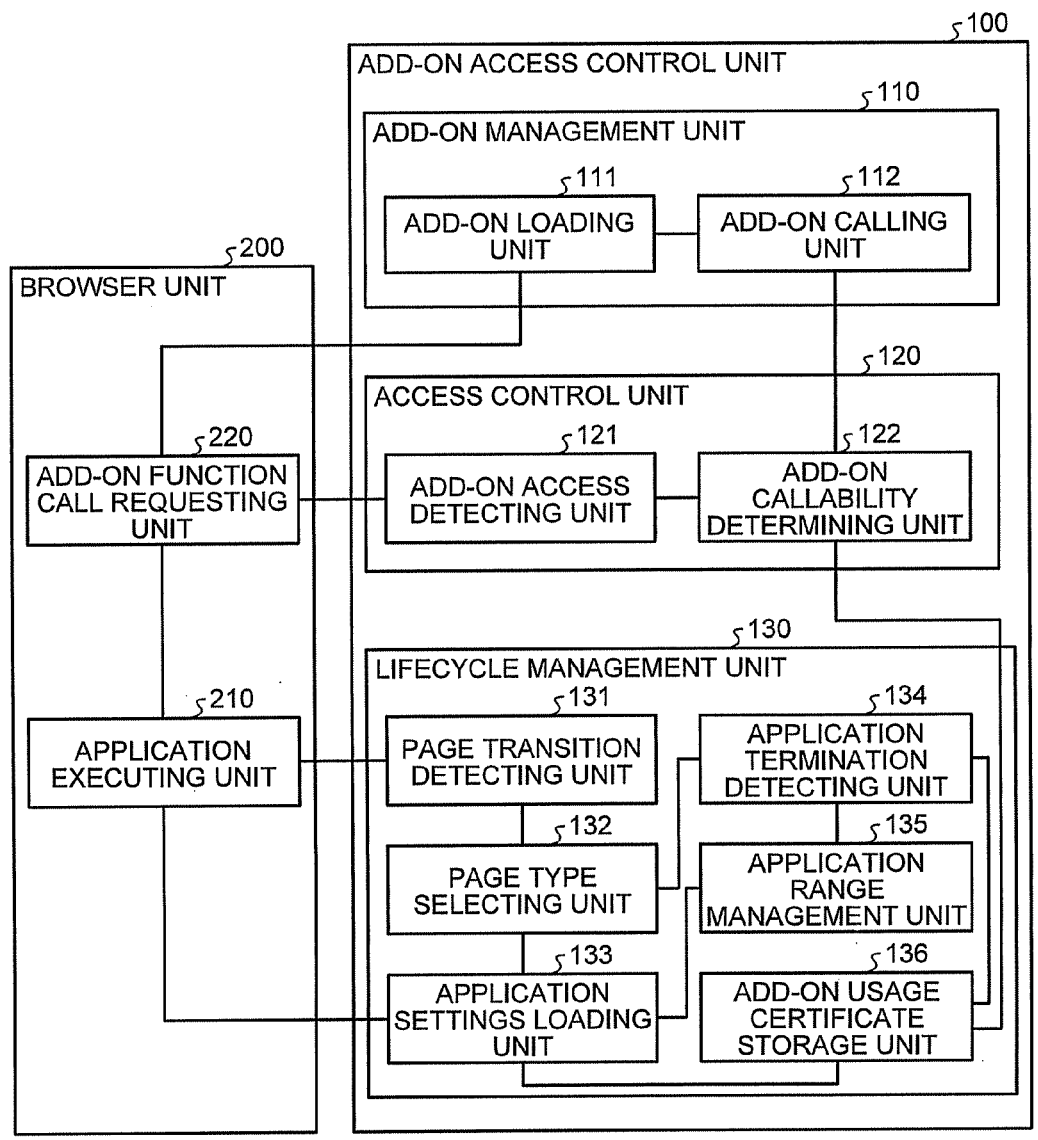
FIG. 6 is a functional block diagram illustrating a more detailed functional configuration of the information processing apparatus according to the first embodiment.

FIG. 6 is a functional block diagram illustrating a more detailed functional configuration of the information processing apparatus 10 illustrated in FIG. 3. Thus, a detailed configuration of the information processing apparatus 10 is explained below with reference to FIG. 6.

The add-on management unit 110 includes an add-on loading unit 111 and the add-on calling unit 112.

The add-on loading unit 111 makes lists of the add-ons stored in the storage unit 13, and loads them in the main memory 12. For making lists of the add-ons stored in the storage unit 13, it is possible to distinguish the add-ons according to the file names having specific extensions, or to distinguish the add-ons depending on whether or not the add-ons are provided with a specific function, or to list file names of add-ons in specific files. While loading the add-ons; with respect to the identifier of each add-on, the add-on loading unit 111 stores the correspondence relationship between the address of the function of that add-on and the function name in the main memory 12 as the add-on management table illustrated in FIG. 4. In order to obtain such correspondence relationship, there are various methods such as calling specific functions of the add-ons or describing in advance the correspondence relationship in a separate file.

When the add-on function call requesting unit 220 of the browser unit 200 issues a call request for calling an add-on, the add-on calling unit 112 receives the identifier and the function name of the add-on to be called, and then calls that add-on. From the add-on management table stored in the main memory 12 by the add-on loading unit 111, the add-on calling unit 112 obtains the address of the function corresponding to the received identifier and the received function name, and performs an operation of actually calling the function of the add-on present at the obtained address.

The access control unit 120 includes an add-on access detecting unit 121 and an add-on callability determining unit 122.

The add-on access detecting unit 121 receives a call request and receives call information from the add-on function call requesting unit 220, and calls the add-on callability determining unit 122. The call information contains the identifier and the function of the add-on to be called. The add-on access detecting unit 121 calls the add-on callability determining unit 122 and sends the identifier and the function of the add-on to be called, and issues a request for determining whether or not that add-on is callable as well as issues a call request for calling that add-on.

Upon receiving the requests from the add-on access detecting unit 121, the add-on callability determining unit 122 receives the identifier and the function name of the add-on to be called and determines whether or not that add-on is callable. In order to determine whether or not that add-on is callable, the add-on callability determining unit 122 obtains, from an add-on usage certificate storage unit 136 (described later) of the lifecycle management unit 130, the usage certificate list specified in the application management information corresponding to the web application currently being executed. If the usage certificate list contains the usage certificate regarding the add-on to be called, the add-on callability determining unit 122 determines that calling of that add-on is allowed. In that case, the add-on callability determining unit 122 sends the identifier and the function of the add-on to be called to the add-on calling unit 112 and issues a call request.

The lifecycle management unit 130 includes a page transition detecting unit 131, a page type selecting unit 132, an application settings loading unit 133, an application termination detecting unit 134, an application range management unit 135, and the add-on usage certificate storage unit 136.

The page transition detecting unit 131 detects a transition from the page that was being processed in the browser unit 200 to another page, and notifies the page type selecting unit 132 of the URL that serves as the location identifier of the transition-destination page.

Depending on whether or not the MIME type or the extension of the page file of the transition-destination page or depending on the details of the page file containing information with a specific tag appended thereto, the page type selecting unit 132 determines whether or not that page file contains application configuration information. Based on the result of whether or not that page file contains application configuration information, the page type selecting unit 132 determines whether or not a new application has started. In the first embodiment, the application configuration information is specified in the page file that is initially run in a web application. Thus, if the page file of the transition-destination page file contains the application configuration information, the page type selecting unit 132 can determine that a new web application has started. When a new web application is determined to have started, the page type selecting unit 132 calls the application settings loading unit 133.

The application settings loading unit 133 loads the application configuration information, which is specified in the page file of the transition-destination page and which corresponds to the new web application. At that time, the application settings loading unit 133 sends the URL list, which is specified in the application configuration information, to the application range management unit 135 and issues a store instruction for storing the URL list. Moreover, the application settings loading unit 133 sends the usage certificate list, which is specified in the application configuration information, to the add-on usage certificate storage unit 136 and issues a store instruction for storing the usage certificate list.

At the time of page file transition, the application termination detecting unit 134 determines whether or not the web application currently being executed has terminated. More particularly, from the application range management unit 135, the application termination detecting unit 134 obtains the URL list indicating the range of the web application currently being executed and accordingly determines whether or not the URL serving as the location identifier of the transition-destination page is included in that URL list. If the URL of the transition-destination page is included in that URL list, then the application termination detecting unit 134 determines that the web application is to be continually executed. On the other hand, if the URL of the transition-destination page is not included in that URL list, then the application termination detecting unit 134 determines that the web application has terminated. Once the web application is determined to have terminated, the application terminated detecting unit 134 issues a delete instruction to the application range management unit 135 for deleting the URL list that has been stored, as well as issues a delete instruction to the add-on usage certificate storage unit 136 for deleting the usage certificate list that has been stored.

The application range management unit 135 receives a store instruction, a get instruction, or a delete instruction regarding the URL list; and accordingly updates or obtains the URL list stored in the main memory 12.

The add-on usage certificate storage unit 136 receives a store instruction, a get instruction, or a delete instruction regarding the usage certificate list; and accordingly updates or obtains the usage certificate list stored in the main memory 12.

Figure 7:
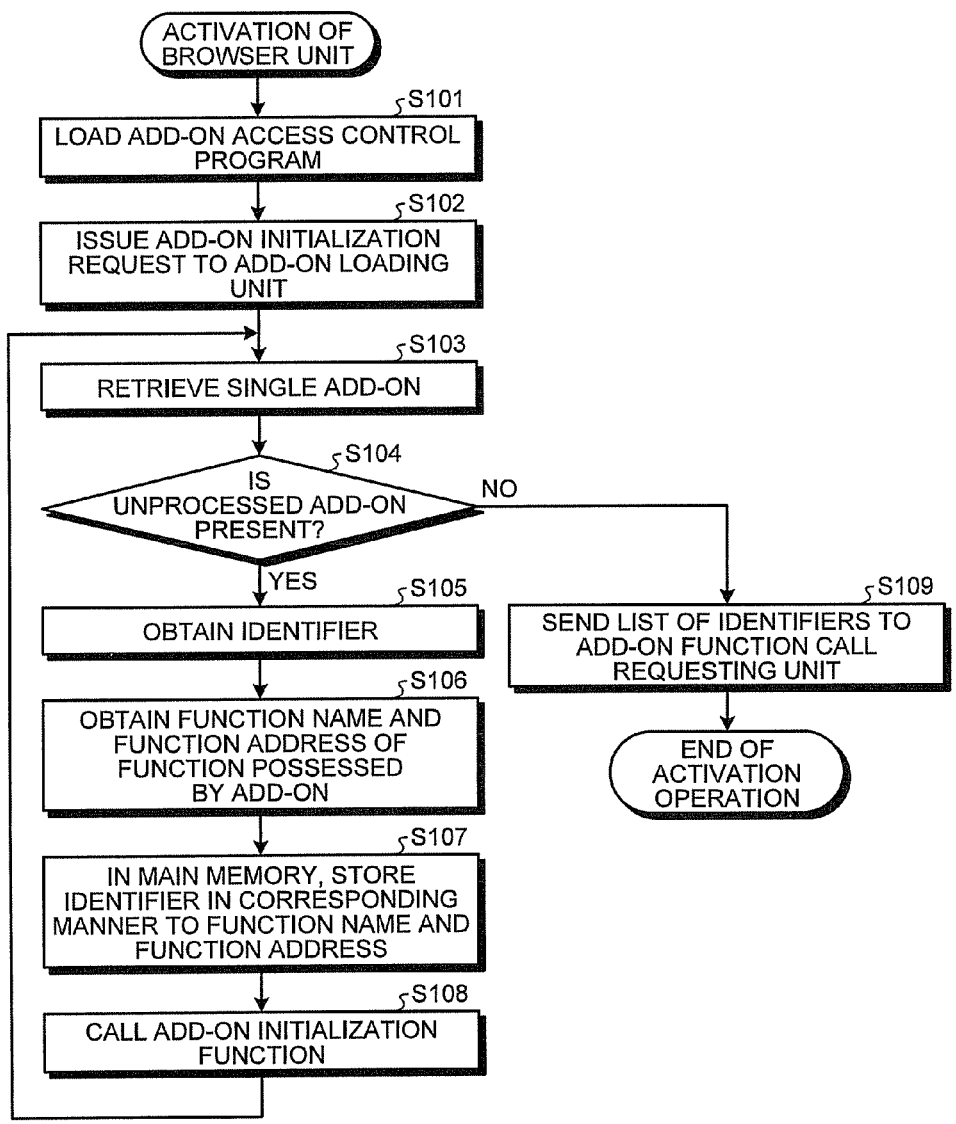
FIG. 7 is a flowchart for explaining a sequence of operations performed at the time of activation according to the first embodiment.

Explained below with reference to FIG. 7 is a sequence of operations performed at the time of activation of the browser unit 200 according to the first embodiment. FIG. 7 is a flowchart for explaining a sequence of operations performed when the browser unit 200 is activated according to the first embodiment. Once the browser unit 200 is activated, an add-on loading operation is performed. More particularly, an operation of obtaining add-on identifiers is performed and an operation of listing the functions possessed by the add-ons is performed. The details of those operations are explained below.

Upon being activated, the browser unit 200 firstly loads the add-on access control program from the storage unit 13 into the main memory 12 (Step S101). As a result, the add-on access control unit 100 gets implemented. Then, the add-on function call requesting unit 220 of the browser unit 200 issues an add-on initialization request to the add-on loading unit 111 of the add-on access control unit 100 (Step S102).

Upon receiving the add-on initialization request from the add-on function call requesting unit 220, the add-on loading unit 111 retrieves a single add-on from the storage unit 13 (Step S103). Then, the add-on loading unit 111 determines whether or not an unprocessed add-on is still present in the storage unit 13 (Step S104). If an unprocessed add-on is still present in the storage unit 13 (Yes at Step S104), the add-on loading unit 111 obtains the identifier of that add-on (Step S105). Moreover, the add-on loading unit 111 obtains the correspondence relationship between the function name of the function possessed by the add-on, which is identified by the obtained identifier, and the address at which that function is stored (i.e., the function address) (Step S106). Then, the add-on loading unit 111 stores, in the main memory 12, the identifier obtained at Step S105 in a corresponding manner to the function name and the function address obtained at Step S106 (Step S107).

Subsequently, the add-on loading unit 111 calls an add-on initialization function (Step S108). Herein, regarding the add-on initialization function, since the function name is decided in advance, the function address can be determined by referring to the correspondence relationship between the function name and the function address.

Then, the system control returns to Step S103. Until all add-ons present in the storage unit 13 are processed, the add-on loading unit 111 repeats the operations from Step S103 to Step S108. As a result, the add-on loading unit 111 builds the add-on management table as illustrated in FIG. 4. Once the operations are performed for all add-ons stored in the storage unit 13 (No at Step S104), the add-on loading unit 111 sends a list of identifiers of the add-ons as reply to the add-on function call requesting unit 220 (Step S109). That marks the end of the activation operation. With that, the browser unit 200 gets to know the list of add-ons stored in the storage unit 13.

Figure 8:
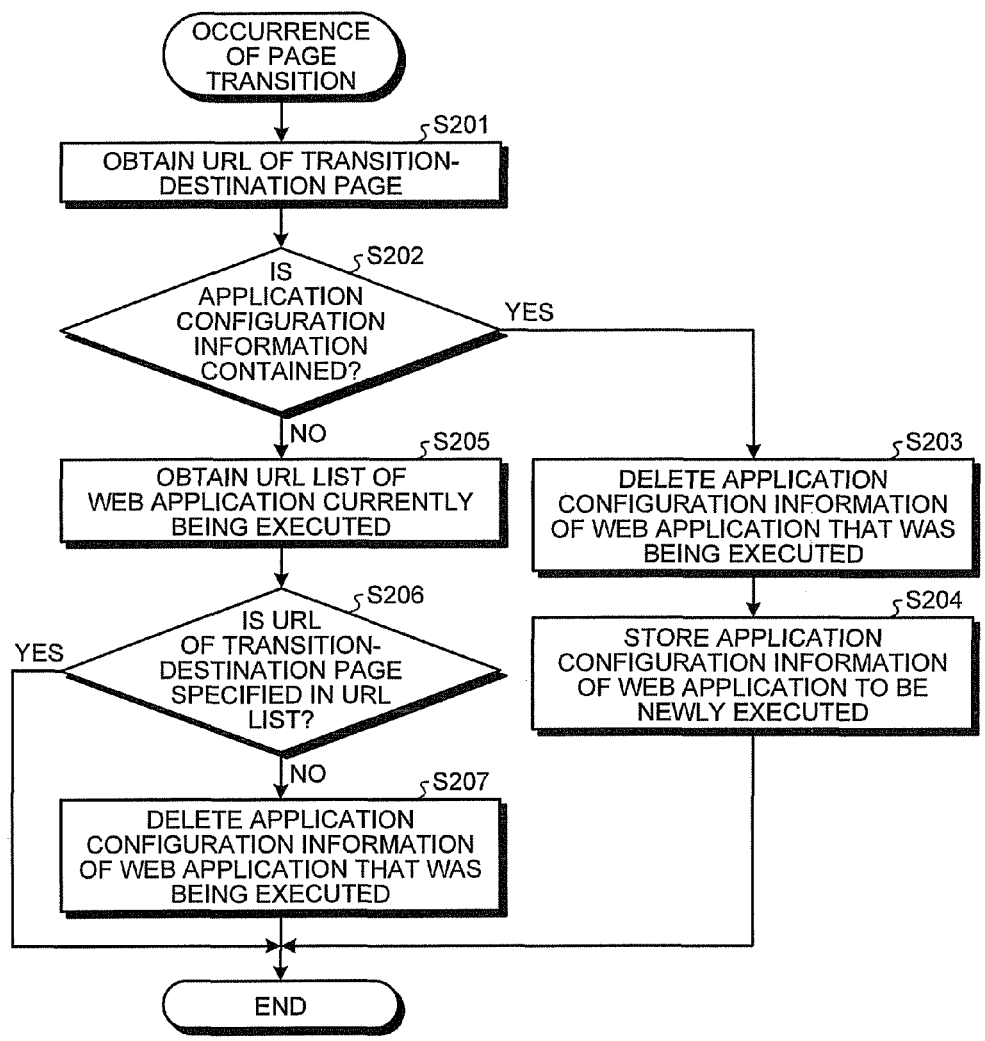
FIG. 8 is a flowchart for explaining a general sequence of operations performed at the time of page transition according to the first embodiment.
Figure 9:
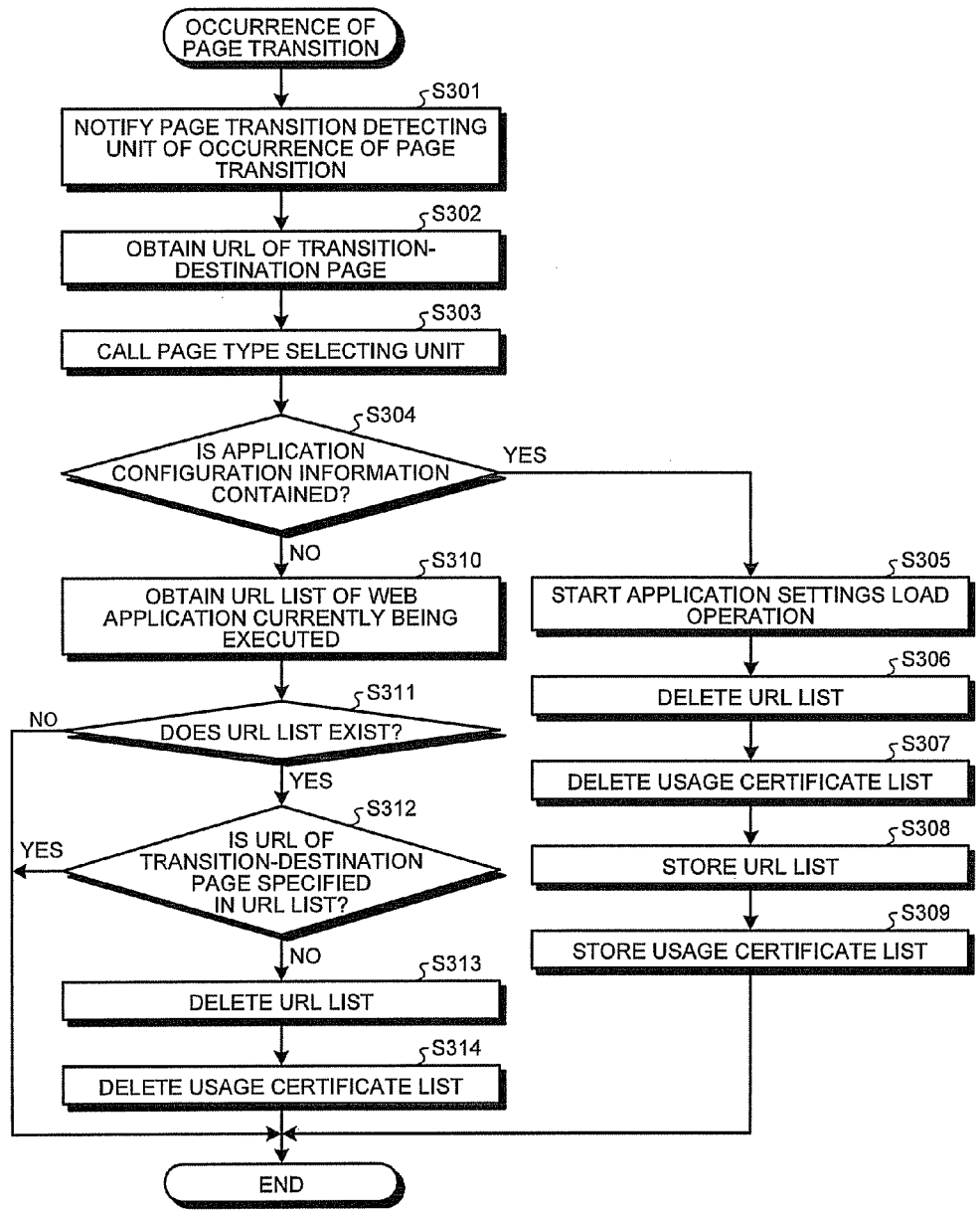
FIG. 9 is a flowchart for explaining a detailed sequence of operations performed at the time of page transition according to the first embodiment.

Explained below with reference to FIGS. 8 and 9 is a sequence of operations performed at the time of page transition. FIG. 8 is a flowchart for explaining a general sequence of operations performed at the time of page transition according to the first embodiment. FIG. 9 is a flowchart for explaining a detailed sequence of operations performed at the time of page transition according to the first embodiment. Herein, at the time of page transition, it is determined whether or not to start a web application, to end a web application, or to continually execute a web application; and application configuration information is updated.

Firstly, an overview of operations that are performed at the time of page transition is explained with reference to FIG. 8. When page transition occurs, firstly, the URL that serves as the location identifier of the transition-destination page is obtained (Step S201) and it is determined whether or not the page file of the transition-destination page contains application configuration information (Step S202). If the transition-destination page contains application configuration information (Yes at Step S202), it is determined that a new web application has started and the application configuration information corresponding to the web application that was being executed is deleted (Step S203). Then, the application configuration information corresponding to the web application to be newly executed is stored (Step S204). As described above, that application configuration information contains the URL list indicating the range of the web application (i.e., indicating the page files included in the web application) and contains the usage certificate list indicating the add-ons that are allowed to be used in the web application.

On the other hand, if the transition-destination page does not contain application configuration information (No at Step S202), then a URL list is obtained that is specified in the application configuration information corresponding to the web application currently being executed (Step S205), and it is determined whether or not the URL of the transition-destination page is specified in that URL list (Step S206). If the URL of the transition-destination page is specified in that URL list (Yes at Step S206), it is determined that the web application is to be continually executed. That marks the end of the operations. On the other hand, if the URL of the transition-destination page is not specified in that URL list (No at Step S206), it is determined that the web application has terminated and hence the application configuration information corresponding to the web application that was being executed is deleted (Step S207).

Explained below with reference to FIG. 9 is the detailed explanation of the operations performed at the time of page transition. When page transition occurs, firstly, the application executing unit 210 of the browser unit 200 notifies the page transition detecting unit 131, of the lifecycle management unit 130 of the add-on access control unit 100, the occurrence of page transition as well as the URL of the transition-destination page (Step S301). Upon obtaining the URL of the transition-destination page (Step S302), the page transition detecting unit 131 calls the page type selecting unit 132 and sends, the URL of the transition-destination page (Step S303).

In order to determine whether or not a new application has started, the page type selecting unit 132 obtains the page file of the transition-destination page and determines whether or not that page file contains application configuration information (Step S304). Such determination can be performed by, for example, using a determination criterion about whether or not the extension/the MIME type of the page file of the transition-destination page is same as the extension/the MIME type that is unique to a page file containing application configuration information, or using a determination criterion about whether or not the page file contains special tags such as <appinfo> and </appinfo> illustrated in FIG. 5B.

If the page file of the transition-destination page includes application configuration information (Yes at Step S304), then the page type selecting unit 132 determines that a new web application has started, and calls the application settings loading unit 133 and sends the application configuration information specified in the page file of the transition-destination page (Step S305).

Then, in order to delete the application configuration information corresponding to the web application that was being executed, the application settings loading unit 133 issues a delete instruction to the application range management unit 135 for deleting the corresponding URL list (Step S306), as well as issues a delete instruction to the add-on usage certificate storage unit 136 for deleting the corresponding usage certificate list (Step S307). Subsequently, in order to store the application configuration information corresponding to the new web application, the application settings loading unit 133 sends the URL list, which is specified in that application configuration information, to the application range management unit 135 and issues a store instruction for storing the URL list (Step S308). Moreover, the application settings loading unit 133 sends the usage certificate list, which is specified in that application configuration information, to the add-on usage certificate storage unit 136 and issues a store instruction for storing the usage certificate list (Step S309). According to the instruction issued by the application settings loading unit 133, the application range management unit 135 and the add-on usage certificate storage unit 136 perform deletion and storing of the URL list and the usage certificate list, respectively. As a result, the URL list and the usage certificate list specified in the application configuration information corresponding to the new web application are stored in the main memory 12.

Meanwhile, if the page file of the transition-destination page does not include application configuration information (No at Step S304), then the page type selecting unit 132 determines that the web application currently being executed is either to be continually executed or to be terminated. In order to determine whether the web application currently being executed is to be continually executed or to be terminated, the page type selecting unit 132 calls the application termination detecting unit 134 and sends the URL of the transition-destination page to the application termination detecting unit 134.

Upon receiving the URL of the transition-destination file from the page type selecting unit 132, the application termination detecting unit 134 firstly issues a get instruction to the application range management unit 135 for obtaining the URL list. In response to the get instruction issued by the application termination detecting unit 134 for obtaining the URL list, the application range management unit 135 obtains the URL list stored in the main memory 12 and sends the URL list as reply to the application range management unit 135 (Step S310). At that time, the application termination detecting unit 134 checks the existence of the URL list obtained by the application range management unit 135 (Step S311). If the URL list obtained by the application range management unit 135 does not exit (No at Step S311), then the operations are terminated. On the other hand, if the URL list obtained by the application range management unit 135 exists (Yes at Step S311), then the application termination detecting unit 134 determines whether or not the URL of the transition-destination page obtained by the page type selecting unit 132 is present in the URL list (Step S312).

If the URL of the transition-destination page is present in the URL list (Yes at Step S312), then the application termination detecting unit 134 determines that the same web application is being continually executed. That marks the end of the operations. On the other hand, if the URL of the transition-destination page is not specified in the URL list (No at Step S312), then the application termination detecting unit 134 determines that the web application that was being executed has terminated. Accordingly, in order to delete the application configuration information corresponding to the web application that was being executed, the application termination detecting unit 134 issues a delete instruction to the application range management unit 135 for deleting the corresponding URL list (Step S313) and issues a delete instruction to the add-on usage certificate storage unit 136 for deleting the corresponding usage certificate list (Step S314). According to the instruction issued by the application settings loading unit 133, the application range management unit 135 and the add-on usage certificate storage unit 136 delete the URL list and the usage certificate list, respectively.

Figure 10:
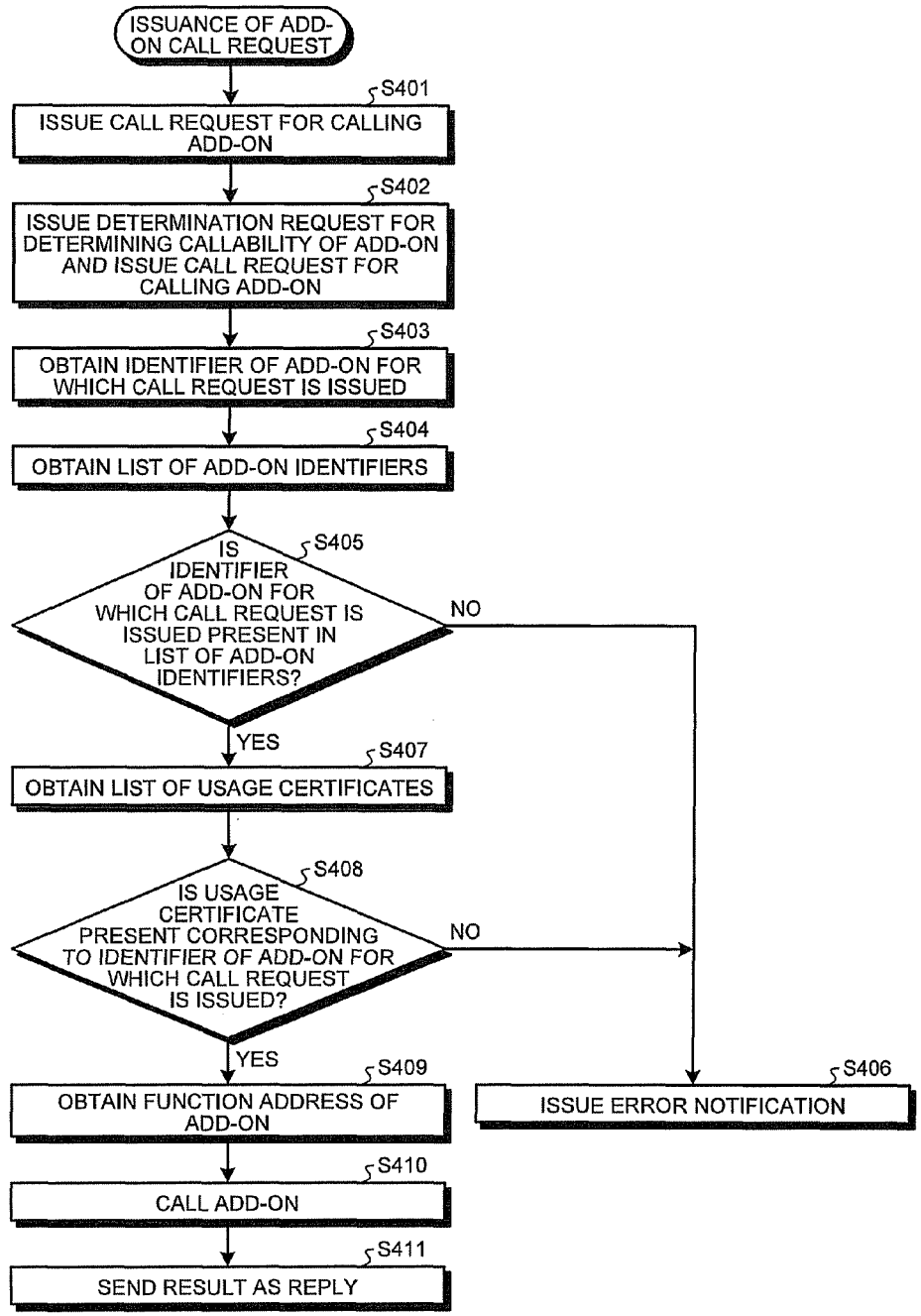
FIG. 10 is a flowchart for explaining a sequence of operations performed at the time of calling an add-on according to the first embodiment.

Explained below with reference to FIG. 10 is a sequence of operations performed at the time of calling an add-on according to the first embodiment. FIG. 10 is a flowchart for explaining a sequence of operations performed at the time of calling an add-on according to the first embodiment. Herein, at the time of calling an add-on, based on the usage certificate list corresponding to the web application currently being executed, mainly the add-on callability determining unit 122 determines whether or not the add-on to be called is allowed to be used in the web application currently being executed. If the add-on is allowed to be used, then the add-on callability determining unit 122 actually calls that add-on.

When a call request for calling an add-on is issued, firstly, the add-on function call requesting unit 220 of the browser unit 200 calls the add-on access detecting unit 121 of the access control unit 120 of the add-on access control unit 100, and sends the identifier of the add-on to be called, the function name, and the argument to be passed to the function; and issues a call request for calling the add-on (Step S401). The add-on access detecting unit 121 receives that information and issues a determination request for determining callability of the add-on as well as a call request for calling the add-on to the add-on callability determining unit 122, and sends the identifier of the add-on to be called, the function name, and the argument to be passed to the function (Step S402).

The add-on callability determining unit 122 obtains the identifier of the add-on for which the call request is issued (Step S403). Then, in order to check whether or not that add-on is actually present, the add-on loading unit 111 reads the list of add-on identifiers stored in the main memory 12 (Step S404). Subsequently, the add-on callability determining unit 122 determines whether or not the identifier of the add-on for which the call request is issued is present in the list of add-on identifiers (Step S405). If the identifier of the add-on for which the call request is issued is not present in the list of add-on identifiers (No at Step S405), then the add-on callability determining unit 122 sends an error notification to the add-on function call requesting unit 220 (Step S406).

On the other hand, if the identifier of the add-on for which the call request is issued is present in the list of add-on identifiers (Yes at Step S405); then, in order to determine whether or not that add-on is allowed to be used in the web application currently being executed, the add-on callability determining unit 122 firstly issues a get request to the add-on usage certificate storage unit 136 for obtaining the usage certificate list, and obtains the usage certificate list from the add-on usage certificate storage unit 136 (Step S407). Then, the add-on callability determining unit 122 determines whether or not the usage certificate corresponding to the identifier of the add-on for which the call request is issued is present in the usage certificate list (Step S408). If the corresponding usage certificate is not present (No at Step S408), then the add-on callability determining unit 122 determines that the add-on for which the call request is issued is not allowed to be used in the web application currently being executed, and sends an error notification to the add-on function call requesting unit 220 (Step S406).

On the other hand, if the corresponding usage certificate is present in the usage certificate list (Yes at Step S408), then the add-on callability determining unit 122 determines that the add-on for which the call request is issued is allowed to be used in the web application currently being executed; and sends the identifier of the add-on, the function name, and the argument to be passed to the function to the add-on calling unit 112, and issues a call request for calling that add-on. In order to actually call the add-on, the add-on calling unit 112 refers to the add-on management table, which is stored by the add-on loading unit 111 and which is illustrated in FIG. 4, and obtains the address of the function to be called from the function name corresponding to the identifier of the add-on to be called (Step S409). Then, with the argument to be passed to the function serving as the argument, the add-on calling unit 112 calls the function present at the obtained address (i.e., calls the add-on) (Step S410). Subsequently, the add-on calling unit 112 sends the result of calling the function, that is, sends the return value of the called function of the add-on as reply to the add-on function call requesting unit 220 (Step S411).

As described above, in the first embodiment, the application configuration information, which contains the URL list representing the range of a web application, is stored in the page file that is initially run in the corresponding web application. At the time when the information processing apparatus 10 executes a web application, the application configuration information corresponding to the web application being executed is stored. When page transition occurs during the execution of a web application, it is determined whether the page file of the transition-destination page contains application configuration information. If the page file of the transition-destination page does not contain application configuration information, it is determined whether or the URL of the transition-destination page is specified in the URL list. With that, it is determined whether or not to start a web application, to end a web application, or to continually execute a web application.

Thus, according to the first embodiment, it becomes possible to detect transition among web applications, which was a difficult task in the past. That makes it possible to perform access control with respect to the add-ons in units of web applications. As a result, in each web application, it becomes possible to limit the add-ons that are allowed to be used. Hence, regarding some add-ons that could not be easily unveiled in the past for security reasons, it becomes possible to unveil those add-ons by limiting the access permission. That enables achieving a wider scope of applications that can be created in a web application. For example, in the case of providing file deletion as part of the local file access function described above, if the local file access function is unveiled to all web application creators, there is a risk that computer viruses may get created which may destroy the user environment. However, according to the first embodiment, such a risk can be reduced by limiting the users of the add-ons.

Moreover, according to the first embodiment, by widening the scope of usage of the add-ons, the following advantage can also be gained. Regarding a typical platform-specific application that is developed using the C/C++ languages, only the functions that cannot be written in a typical web application can be developed as add-ons using the C/C++ languages and the remaining user interface part can be developed as a web application. Generally, as compared to the development cost of developing an application using a C/C++ native application, the development of a web application costs less. Thus, it becomes possible to reduce the software development cost.

In this way, in the first embodiment, a list of page files included in a web application (i.e., a URL list) is provided. Based on that list of page files, the web application is identified and security is implemented in the range of that web application.

In the widget standards of OMTP BONDI specifications (OMTP stands for Open Mobile Terminal Platform), there exists a standard for configuring applications using the web application technology. However, in many of the conventional widget standards, it is often the case that the application developer makes use of the compression technique and compresses in advance a plurality of page files and media files into a single file (a widget archive file), and considers that file as a single application for which security is to be implemented. If page files and media files are compressed into a single widget archive file, then modification of only some of the page files forces updating of the widget archive file. That results in a poor efficiency. Moreover, in a web application, there are times when page files or media files are dynamically generated in the server device. In such cases, it is difficult to implement the method of using a widget archive file.

In contrast, in the first embodiment, when it is required to update some pages, then only those particular pages can be updated thereby reducing the efforts during application updating.

Meanwhile, in some of the conventional technology (United States Patent Application Laid-open No. 2009/017972, Specification; and OMTP BONDI specifications), it is possible to write the security policy for each page file. However, in the conventional technologies, if the security policy is written for each page file and if an application is made of a large number of page files, then the security policy also substantially increase in number. Besides, in the case of updating the security policy for the entire application, it becomes necessary to update the security policy of each page file. Hence, it requires a substantial effort in security policy management.

In contrast, in the first embodiment, since it is sufficient to write the security policy only for the entire web application, updating the security policy for the entire web application costs less. Moreover, the security policy also does not easily increase in size.

Conventionally, as a standard for implementing the same security policy across a plurality of pages, there exists the same-origin policy of the HTML5 standard. That policy is used to allow mutual access to objects among the page files in the same domain, but cannot be used in differentiating the access permission or security policies across domains. In a web application, it is common practice to implement a technology called mashup in which a plurality of services is combined to create a new application. However, the same-origin policy hinders the creation of the application during mashup.

In contrast, in the first embodiment, while writing the page files included in a web application, it is not necessary that the page files belong to the same domain. Thus, it becomes possible to implement the security policy across domains as well as to implement the mashup technology that uses device functions.

Second Embodiment

Figure 11:
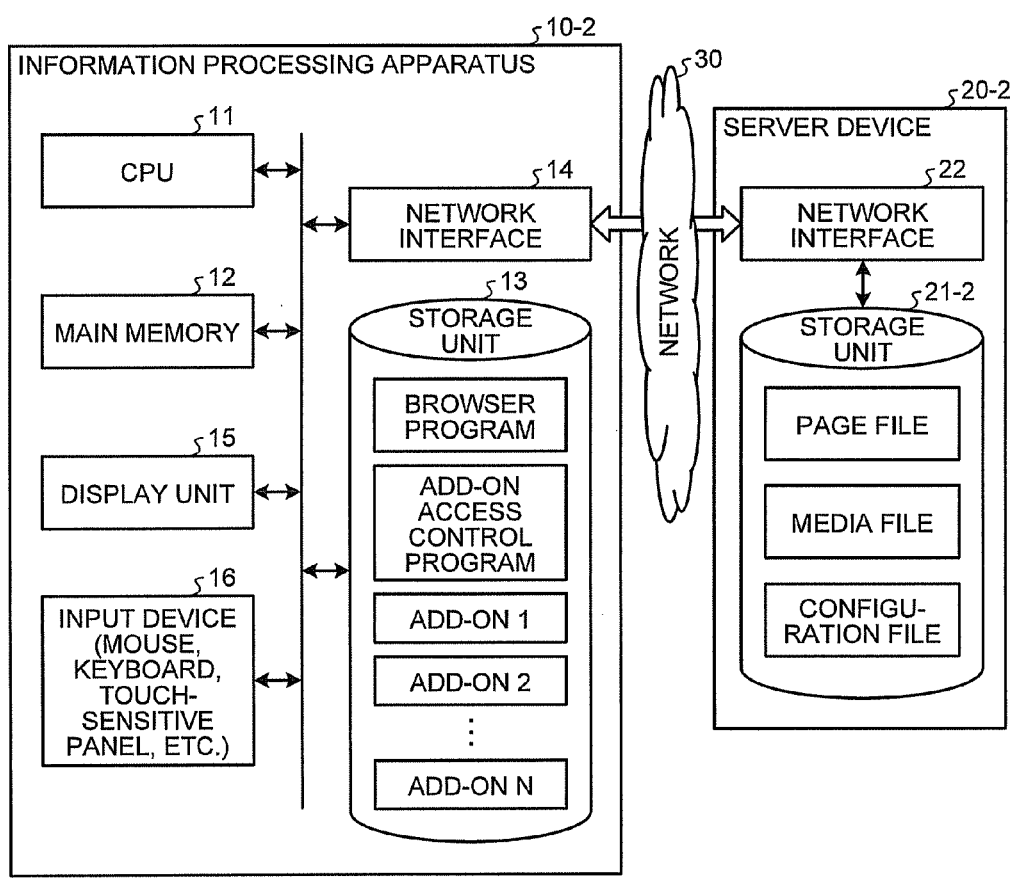
FIG. 11 is a hardware configuration diagram of an information processing system according to a second embodiment.

Explained below is a second embodiment. FIG. 11 is a hardware configuration diagram of an information processing system including an information processing apparatus 10-2 according to the second embodiment. As compared to the configuration illustrated in FIG. 1 according to the first embodiment, the configuration illustrated in FIG. 11 differs in the fact that a file called a configuration file is stored in a storage unit 21-2 of a server device 20-2. In the following explanation, the constituent elements identical to the first embodiment are referred to by the same reference numerals and the explanation thereof is not repeated. Thus, the following explanation is given only regarding the characteristics of the second embodiment.

In the first embodiment, a page file not only contains the page display information and the arrangement information but also contains the application configuration information. In contrast, in the second embodiment, a file containing the application configuration information is created separately from the page files. This file containing only the application configuration information is called a configuration file.

FIG. 12 is a diagram illustrating an exemplary data structure of a configuration file. The configuration file contains application configuration information that indicates the range of the corresponding web application and indicates the add-ons that can be used in the corresponding web application. With reference to FIG. 12, the application configuration information is the information sandwiched between "application configuration information start identifier" and "application configuration information end identifier". In the application configuration information, the URL list is the information sandwiched between "location identifier information start identifier" and "location identifier information end identifier". Moreover, in the application configuration information, the usage certificate list is the information sandwiched between "add-on usage certificate start identifier" and "add-on usage certificate end identifier". The application configuration information specified in the configuration file contains the location identifier (startup URL) of the page file to which transition occurs after the configuration file gets loaded (i.e., the page file run initially in the web application).

Figure 13:
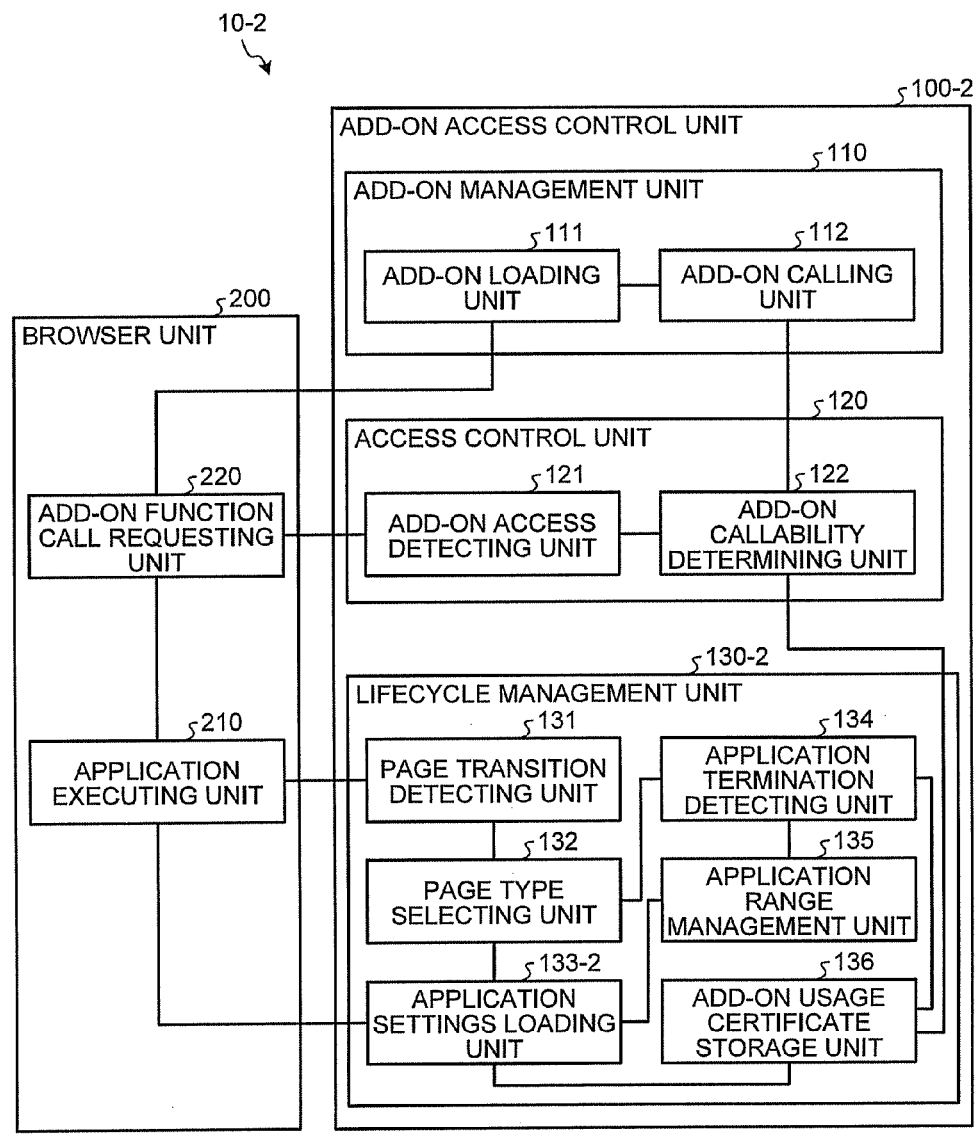
FIG. 13 is a functional block diagram illustrating a functional configuration implemented inside an information processing apparatus according to the second embodiment.

FIG. 13 is a functional block diagram illustrating a functional configuration implemented inside the information processing apparatus 10-2 according to the second embodiment. As compared to the configuration illustrated in FIG. 6 according to the first embodiment, the function of an application settings loading unit 133-2, of a lifecycle management unit 130-2 in an add-on access control unit 100-2 according to the second embodiment, is different than the function of the application settings loading unit 133 according to the first embodiment. That is, in addition to having the function of the application settings loading unit 133 according to the first embodiment, the application settings loading unit 133-2 according to the second embodiment also has a function of obtaining the information regarding the page file to which transition occurs automatically at the time of accessing the configuration file (i.e., obtaining the startup URL) and a function of issuing a transition instruction.

Figure 14:
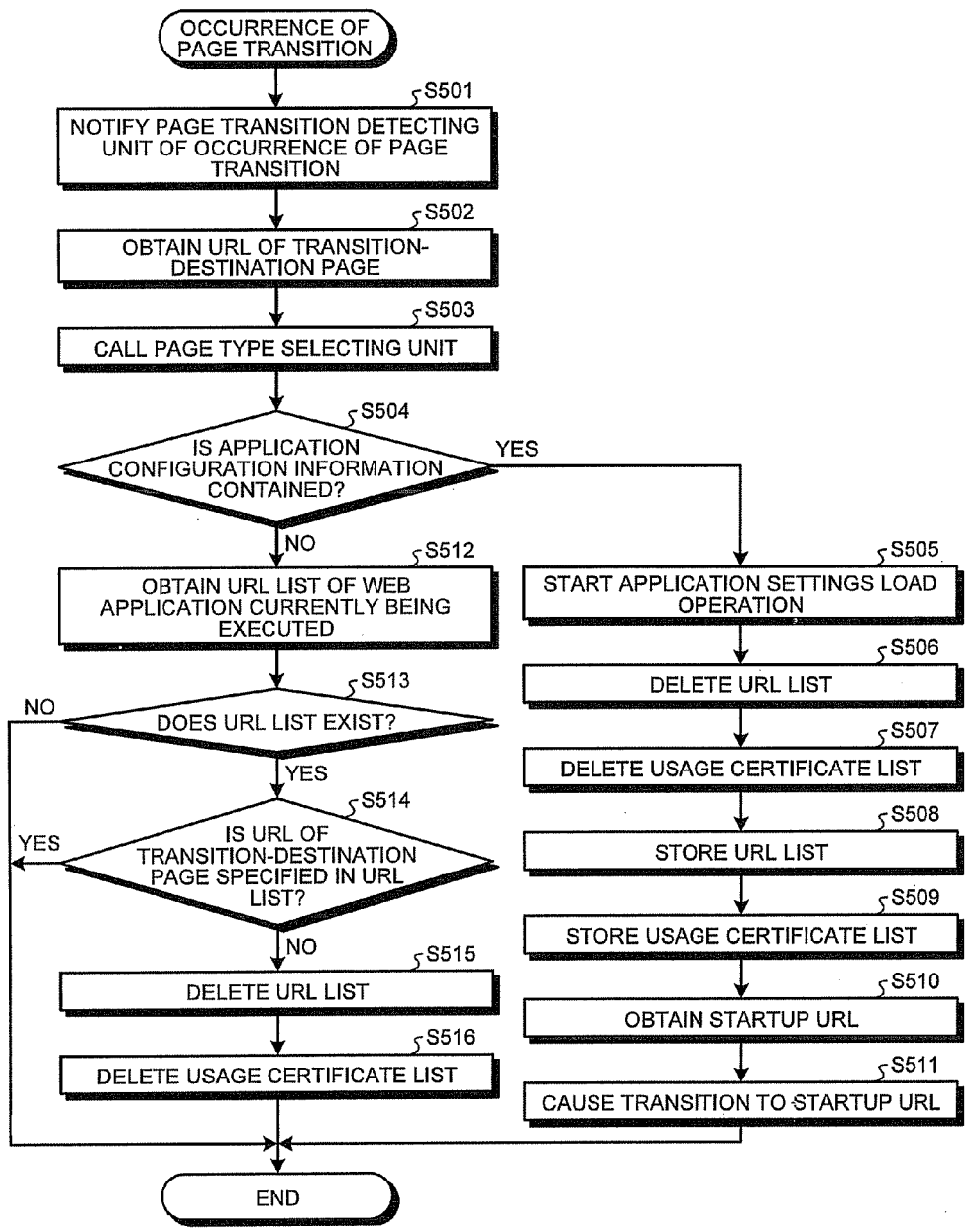
FIG. 14 is a flowchart for explaining a sequence of operations performed at the time of page transition according to the second embodiment.

FIG. 14 is a flowchart for explaining a sequence of operations performed at the time of page transition according to the second embodiment. As compared to the sequence of operations illustrated in FIG. 9 according to the first embodiment; the sequence of operations according to the second embodiment differs in the fact that, after an operation of storing a usage certificate list (Step S509), an operation is additionally performed for automatic transition from the configuration file to the page file that is initially run in the web application (Step S510 and Step S511). The operations from Step S501 to Step S509 illustrated in FIG. 14 are identical to the operations from Step S301 to Step S309 illustrated in FIG. 9. However, the determination at Step S504 is affirmative if the transition-destination page is the configuration file.

In the second embodiment, after the usage certificate list is stored at Step S509, the application settings loading unit 133-2 obtains from the configuration file the location identifier (startup URL) of the page file to be run (Step S510), notifies the application executing unit 210 of the startup URL and a transition instruction, and causes transition to the startup URL (Step S511). The subsequent operation, that is, the operations from Step S512 to Step S516 illustrated in FIG. 14 are identical to the operations from Step S310 to Step S314 illustrated in FIG. 9.

In the second embodiment, the application configuration information, which indicates the range of the corresponding web application and which indicates the add-ons that can be used in the corresponding web application, is provided in the form of a configuration file independent of the page files. That eliminates the need of modifying the page files. That is, there is absolutely no need to change the conventional page files. That enables making maximum use of the existing resources of the web application. Moreover, in the second embodiment, only generating a new configuration file suffices the purpose. Thus, the advantage is that the application development cost also does not change much as compared to the typical application development cost.

Third Embodiment

Explained below is a third embodiment. In the first embodiment, the add-on usage certificate storage unit 136 manages the usage certificate list that is the list of usage certificates for add-ons, and the add-on callability determining unit 122 determines callability of each add-on. In contrast, in the third embodiment, it is the security policies associated with the add-ons that are managed. Moreover, of a plurality of functions possessed by a single add-on, it is made possible to limit the functions that are allowed to be used.

Figure 15:
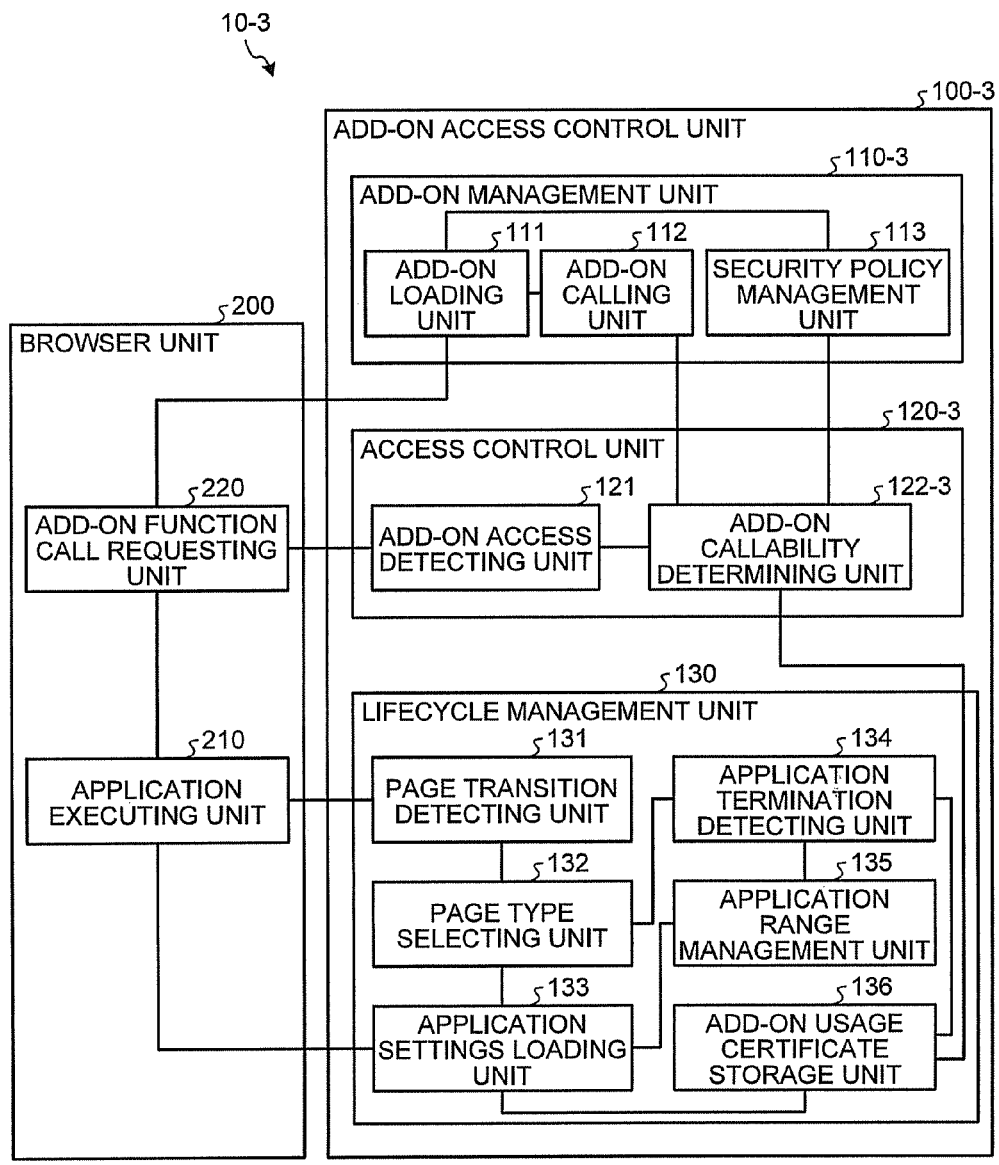
FIG. 15 is a functional block diagram illustrating a functional configuration implemented inside an information processing apparatus according to a third embodiment.

FIG. 15 is a functional block diagram illustrating a functional configuration implemented inside an information processing apparatus 10-3 according to the third embodiment. As compared to the configuration illustrated in FIG. 6 according to the first embodiment, the configuration illustrated in FIG. 15 differs in the fact that an add-on management unit 110-3 of an add-on access control unit 100-3 according to the third embodiment additionally includes a security policy management unit 113. In the following explanation, the constituent elements identical to the first embodiment are referred to by the same reference numerals and the explanation thereof is not repeated. Thus, the following explanation is given only regarding the characteristics of the third embodiment.

Figure 16:
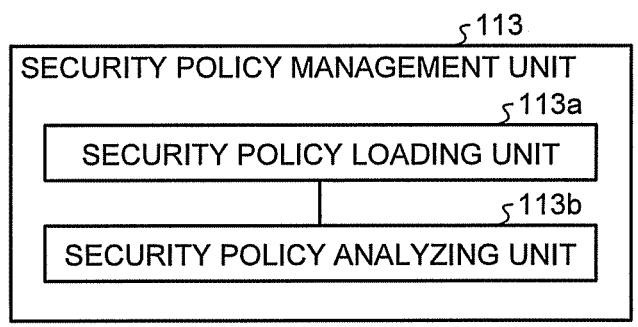
FIG. 16 is a block diagram of an internal configuration of a security policy management unit in the information processing apparatus according to the third embodiment.

FIG. 16 is a block diagram of an internal configuration of the security policy management unit 113. As illustrated in FIG. 16, the security policy management unit 113 includes a security policy loading unit 113a and a security policy analyzing unit 113b.

The security policy loading unit 113a receives an add-on identifier and loads the security policy of the corresponding add-on in the main memory 12.

FIG. 17A is a diagram illustrating an exemplary data structure of a security policy loaded by the security policy loading unit 113a according to the third embodiment. A file (security policy file) that contains an add-on security policy having the data structure illustrated in FIG. 17A is provided for each add-on. The file name of a security policy file can be decided from the identifier of the corresponding add-on. For example, the file name can be same as the identifier of the corresponding add-on. Moreover, a security policy file has a specific extension, and can have the corresponding identifier specified inside the data structure of the security policy. The security policy files are arranged in the storage unit 13. A security policy is made of one or more security policy element portions. In a security policy element portion, security policy element identifiers are listed along with the function names of functions that are allowed to be called when those security policy elements are implemented. Regarding the function names, it is also possible to specify conditions using wildcards or regular expressions.

FIG. 17B is a diagram illustrating an exemplary security policy file described according to the data structure illustrated in FIG. 17A. For example, in the case of implementing a security policy element having an identifier named "dlna-player-policy1"; functions named "hoge", "foo", and "bar" are allowed to be called.

The security policy analyzing unit 113b receives an add-on identifier and a security policy element identifier, and sends the contents of the corresponding security policy element as reply.

FIG. 18A is a diagram illustrating an exemplary data structure of the application configuration information according to the third embodiment. FIG. 18B is a diagram illustrating an example of the application configuration information written according to the data structure illustrated in FIG. 18A. As compared to the application configuration information illustrated in FIG. 5 according to the first embodiment, the application configuration information illustrated in FIGS. 18A and B differs in the fact that each usage certificate in the URL list contains the identifier of the security policy to be implemented. That is, in the example illustrated in FIG. 5, in the usage certificate list, only the identifiers (such as the MIME types) of the add-ons that are allowed to be used are specified. In contrast, in the example illustrated in FIGS. 18A and B, in addition to the identifiers of the add-ons that are allowed to be used, the security policy element identifiers to be implemented are also specified. These security policy element identifiers correspond to the security policy element identifiers specified in the security policy file illustrated in FIGS. 17A and B.

Figure 19:
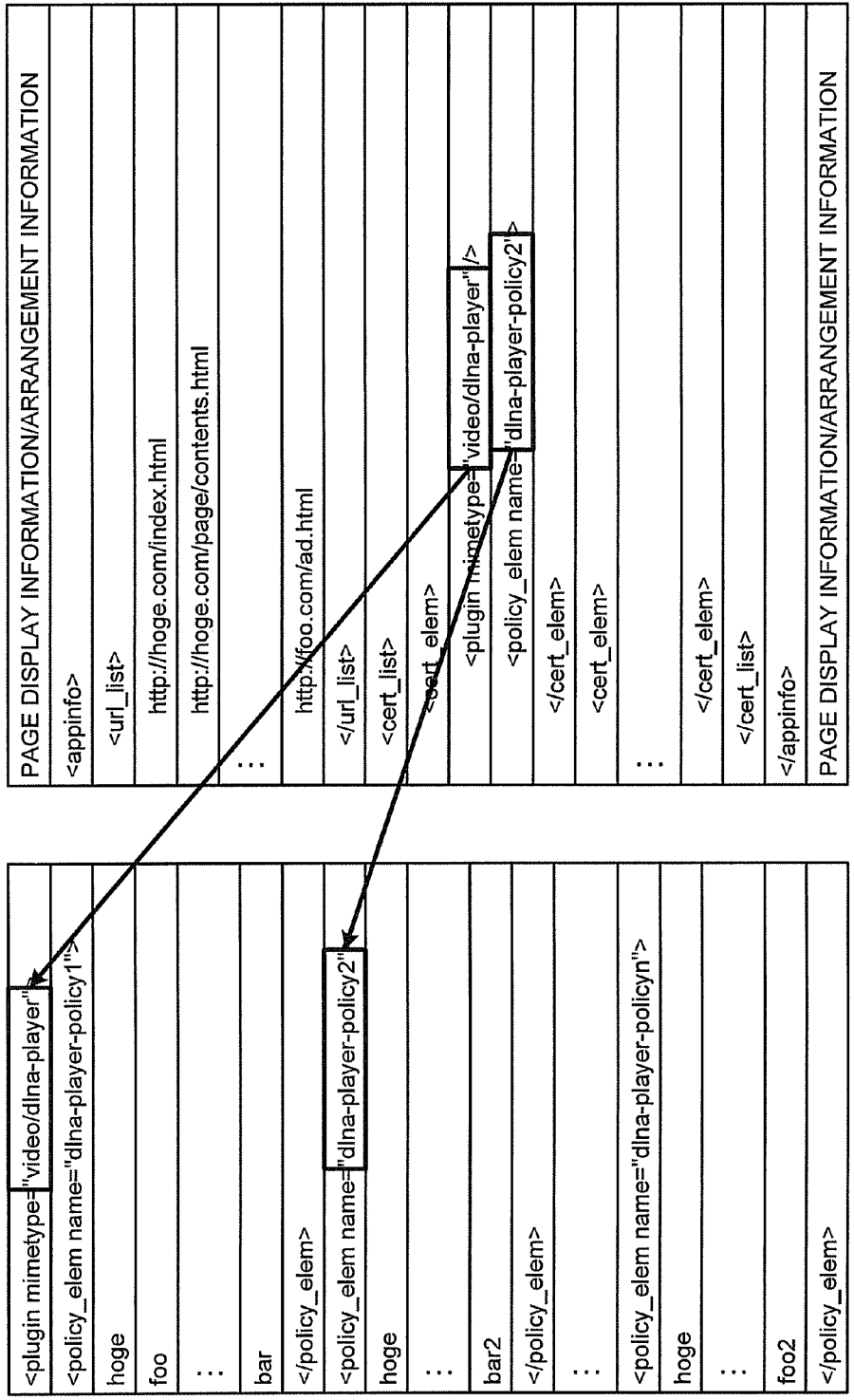
FIG. 19 is a diagram illustrating a correspondence relationship between the security policy file and the application configuration information according to the third embodiment.

FIG. 19 is a diagram illustrating a correspondence relationship between the security policy file illustrated in FIG. 17B and the application configuration information illustrated in FIG. 18B. In a web application having the application configuration information illustrated in FIG. 18B; it can be seen that, when the add-on having the identifier "video/dlna-player" is used, a security policy element "dlna-player-policy2" is implemented; and the contents of that security policy indicate that functions "hoge", "bar2", and the like are allowed to be called.

In the third embodiment, an add-on callability determining unit 122-3 of an access control unit 120-3 coordinates with the security policy management unit 113 as well as with the add-on usage certificate storage unit 136, and implements a security policy for each web application. Hence, even when using the same add-on, it becomes possible to change the security policy to be implemented according to the web application.

Figure 20:
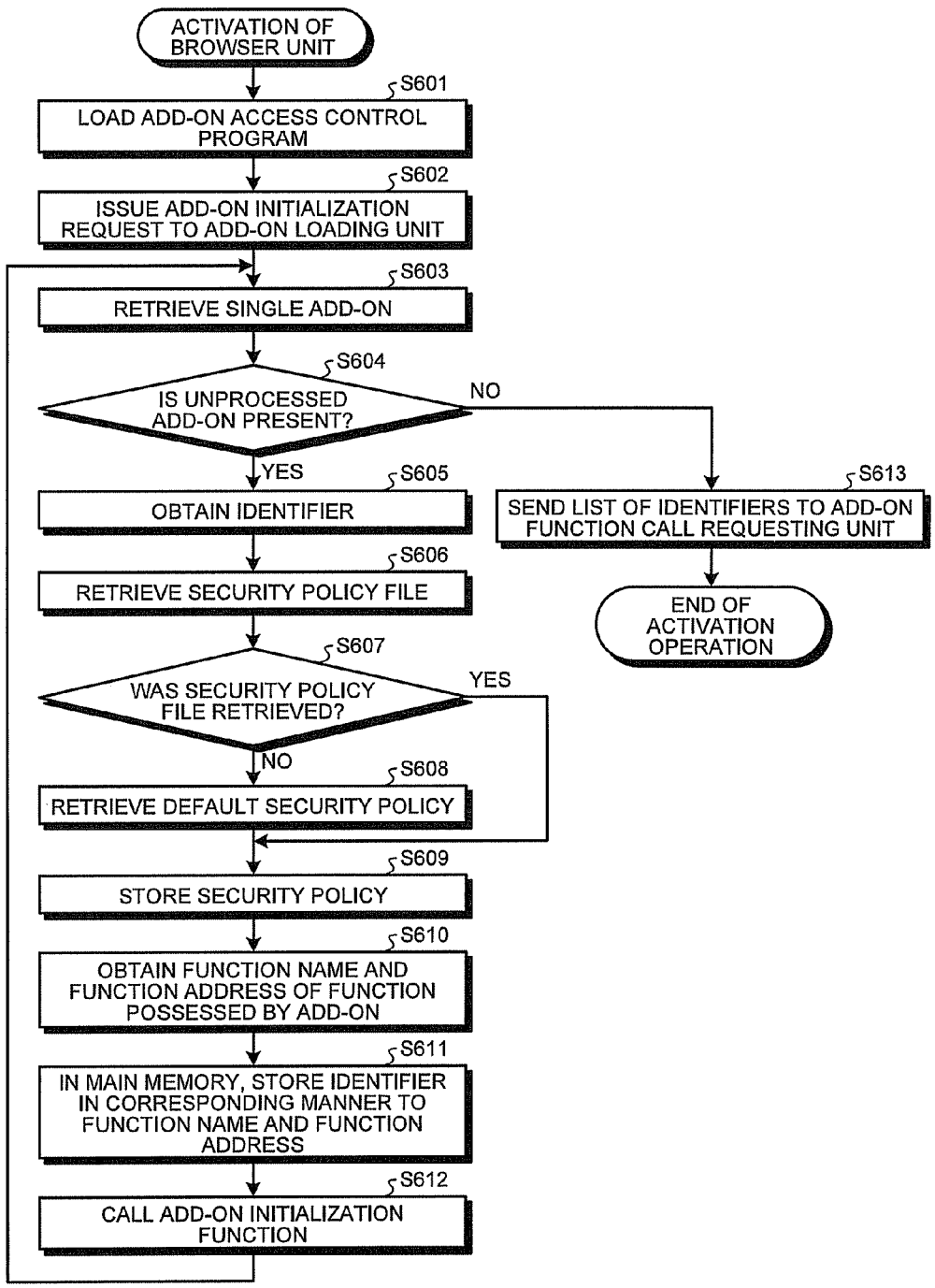
FIG. 20 is a flowchart for explaining a sequence of operations performed at the time of activation according to the third embodiment.

FIG. 20 is a flowchart for explaining a sequence of operations performed when the browser unit 200 is activated according to the third embodiment. As compared to the sequence of operations illustrated in FIG. 7 according to the first embodiment; the sequence of operations illustrated in FIG. 20 differs in the fact that, after an add-on identifier is obtained from the storage unit 13 (Step S605), the operations in which the security policy loading unit 113a loads the corresponding security policy (Step S606 to Step S609) are additionally performed. The operations from Step S601 to Step S605 illustrated in FIG. 20 are identical to the operations from Step S101 to Step S105 illustrated in FIG. 7. In the third embodiment, upon obtaining an add-on identifier at Step S605, the add-on loading unit 111 sends that add-on identifier to the security policy loading unit 113a and issues a load request for loading the corresponding security policy.

By referring to the received add-on identifier, the security policy loading unit 113a performs conversion in the file name of the corresponding security policy and retrieves the security policy file (Step S606). For example, if the naming rule for the file names of security policies is decided as "identifier.cfg"; then, regarding the add-on having the identifier "video/dlna-player", it becomes possible to convert the file name simply as "video/dlna-player.cfg".

Then, the security policy loading unit 113a determines whether or not the security policy corresponding to the add-on identifier obtained at Step S605 was retrieved (i.e., whether or not the security policy file corresponding to the identifier obtained at Step S605 was present) (Step S607). If such a security policy file is not present (No at Step S607), the security policy loading unit 113a retrieves a default security policy that is set in advance (Step S608). This default security policy is set to a simple policy such as refusing the calling of all functions or allowing the calling of all functions.

On the other hand, when the corresponding security policy file is present (Yes at Step S607), the system control proceeds to Step S609 while bypassing Step S608. Then, the security policy loading unit 113a stores, in the main memory 12, the security policy retrieved at Step S606 or Step S607 in a corresponding manner with the add-on identifier (Step S609), and returns the operation control to the add-on loading unit 111. The subsequent operations, that is, the operations from Step S610 to Step S613 illustrated in FIG. 20 are identical to the operations from Step S106 to Step S109 illustrated in FIG. 7.

Figure 21:
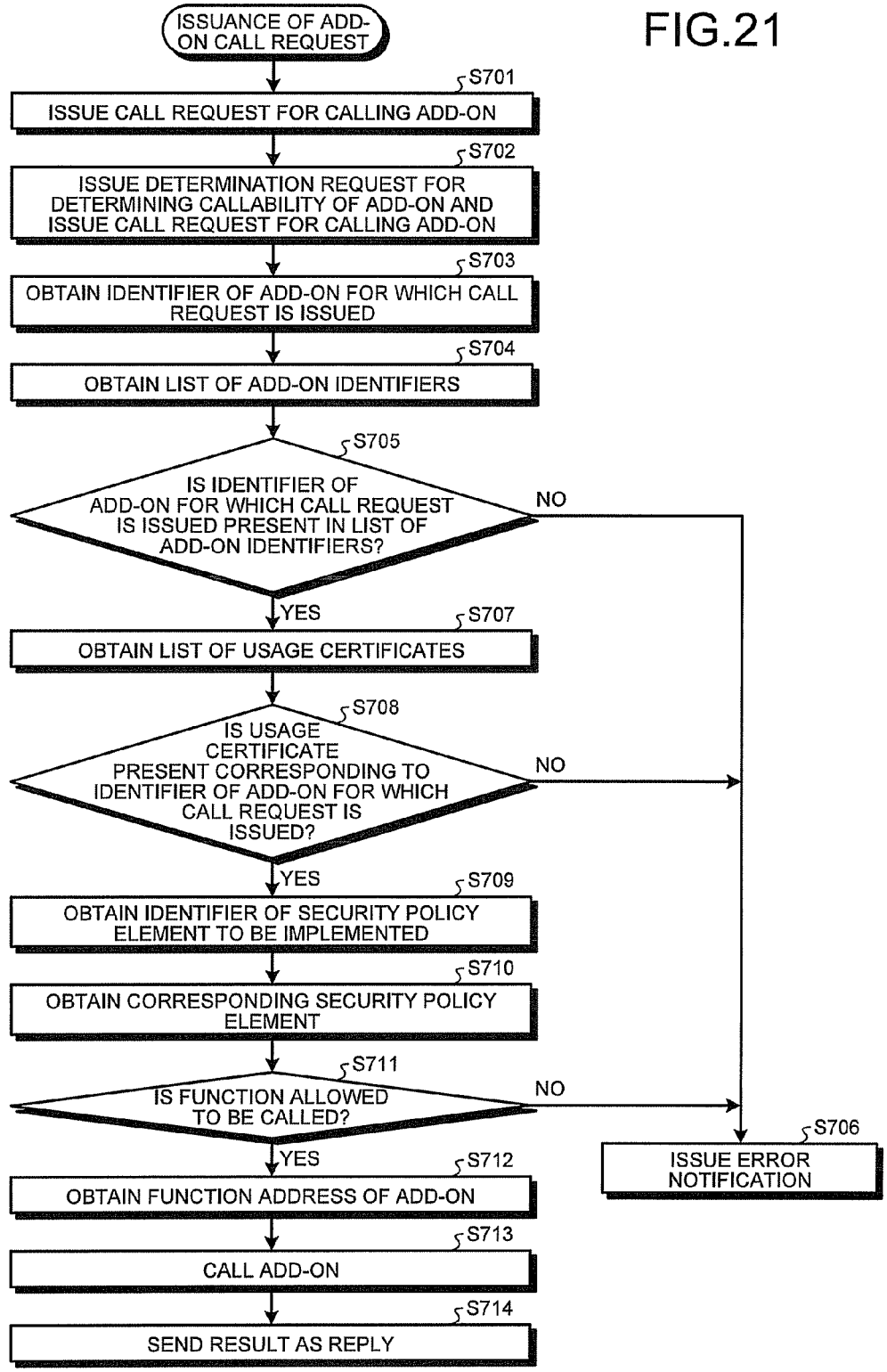
FIG. 21 is a flowchart for explaining a sequence of operations performed at the time of calling an add-on according to the third embodiment.

FIG. 21 is a flowchart for explaining a sequence of operations performed at the time of calling an add-on according to the third embodiment. As compared to the sequence of operations illustrated in FIG. 10 according to the first embodiment; the sequence of operations illustrated in FIG. 21 differs in the fact that, after it is determined that there exists a usage certificate corresponding to the add-on for which a call request is issued (Yes at Step S708), additional operations are performed in which the security policy element corresponding to the add-on for which a call request is issued is obtained, and whether or not that add-on is allowed to be used is determined by referring to the usage certificate and the security policy of that add-on (Step S709 to Step S711). Meanwhile, the operations from Step S701 to Step S708 illustrated in FIG. 21 are identical to the operations from Step S401 to Step S408 illustrated in FIG. 10.

In the third embodiment, in order to obtain the contents of the security policy element to be implemented, when it is determined that there exists a usage certificate corresponding to the add-on for which a call request is issued (Yes at Step S708), the add-on callability determining unit 122-3 obtains the identifier of the security policy element that is to be implemented and that is written in the application configuration information (Step S709). Then, the add-on callability determining unit 122-3 sends the security policy element identifier that is obtained and the add-on identifier to the security policy analyzing unit 113b, and issues a get request for obtaining the corresponding security policy element. Subsequently, from the security policies stored in the main memory 12 by the add-on callability determining unit 122-3, the security policy analyzing unit 113b sends the appropriate security policy element as reply (Step S710).

Depending on whether or not the function name to be called is present in the security policy element that is obtained, or, when the function name of the security policy element is specified as a condition, depending on whether or not the function name to be called satisfies that condition; the add-on callability determining unit 122-3 determines whether or not that function is allowed to be called (Step S711). When it is determined that the function is not allowed to be called (No at Step S711), the add-on callability determining unit 122-3 sends an error notification to the add-on function call requesting unit 220 (Step S706). In contrast, when it is determined that the function is allowed to be called (Yes at Step S711), the add-on callability determining unit 122-3 sends the add-on identifier, the function name, and the argument to be passed to the function to the add-on calling unit 112; and issues a call request for calling the add-on. The subsequent operations, that is, the operations from Step S712 to Step S714 illustrated in FIG. 21 are identical to the operations from Step. S409 to Step S411 illustrated in FIG. 10.

As described above, according to the third embodiment, in the application configuration information, the usage certificate list is provided along with the information regarding the security policies. Hence, the contents of each add-on that is allowed to be used in a web application can be limited in units of individual functions included in that add-on. Moreover, the identifiers of the security policies are specified in the usage certificate list of the application configuration information and the security policies of the add-ons are made to be manageable using the identifiers. Hence, when the add-on developer needs to change the security policy of an add-on that is allowed to be used, the usage certificate list in the web application need not be updated. Instead, the security policy can be changed only by updating the security policy of the add-on that is allowed to be used. Thus, according to the third embodiment, it becomes possible to implement the revoke function for web applications.

Meanwhile, in the third embodiment, in an identical manner to the first embodiment, it is explained that the application configuration information is specified in a page file. However, alternatively, in an identical manner to the second embodiment, the application configuration information can also be provided as a separate configuration file that is independent of usual page files.

Fourth Embodiment

Explained below is a fourth embodiment. In the first to third embodiments described above, safety verification of add-ons with respect to usage certificates is not performed. Because of that, there is a risk that an application developer with harmful intent may be able to attach unauthorized usage certificates of add-ons to the page files or the configuration file in the own web application, which may lead to unauthorized use of those add-ons. In that regard, in the fourth embodiment, it is ensured that a reliable person such as an add-on creator issues valid usage certificates of add-ons having signatures for each web application, and it is ensured that an application developer includes the usage certificates of those valid add-ons in the application configuration information. Moreover, in the fourth embodiment, an information processing apparatus 10-4 performs integrity verification regarding the usage certificates of add-ons with the aim of preventing abuse by the add-on developer of unintended add-ons.

Figure 22:
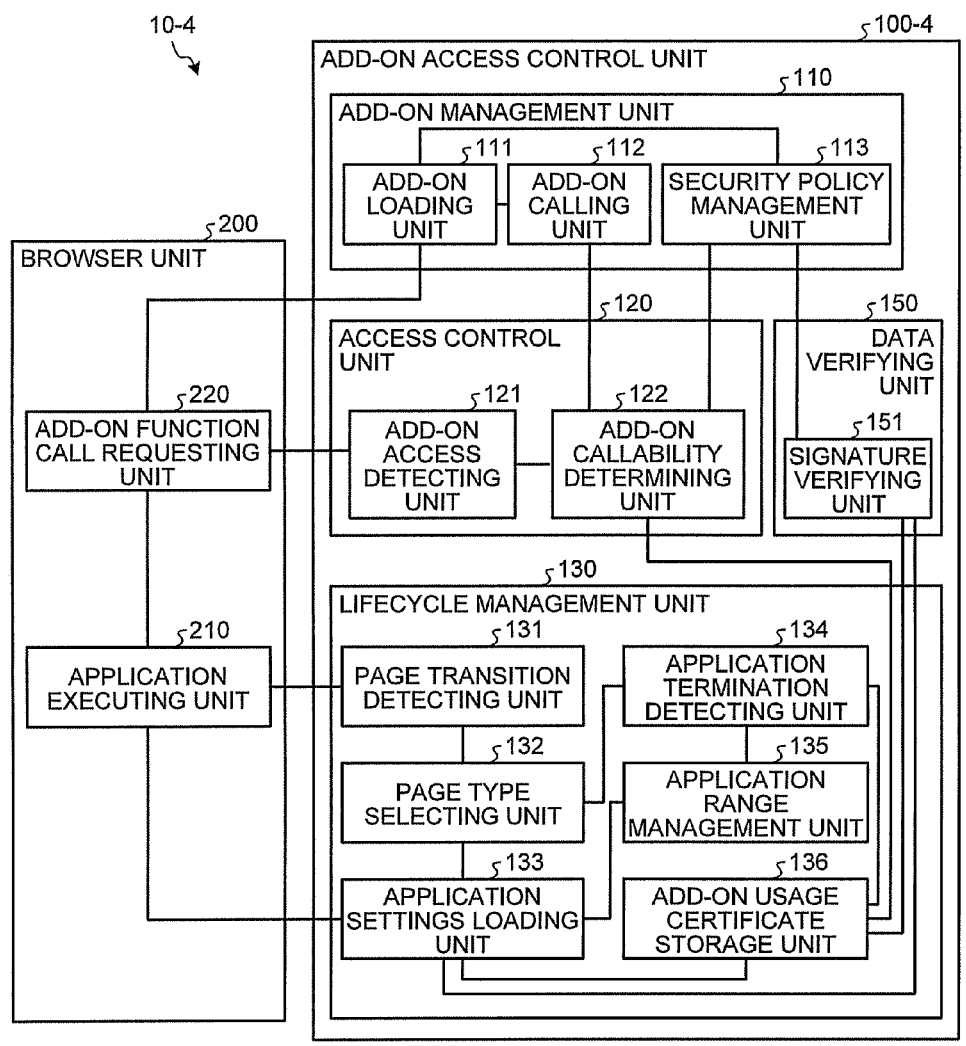
FIG. 22 is a functional block diagram illustrating a functional configuration implemented inside an information processing apparatus according to a fourth embodiment.

FIG. 22 is a functional block diagram illustrating a functional configuration implemented inside the information processing apparatus 10-4 according to the fourth embodiment. As compared to the configuration illustrated in FIG. 15 according to the third embodiment, the configuration illustrated in FIG. 22 differs in the fact that an add-on access control unit 100-4 additionally includes a data verifying unit 150. In the following explanation, the constituent elements identical to the first to third embodiments are referred to by the same reference numerals and the explanation thereof is not repeated. Thus, the following explanation is given only regarding the characteristics of the fourth embodiment.

Figure 23:
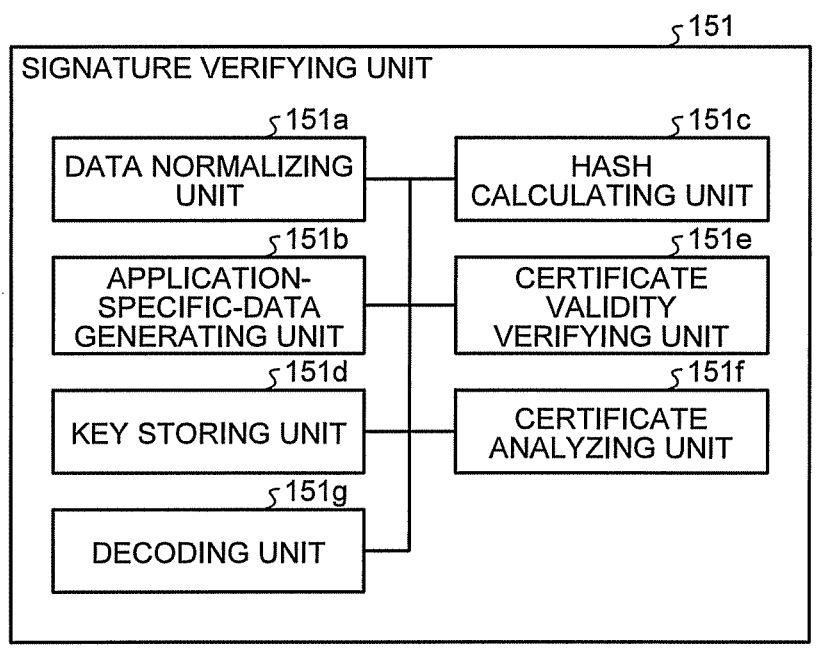
FIG. 23 is a block diagram of an internal configuration of a signature verifying unit in the information processing apparatus according to the fourth embodiment.

The data verifying unit 150 includes a signature verifying unit 151. FIG. 23 is a block diagram of an internal configuration of the signature verifying unit 151. As illustrated in FIG. 23, the signature verifying unit 151 includes a data normalizing unit 151a, an application-specific-data generating unit 151b, a hash calculating unit 151c, a key storing unit 151d, a certificate validity verifying unit 151e, a certificate analyzing unit 151f, and a decoding unit 151g.

FIG. 24 is a diagram illustrating an exemplary data structure of a security policy loaded by the security policy loading unit 113a according to the fourth embodiment. As compared to the data structure of a security policy illustrated in FIG. 17A according to the third embodiment, the data structure illustrated in FIG. 24 differs in the fact that certificate verification public keys are included. In the fourth embodiment, verification of usage certificates is done using the certificate verification public keys. For each add-on or for each add-on creator, a certificate verification public key is generated. As far as the secret key corresponding to a certificate verification private key is concerned, the secret key is held only by the add-on creator and is used at the time of creating usage certificate verification data that is attached to the usage certificates of the add-ons specified in the application configuration information.

FIG. 25 is a diagram illustrating an exemplary data structure of the application configuration information according to the fourth embodiment. As compared to the application configuration information illustrated in FIG. 18A according to the third embodiment, the application configuration information illustrated in FIG. 25 differs in the fact that usage certificate verification data is specified therein. For the usage certificate of each add-on, a single set of usage certificate verification data is specified.

The signature verifying unit 151 verifies the usage certificates specified in the application configuration information. More particularly, in the signature verifying unit 151, the data normalizing unit 151a performs normalization of the add-on usage certificates. Then, the post-normalization data is synthesized with the data generated by the application-specific-data generating unit 151b. The hash calculating unit 151c of the signature verifying unit 151 then calculates hash values of the data. Moreover, the decoding unit 151g decodes the hash values, which are attached to the add-on usage certificates, using the certificate verification public keys of add-ons stored by the key storing unit 151d, and performs tampering verification by comparing the decoded hash values with the hash values calculated by the hash calculating unit 151c. Besides, as per the requirement, it is also possible to use the certificate validity verifying unit 151e to verify the validity period of the usage certificates or to verify the validity based on a revoke list.

In the fourth embodiment, the usage certificate of an add-on contains at least the following information: the hash value encoded by the secret key of that add-on (i.e., the usage certificate verification data); the identifier of that add-on; and the identifier of the security policy element for management the corresponding security policy. In the signature verifying unit 151, the certificate analyzing unit 151f coordinates with the application-specific-data generating unit 151b and performs tampering verification of the usage certificates of add-ons. Given below is the more detailed explanation regarding the operations performed by the signature verifying unit 151 that is characteristic of the fourth embodiment.

The certificate analyzing unit 151f receives the application configuration information and analyzes the usage certificates of add-ons. When a plurality of usage certificates is specified in the application configuration information, the certificate analyzing unit 151f separates the usage certificates. Then, in cooperation with the data normalizing unit 151a, the application-specific-data generating unit 151b, the hash calculating unit 151c, the key storing unit 151d, the certificate validity verifying unit 151e, and the decoding unit 151g; the certificate analyzing unit 151f determines whether or not any usage certificate is tampered or whether or not a usage certificate is issued for the web application currently being executed. Moreover, when a usage certificate is determined to be valid depending on the determination results, the certificate analyzing unit 151f stores that usage certificate in the main memory 12.

The data normalizing unit 151a receives usage certificate data and performs normalization thereof. Meanwhile, the usage certificate or the security policy of an add-on can be written using a data description language such as the extensible markup language (XML). In a data description language such as the XML; even when the order of data is different, there are times when it makes the same sense, thereby making it necessary to perform data normalization depending on the operation. In such a case, the data normalizing unit 151a is used. However, when the usage certificates of add-ons need not be normalized, the data normalizing unit 151a becomes redundant.

The application-specific-data generating unit 151b generates data that is specific to a web application. As the application-specific data, for example, it is possible to use the hash value of the URL list specified in the application configuration information or to use the web application ID having a signature. Moreover, in the case of providing the application configuration information in an independent configuration file as done in the second embodiment, the URL of the configuration file can be used as the application-specific data. However, it is necessary to ensure that the application-specific data cannot be faked or copied by another person.

The hash calculating unit 151c calculates hash values of the data obtained by synthesizing the data subjected to normalization by the data normalizing unit 151a with the data generated by the application-specific-data generating unit 151b. As the calculation algorithm for calculating hash values, commonly known algorithms such as SHA1 or MD5 can be used. As the storage format of the hash values, it is possible to use the existing formats such as X.509 or XML Signature.

The decoding unit 151g extracts the encoded hash value from the data stored in a usage certificate and decodes that hash value with key data (i.e., a certificate verification public key) obtained from the key storing unit 151d. As the encoding/decoding algorithm, it is possible to make use of a known public-key cryptography mechanism such as the RSA public-key cryptography.

In response to an instruction, the key storing unit 151d stores therein or obtains the certificate verification public key corresponding to each add-on.

The certificate validity verifying unit 151e determines whether or not a usage certificate is valid. As the method of determination, for example, when validity period data is specified in the usage certificate, it is possible to compare the validity period data with the current date and time and accordingly determine whether or not the usage certificate is within the validity period. Besides, it is also possible to separately provide the revoke list of usage certificates and accordingly determine whether or not a usage certificate is valid. Meanwhile, it there is no need to revoke the usage certificates that do not satisfy conditions, the certificate validity verifying unit 151e becomes redundant.

Figure 26:
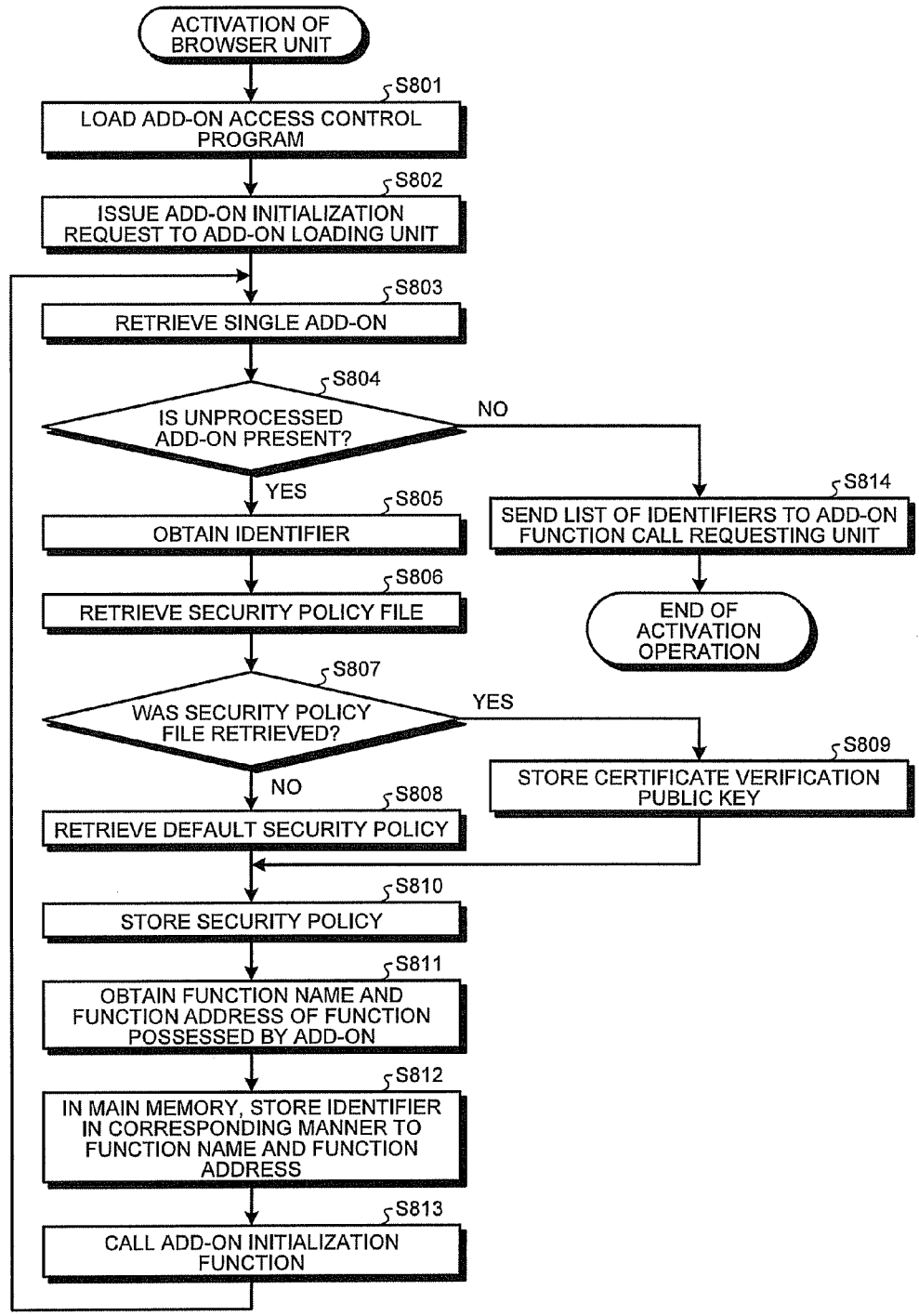
FIG. 26 is a flowchart for explaining a sequence of operations performed at the time of activation according to the fourth embodiment.

FIG. 26 is a flowchart for explaining a sequence of operations performed when the browser unit 200 is activated according to the fourth embodiment. As compared to the sequence of operations illustrated in FIG. 20 according to the third embodiment, the sequence of operations illustrated in FIG. 26 differs in the fact that the following operation is additionally performed. That is, when the security policy file is present corresponding to the identifier obtained by the security policy loading unit 113a at Step S805 (Yes at Step S807), the key storing unit 151d of the signature verifying unit 151 stores the certificate verification public key corresponding to the add-on identified by the identifier that is obtained at Step S805 (Step S809). Meanwhile, the operations from Step S801 to Step S807 illustrated in FIG. 26 are identical to the operations from Step S601 to Step S608 illustrated in FIG. 20.

In the fourth embodiment, when the security policy files are present corresponding to the identifiers obtained by the security policy loading unit 113a at Step S805 (Yes at Step S807); in order to store the certificate verification public key for each add-on, the security policy loading unit 113a calls the key storing unit 151d and sends it the identifier and the security policy data of each add-on. Then, the key storing unit 151*d* stores the key data (i.e., the certificate verification public key), which is specified in each security policy, in the main memory 12 in a corresponding manner to the identifier of that add-on (Step S809). With that, the key data for each add-on gets stored in the main memory 12 and it becomes possible to retrieve a set of key data using an add-on identifier. The subsequent operations, that is, the operations from Step S810 to Step S814 illustrated in FIG. 26 are identical to the operations from Step S609 to Step S613 illustrated in FIG. 20.

Figure 27:
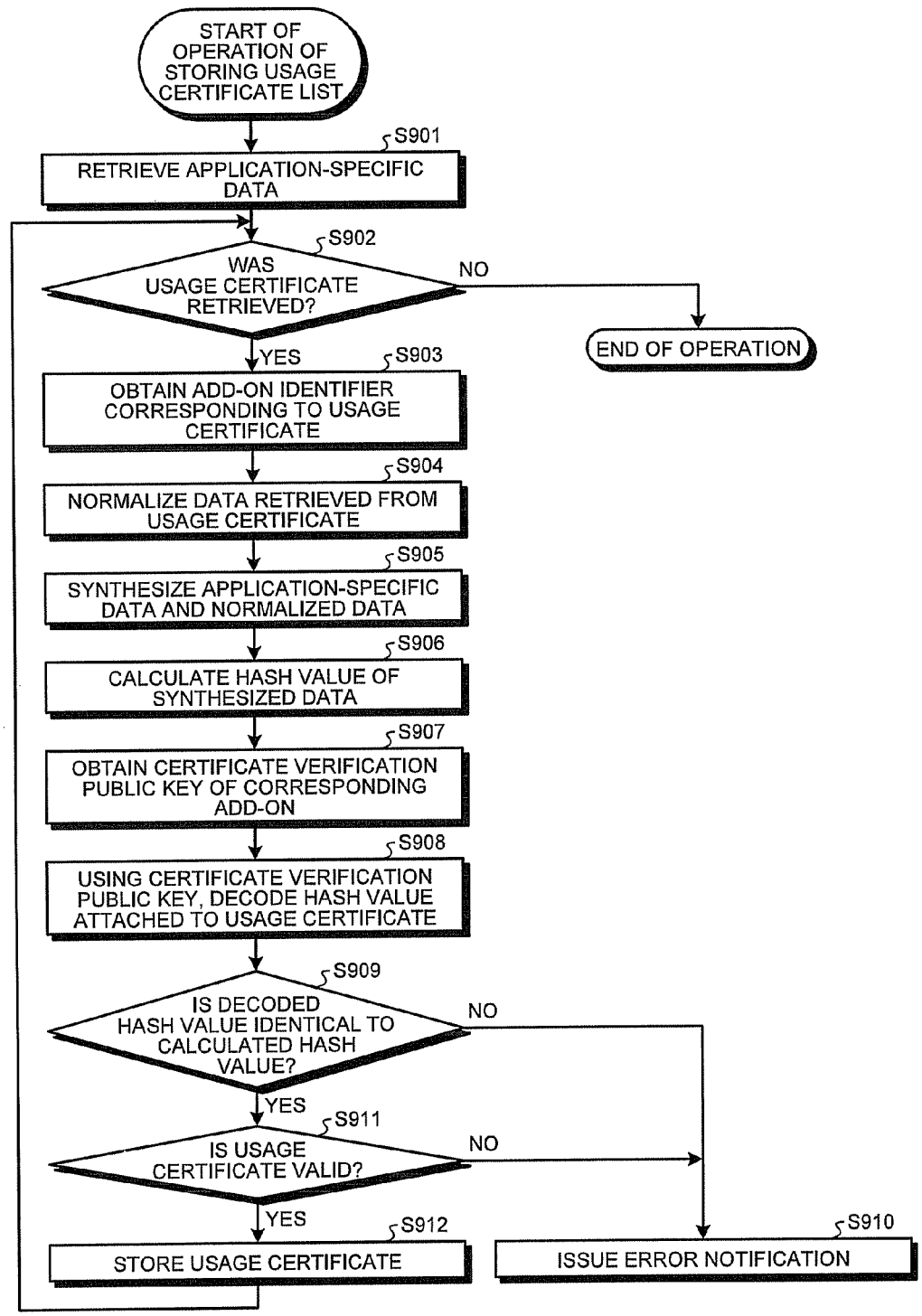
FIG. 27 is flowchart for explaining in detail an operation of storing a usage certificate list according to the fourth embodiment.

FIG. 27 is flowchart for explaining the operation of storing the usage certificate list for add-ons (i.e., the operation corresponding to Step S309 illustrated in FIG. 9) from among the sequence of operations performed at the time of page transition according to the fourth embodiment. Of the sequence of operations performed at the time of page transition according to the fourth embodiment, the operations other than the operation of storing the usage certificate list for add-ons are identical to the operations illustrated in FIG. 9 according to the first embodiment.

At the start of the operation of storing the usage certificate list; firstly, the certificate analyzing unit 151*f* of the signature verifying unit 151 issues a request to the application-specific-data generating unit 151*b* for generating application-specific data. Then, the application-specific-data generating unit 151*b* retrieves application-specific data and sends it as reply to the certificate analyzing unit 151*f* (Step S901). As the application-specific data, for example, it is possible to use the hash value of the URL list specified in the application configuration information or the web application ID having a signature that cannot be faked or copied by another person. Moreover, in the case of providing the application configuration information in an independent configuration file as done in the second embodiment, the URL of the configuration file can be used as the application-specific data. Such application-specific data is used in confirming the web application for which the usage certificate of an add-on is issued and in confirming that the usage certificate of an add-on of a different application is not used in an unauthorized manner.

Subsequently, in order to verify the usage certificate of each add-on, the certificate analyzing unit 151*f* retrieves a single usage certificate from the usage certificate list specified in the application configuration information, and determines whether or not the usage certificate was retrieved (Step S902). In case the usage certificate could not be retrieved (No at Step S902), the operations are ended. However, when the usage certificate could be retrieved (Yes at Step S902), the certificate analyzing unit 151*f* obtains, from the data of that usage certificate, the identifier of the corresponding add-on (Step S903). Moreover, the certificate analyzing unit 151*f* extracts a predetermined portion of the usage certificate (i.e., a portion that if tampered would cause trouble; in the example of the application configuration information illustrated in FIG. 25, the data of the corresponding add-on identifier or the data of the corresponding security policy element identifier) and sends that portion to the normalizing unit 151*a* for data normalization. Then, the normalizing unit 151*a* normalizes the data received from the certificate analyzing unit 151*f* and sends the normalization result as reply to the certificate analyzing unit 151*f* (Step S904). In the calculation at this stage, the encoded hash value data (i.e., the verification data illustrated in FIG. 25) is not taken into account.

Furthermore, the certificate analyzing unit 151*f* synthesizes the application-specific data that is extracted at Step S901 with the normalized data that is normalized at Step S904 (Step S905). When the data is in the form of character string data, then the normalized data that is normalized at Step S904 can be simply concatenated at the end of the application-specific data that is extracted at Step S901. The data obtained by means of synthesis serves as the source data for tampering detection.

Moreover, in order to generate verification data, the certificate analyzing unit 151*f* sends the synthesized data that is synthesized at Step S905 to the hash calculating unit 151*c* for hash calculation. According to a hash calculation algorithm, the hash calculating unit 151*c* calculates the hash value and sends it as reply to the certificate analyzing unit 151*f* (Step S906).

Furthermore, in order to decode the encoded hash value (i.e., the usage certificate verification data) that is attached to a usage certificate, the certificate analyzing unit 151*f* sends the identifier of the add-on to the key storing unit 151*d*, and then the key storing unit 151*d* obtains the key data (i.e., the certificate verification public key) corresponding to the add-on stored at the time of activation (Step S907). Subsequently, to the decoding unit 151*g*, the certificate analyzing unit 151*f* sends the key data obtained at Step S907 and the decoded hash value (i.e., the verification data illustrated in FIG. 25) attached to the usage certificate, and issues a normalization request. Meanwhile, the decoded hash value (i.e., the verification data illustrated in FIG. 25) attached to the usage certificate points to the hash value that is encoded with an encoding key corresponding to the abovementioned certificate verification public key at the time of the creation of the usage certificate by the add-on creator. The decoding unit 151*g* decodes the encoded hash value using the certificate verification public key and sends the decoded hash key as reply to the certificate analyzing unit 151*f* (Step S908).

The certificate analyzing unit 151*f* compares the hash value calculated at Step S906 with the hash value decoded at Step S908, and determines whether or not the two hash values are identical (Step S909). If the two hash values are not identical (No at Step S909), then the certificate analyzing unit 151*f* determines that either the usage certificate is tampered or the usage certificate of an add-on for another web application is being used without authorization, and issues an error notification (Step S910). On the other hand, when the two hash values are identical (Yes at Step S909); the certificate analyzing unit 151*f* determines that the usage certificate of that add-on is valid.

Thus, it is determined in advance about what data is to be used as the application-specific data or what portion of the certificate data is to be used, or it is determined in advance about what algorithm is to be used as the hash calculating algorithm or as the encoding algorithm. Then, at the time of issuing the usage certificate of an add-on to an application creator, the creator of that add-on generates encoded hash values (i.e., the verification data illustrated in FIG. 25) according to the determined rules (i.e., the application-specific data is synthesized with a portion of the certificate data; the hash value of the synthesized data is calculated; and that hash value is encoded with the encoding key held by the add-on creator). With that, the abovementioned operations can be performed to determine whether or not the usage certificate of that add-on is used without authorization.

Moreover, when the certificate validity verifying unit 151*e* is disposed, the usage certificate data is sent to the certificate validity verifying unit 151*e* with a request for determining whether or not the usage certificate is valid. When the usage certificate contains, for example, the validity period data, the certificate validity verifying unit 151*e* compares the validity period data with the current date and time and accordingly determines whether or not the usage certificate is within the validity period. Alternatively, when the revoke list of usage certificates is provided, the certificate validity verifying unit 151e refers to the data in the revoke list and accordingly determines whether or not the usage certificate is valid. After verifying the validity of the usage certificate data, the certificate validity verifying unit 151e sends the verification result as reply to the certificate analyzing unit 151f (Step S911). The certificate analyzing unit 151f receives the verification result; and, if the usage certificate is not valid (No at Step S911), issues an error notification (Step S910). On the other hand, if the usage certificate is valid (Yes at Step S911); the certificate analyzing unit 151f stores the usage certificate in the main memory 12 (Step S912). Then, the system control returns to Step S902. Subsequently, the operations starting from Step S902 are repeated for the usage certificates of all add-ons. As a result, the usage certificates of only valid add-ons get stored in the main memory 12.

As described above, according to the fourth embodiment, since integrity verification is performed with respect to the usage certificates of add-ons, it becomes possible to prevent the abuse of add-ons in an effective manner.

Meanwhile, in the fourth embodiment, in an identical manner to the first embodiment, it is explained that the application configuration information is specified in a page file. However, alternatively, in an identical manner to the second embodiment, the application configuration information can also be provided as a separate configuration file that is independent of usual page files.

Fifth Embodiment

Explained below is a fifth embodiment. In a web application, a plurality of applications can be divided in executable units called tabs or windows and can be subjected to parallel execution. Such a single executable unit is referred to as a context. In the first to fourth embodiments, to execute a plurality of contexts simultaneously, it becomes necessary to dispose the same number of the browser unit 200 or the add-on access control unit 100 as the number of contexts. That is similar to the condition of launching a plurality of browsers, which worsens the efficiency in using resources such as the main memory 12. In that regard, in the fifth embodiment, an add-on access control unit 100-5 is equipped with the additional function of identifying the contexts being executed. Hence, even while performing parallel execution of a plurality of contexts; it becomes possible not only to minimize overlapping of resources but also to perform operations in an efficient manner.

Figure 28:
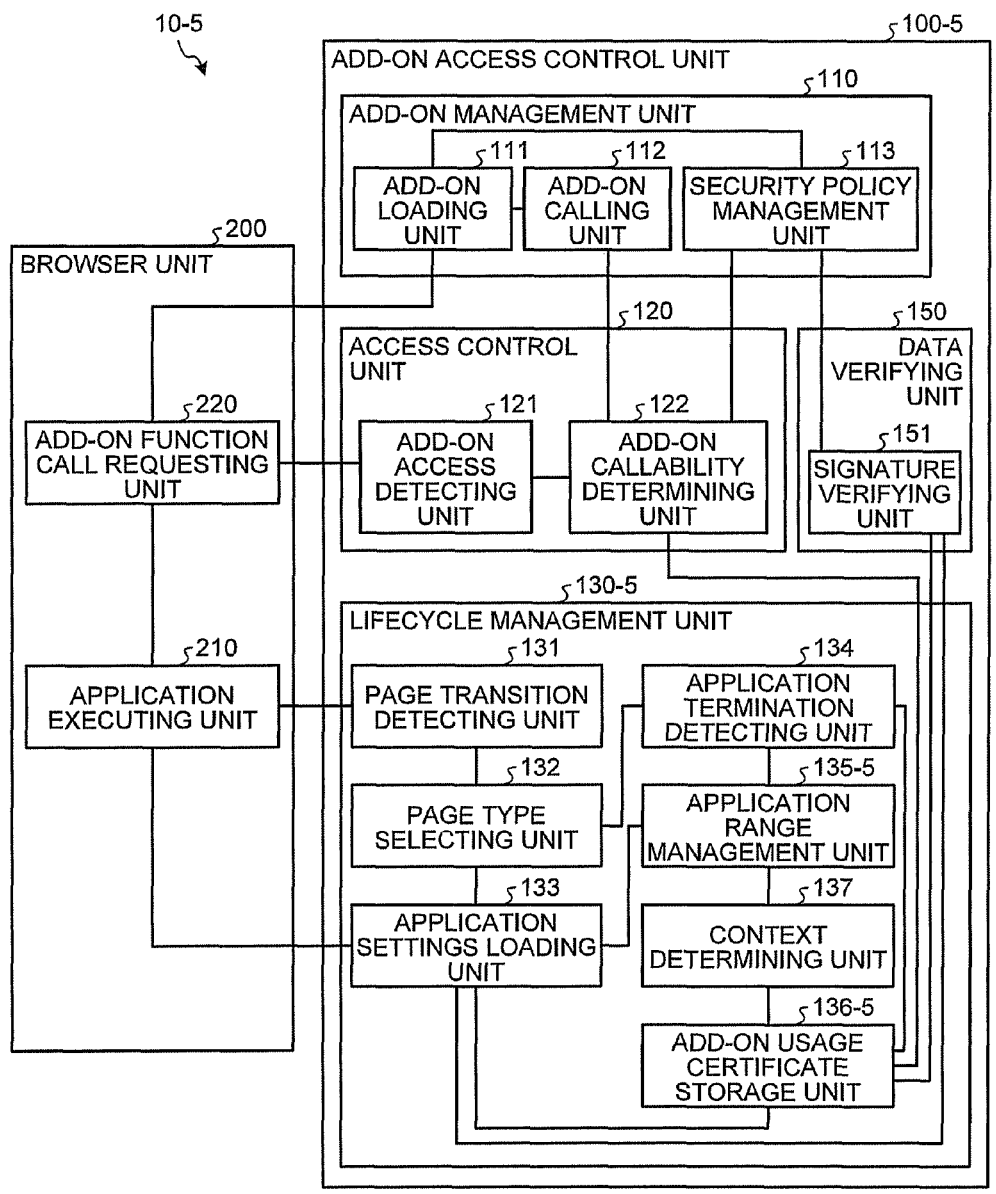
FIG. 28 is a functional block diagram illustrating a functional configuration implemented inside an information processing apparatus according to a fifth embodiment.

FIG. 28 is a functional block diagram illustrating a functional configuration implemented inside the information processing apparatus 10-5 according to the fifth embodiment. As compared to the configuration illustrated in FIG. 22 according to the fourth embodiment, the configuration illustrated in FIG. 28 differs in the fact that a lifecycle management unit 130-5 of the add-on access control unit 100-5 additionally includes a context determining unit 137. In the following explanation, the constituent elements identical to the first to fourth embodiments are referred to by the same reference numerals and the explanation thereof is not repeated. Thus, the following explanation is given only regarding the characteristics of the fifth embodiment.

At the occurrence of an event such as page transition or add-on calling, the context determining unit 137 determines the contexts at which that event has occurred. The context determining unit 137 receives a context identifier get instruction and sends as reply the context identifiers, each of which is expressed as a number or a character string unique to a particular context.

In the fifth embodiment, an application range management unit 135-5 receives a store instruction, a get instruction, or a delete instruction regarding the URL list specified in the application configuration information; and accordingly performs operations on a context-by-context basis. That is, upon receiving a store instruction regarding the URL list, the application range management unit 135-5 obtains context identifiers from the context determining unit 137 and stores the URL list received from the invoker in the main memory 12 in a corresponding manner to the context identifiers. Moreover, upon receiving a get instruction regarding a URL list; of the URL lists stored in the main memory 12, the application range management unit 135-5 sends as reply the URL list corresponding to the context identifiers obtained from the context determining unit 137. Furthermore, upon receiving a delete instruction regarding the URL list; of the URL lists stored in the main memory 12, the application range management unit 135-5 deletes the URL list corresponding to the context identifiers obtained from the context determining unit 137.

In the fifth embodiment, an add-on usage certificate storage unit 136-5 receives a store instruction, a get instruction, or a delete instruction regarding the usage certificate list; and accordingly performs operations on a context-by-context basis. That is, upon receiving a store instruction regarding the usage certificate list, the add-on usage certificate storage unit 136-5 obtains context identifiers from the context determining unit 137 and stores the usage certificate list received from the invoker in the main memory 12 in a corresponding manner to the context identifiers. Moreover, upon receiving a get instruction regarding the usage certificate list; of the usage certificate list stored in the main memory 12, the add-on usage certificate storage unit 136-5 sends as reply the usage certificate list corresponding to the context identifiers obtained from the context determining unit 137. Furthermore, upon receiving a delete instruction regarding the usage certificate list; of the usage certificate list stored in the main memory 12, the add-on usage certificate storage unit 136-5 deletes the usage certificate list corresponding to the context identifiers obtained from the context determining unit 137.

As described above, the information processing apparatus 10-5 according to the fifth embodiment includes the context determining unit 137; and the application range management unit 135-5 and the add-on usage certificate storage unit 136-5 coordinate with the context determining unit 137 to manage, on a context-by-context basis, the URL list and the usage certificate list specified in the application configuration information.

Figure 29:
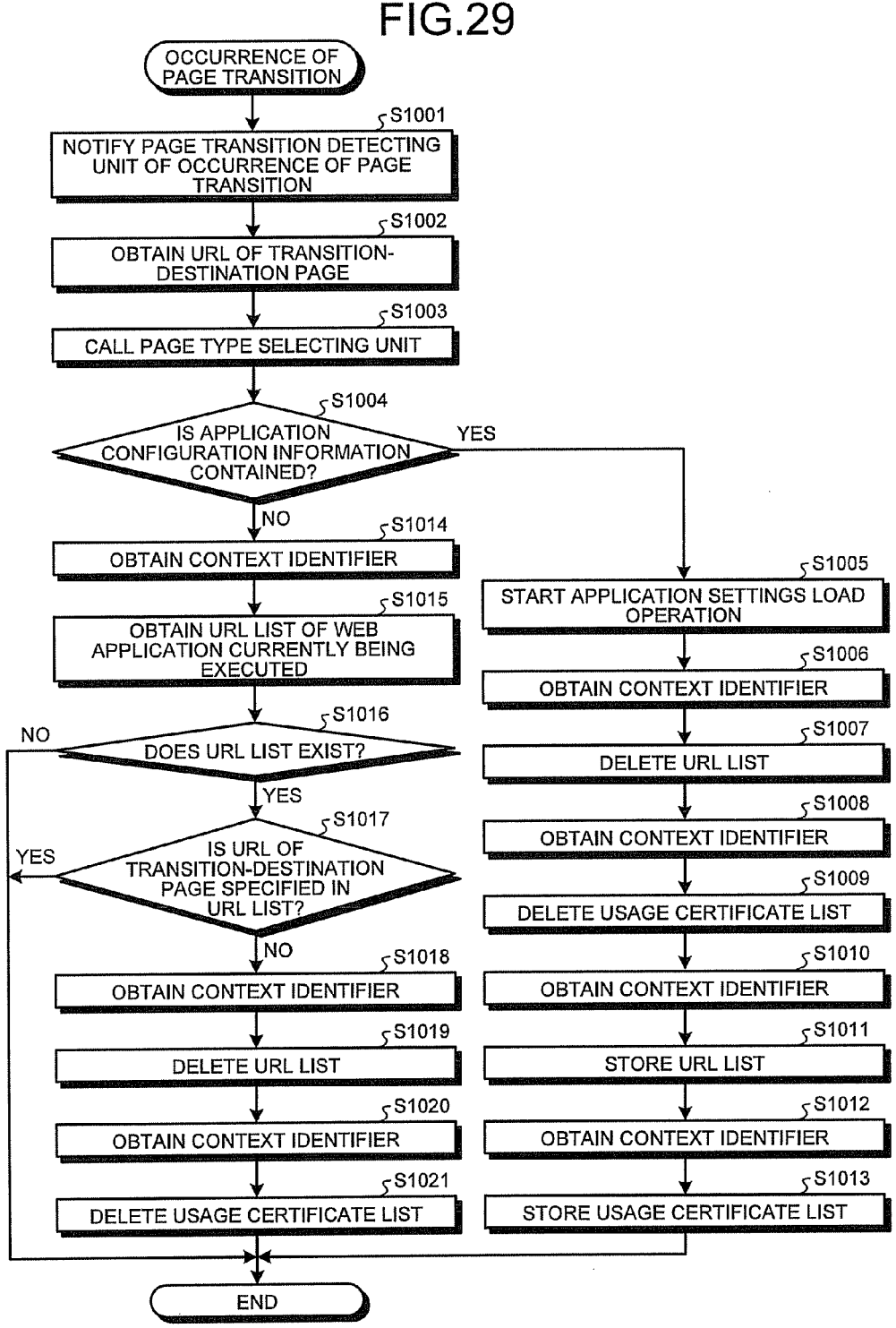
FIG. 29 is a flowchart for explaining a sequence of operations performed at the time of page transition according to the fifth embodiment.

FIG. 29 is a flowchart for explaining a sequence of operations performed at the time of page transition according to the fifth embodiment. As compared to the sequence of operations illustrated in FIG. 9 according to the first embodiment, the sequence of operations illustrated in FIG. 29 differs in the fact that an operation of obtaining contexts is additionally performed at Step S1006, Step S1008, Step S1010, Step S1012, Step S1014, Step S1018, and Step S1020. The operations from Step S1001 to Step S1005 illustrated in FIG. 29 are identical to the operations from Step S301 to Step S305 illustrated in FIG. 9.

In the fifth embodiment, when it is determined that the page file of the transition-destination page contains application configuration information (Yes at Step S1004) and when an application settings loading operation is started (Step S1005), the application settings loading unit 133 issues an URL list delete instruction to the application range management unit 135-5 for the purpose of deleting the application configuration information corresponding to the web application that was being executed at the context in which an event had occurred. In response to the URL list delete instruction issued by the application settings loading unit 133, the application range management unit 135 obtains, from the context determining unit 137, the identifier of the context in which page transition has occurred (Step S1006); and regarding the context identified by the obtained identifier, deletes the URL list specified in the application information corresponding to the web application that was being executed (Step S1007).

Subsequently, the application settings loading unit 133 issues a delete instruction to the add-on usage certificate storage unit 136-5 for deleting the usage certificate list. In response to the delete instruction issued by the application settings loading unit 133, the add-on usage certificate storage unit 136-5 obtains, from the context determining unit 137, the identifier of the context in which page transition has occurred (Step S1008); and regarding the context identified by the obtained identifier, deletes the usage certificate list specified in the application information corresponding to the web application that was being executed (Step S1009).

Moreover, in order to store the application configuration information corresponding to the web application that is to be newly executed at the context in which an event had occurred, the application settings loading unit 133 issues a store instruction to the application range management unit 135-5 for storing the URL list. In response to the store instruction issued by the application settings loading unit 133 for storing the URL list, the application range management unit 135-5 obtains, from the context determining unit 137, the identifier of the context in which page transition has occurred (Step S1010); and, of the areas secured in the main memory 12 on a context-by-context basis, stores the URL list, which is specified in the application configuration information corresponding to the new web application, in the area of the context that corresponds to the obtained identifier (Step S1011).

Subsequently, the application settings loading unit 133 issues a store instruction to the add-on usage certificate storage unit 136-5 for storing the usage certificate list. In response to the store instruction issued by the application settings loading unit 133 for storing the usage certificate list, the add-on usage certificate storage unit 136-5 obtains, from the context determining unit 137, the identifier of the context in which page transition has occurred (Step S1012); and, of the areas secured in the main memory 12 on a context-by-context basis, stores the usage certificate list, which is specified in the application configuration information corresponding to the new web application, in the area of the context that corresponds to the obtained identifier (Step S1013). With that, the URL list and the usage certificate list specified in the application configuration information corresponding to the new web application are stored in the main memory 12.

Meanwhile, when the page file of the transition-destination page does not contain application configuration information (No at Step S1004), the page type selecting unit 132 determines that the web application currently being executed is either to be continually executed or to be terminated. In order to determine whether the web application currently being executed is to be continually executed or to be terminated, the page type selecting unit 132 calls the application termination detecting unit 134 and sends the URL of the transition-destination page to the application termination detecting unit 134.

Upon receiving the URL of the transition-destination page from the page type selecting unit 132, the application termination detecting unit 134 firstly issues a get instruction to the application range management unit 135-5 for obtaining the URL list. In response to the get instruction issued by the application termination detecting unit 134 for obtaining the URL list, the application range management unit 135-5 obtains, from the context determining unit 137, the identifier of the context in which page transition has occurred (Step S1014); and, of the areas secured in the main memory 12 on a context-by-context basis, obtains the URL list stored in the area of the context corresponding to the obtained identifier and sends that URL reply as reply to the application termination detecting unit 134 (Step S1015). At that time, the application termination detecting unit 134 determines whether or not the URL list obtained by the application range management unit 135-5 exists (Step S1016). If the URL list obtained by the application range management unit 135-5 does not exist (No at Step S1016), then the operations are ended. On the other hand, when the URL list obtained by the application range management unit 135-5 exists (Yes at Step S1016), the application termination detecting unit 134 determines whether or not the URL of the transition-destination page obtained by the page type selecting unit 132 is included in that URL list (Step S1017).

When the URL of the transition-destination page is included in the URL list (Yes at Step S1007), the application termination detecting unit 134 determines that the same application is being continually executed. That marks the end of the operations. On the other hand, if the URL of the transition-destination page is not included in the URL list (No at Step S1007), the application termination detecting unit 134 determines that the web application that was being executed has terminated. Then, in order to delete the application configuration information corresponding to the web application that was being executed, the application termination detecting unit 134 issues a delete instruction to the application range management unit 135-5 for deleting the URL list. In response to the delete instruction issued by the application termination detecting unit 134 for deleting the URL list, the application range management unit 135-5 obtains, from the context determining unit 137, the identifier of the context in which page transition has occurred (Step S1018); and regarding the context identified by the obtained identifier, deletes the URL list specified in the application information corresponding to the web application that was being executed (Step S1019).

Moreover, the application termination detecting unit 134 issues a delete instruction to the add-on usage certificate storage unit 136-5 for deleting the usage certificate list. In response to the delete instruction issued by the application termination detecting unit 134 for deleting the usage certificate list, the add-on usage certificate storage unit 136-5 obtains, from the context determining unit 137, the identifier of the context in which page transition has occurred (Step S1020); and regarding the context identified by the obtained identifier, deletes the usage certificate list specified in the application information corresponding to the web application that was being executed (Step S1021).

Figure 30:
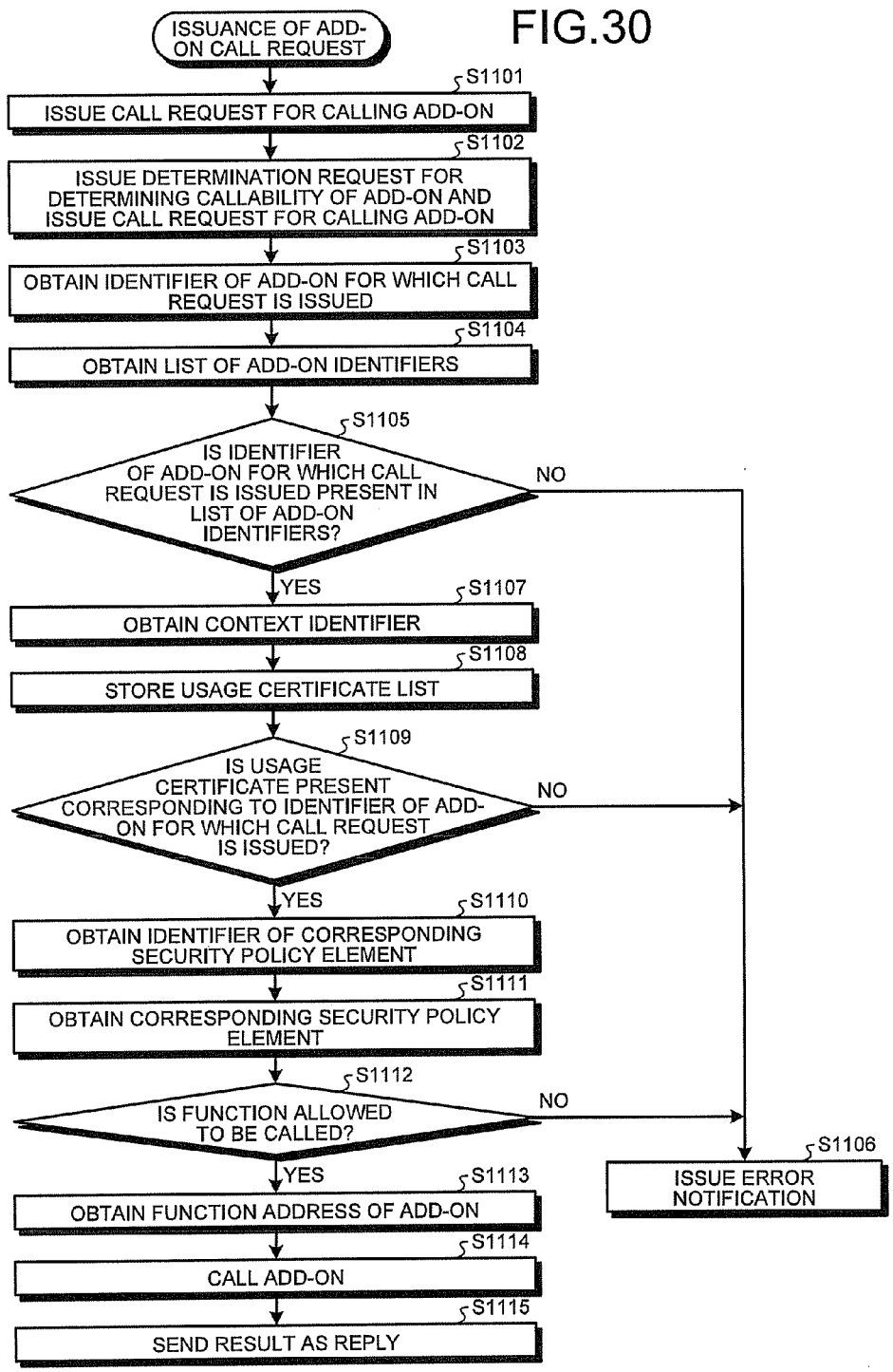
FIG. 30 is a flowchart for explaining a sequence of operations performed at the time of calling an add-on according to the fifth embodiment.

FIG. 30 is a flowchart for explaining a sequence of operations performed at the time of calling an add-on according to the fifth embodiment. As compared to the sequence of operations illustrated in FIG. 21 according to the third embodiment; the sequence of operations illustrated in FIG. 30 differs in the fact that, when it is determined that the list of add-on identifiers obtained at Step S1104 contains the identifier of the add-on for which the call request is issued (Step S1105), the access control with respect to that add-on is performed based on the add-on usage certificate held by the context in which the add-on is called. The operations from Step S1101 to Step S1106 illustrated in FIG. 30 are identical to the operations from Step S701 to Step S706 illustrated in FIG. 21.

In the fifth embodiment, when the identifier of the add-on for which the call request is issued is present in the list (Yes at Step S1105), the add-on callability determining unit 122 issues a get instruction to the add-on usage certificate storage unit 136-5 for obtaining the usage certificate. In response to the get instruction issued by the add-on callability determining unit 122 for obtaining the usage certificate, the add-on usage certificate storage unit 136-5 obtains, from the context determining unit 137, the identifier of the context in which the add-on call request is issued (Step S1107); and, of the areas secured in the main memory 12 on a context-by-context basis, obtains the usage certificate from the area of the context corresponding to the obtained identifier and sends that usage certificate list as reply to the add-on callability determining unit 122 (Step S1108). The subsequent operations, that is, the operations from Step S1109 to Step S1115 illustrated in FIG. 30 are identical to the operations from Step S708 to Step S714 illustrated in FIG. 21. With that, separate usage certificates can be used for each web application being executed in a context.

Figure 31:
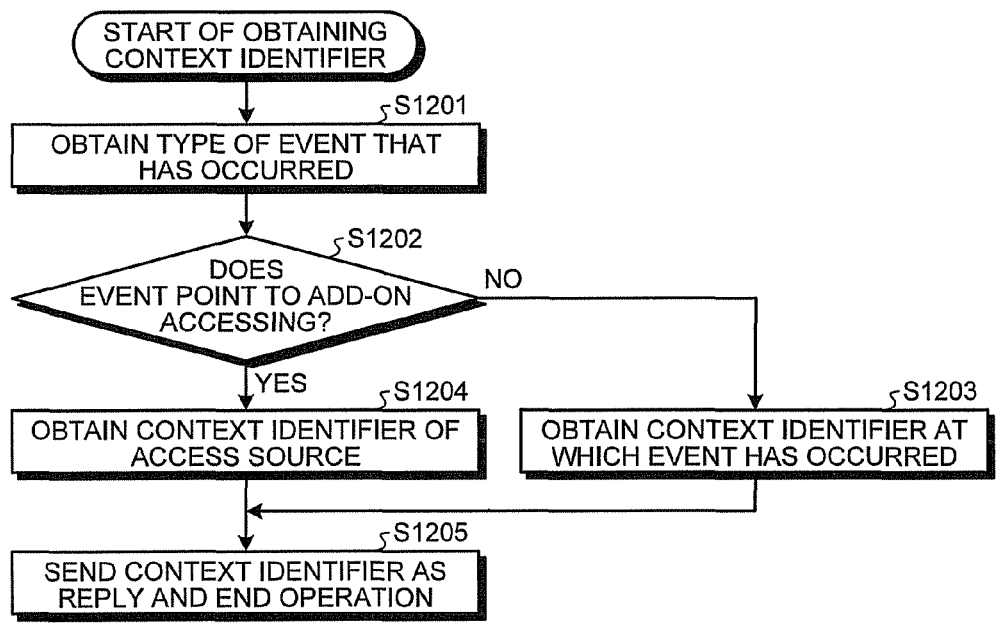
FIG. 31 is a flowchart for explaining a sequence of operations at the time of obtaining a context identifier according to the fifth embodiment.

FIG. 31 is a flowchart for explaining a sequence of operations performed at the time when the context determining unit 137 obtains a context identifier.

Upon receiving a get request for obtaining a context identifier, the context determining unit 137 firstly obtains the type of the event that has occurred (Step S1201). The event can either be page transition or be add-on accessing. Then, by referring to the type of the event obtained at Step S1201, the context determining unit 137 determines whether or not the event points to add-on accessing (Step S1202). If the event that has occurred does not point to add-on accessing, that is, if the event points to page transition (No at Step S1202); then the context determining unit 137 obtains the context identifier of the context in which the event has occurred (Step S1203).

Meanwhile, an add-on is connected to a context in the form of an object. Thus, when the event that has occurred points to an add-on accessing (Yes at Step S1202), the context determining unit 137 obtains the context identifier not of the context to which the add-on object is connected but of the context that has issued an access instruction for accessing the add-on (Step S1204). Of course, the context to which the add-on object is connected can be same as the context that has issued an access instruction for accessing the add-on. Lastly, the context determining unit 137 sends the obtained context identifier as reply to the invoker of the context determining unit 137 (Step S1205). That marks the end of the operations.

The add-ons can be managed as objects, and an add-on in a context can not only be referred to from a web application being executed in a different context but can also be called in an indirect manner from that web application. In the fifth embodiment, at the time of accessing an add-on, the context determining unit 137 determines not the context in which the add-on object is present but the context that accessed the add-on object. With that, the add-ons of a web application that has add-on usage certificates can be prevented from being indirectly used without authorization from a context of a web application that does not have the same add-on usage certificates.

Moreover, in the fifth embodiment, in the case of separating security policies or in the case of performing safety verification of security policies in cooperation with the security policy management unit 113 or the signature verifying unit 151 according to the fourth embodiment, the operation of storing usage certificates can be performed according to the flowchart illustrated in FIG. 27 and the operation at the time of activation can be performed according to the flowchart illustrated in FIG. 26.

As described above, according to the fifth embodiment, parallel execution of a plurality of web applications can be efficiently performed only by configuring the lifecycle management unit 130-5 of the add-on access control unit 100-5 to additionally include the context determining unit 137. Regarding the main memory 12 too, parallel execution of a plurality of web applications can be efficiently performed only by increasing the number storage areas for storing the URL lists and the usage certificate lists according to the number of contexts. That enables achieving enhancement in the efficiency.

In a web application, mutual accessing of objects is also possible among the contexts that are being subjected to, parallel execution. Since the add-ons are managed as objects, an add-on can be indirectly called from a web application being executed in a different context. In the fifth embodiment, at the time of accessing an add-on, the context determining unit 137 determines not the context in which the add-on object is present but the context that accessed the add-on object. With that, the add-ons of a web application that has add-on usage certificates can be prevented from being indirectly used without authorization from a context of web application that does not have the same add-on usage certificates. Moreover, it also becomes possible to prevent unauthorized access to add-ons that may happen due to accessing objects among contexts.

Meanwhile, in the fifth embodiment, in an identical manner to the first embodiment, it is explained that the application configuration information is specified in a page file. However, alternatively, in an identical manner to the second embodiment, the application configuration information can also be provided as a separate configuration file that is independent of usual page files.

Sixth Embodiment

Explained below is a sixth embodiment. In the first to fifth embodiments, a web application is determined to have started when a page file containing application configuration information is accessed. In contrast, in the sixth embodiment, a web application starts in response to a special instruction. That enables achieving simplification of the operation at the time of page transition, thereby enabling reduction in the processing load.

Figure 32:
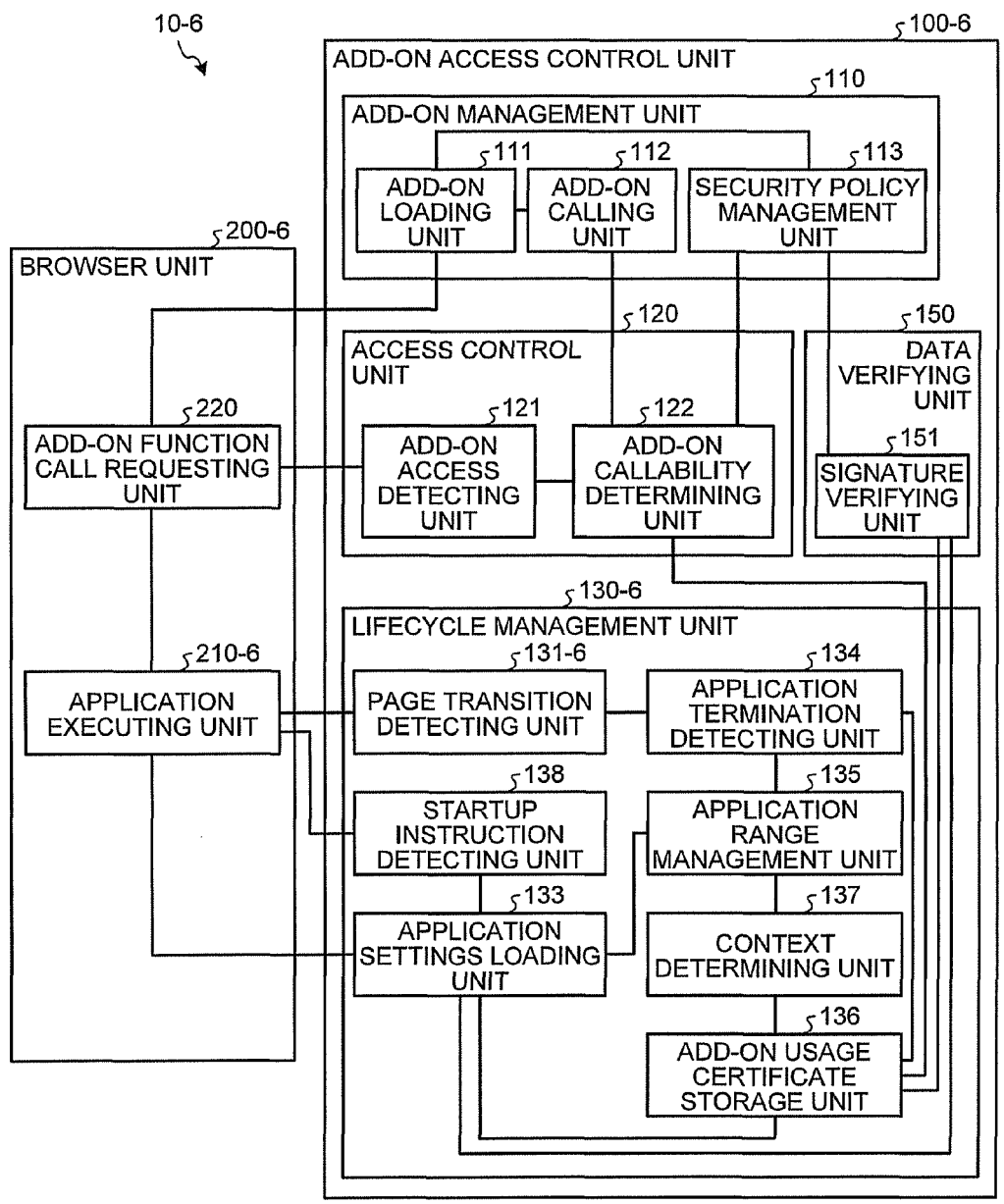
FIG. 32 is a functional block diagram illustrating a functional configuration implemented inside an information processing apparatus according to a sixth embodiment.

FIG. 32 is a functional block diagram illustrating a functional configuration implemented inside an information processing apparatus 10-6 according to the sixth embodiment. As compared to the configuration illustrated in FIG. 28 according to the fifth embodiment, the configuration illustrated in FIG. 32 differs in the fact that a lifecycle management unit 130-6 of an add-on access control unit 100-6 includes a startup instruction detecting unit 138 in place of the page type selecting unit 132. In the following explanation, the constituent elements identical to the first to fifth embodiments are referred to by the same reference numerals and the explanation thereof is not repeated. Thus, the following explanation is given only regarding the characteristics of the sixth embodiment.

In the sixth embodiment, an application executing unit 210-6 of a browser unit 200-6 has the function of calling a page transition detecting unit 131-6 at the time of page transition as well as has the function of calling the startup instruction detecting unit 138 at the time of executing an application startup instruction and sending identification information of a web application that is set as the argument of the application startup instruction. As the identification information of a web application, it is possible to use the URL of a page file (such as the page file that is initially run in the web application) specified in the application configuration information. Moreover, in the case of providing the application configuration information in an independent configuration file, the URL of the configuration file can be used as the identification information of the web application.

Based on the identification information of the web application received from the application executing unit 210-6, the startup instruction detecting unit 138 downloads the page file containing the application configuration information and obtains the application configuration information. Moreover, the startup instruction detecting unit 138 sends the application configuration information to the application settings loading unit 133 and issues a read request for reading the URL list or the usage certificate list specified in the application configuration information.

In the sixth embodiment, the page transition detecting unit 131-6 sends the identification information such as the URL of the page file received from the application executing unit 210-6 to the application termination detecting unit 134, and issues a determination request for determining whether or not the web application is to be continually executed or to be terminated. In the first to fifth embodiments, the page type selecting unit 132 determines whether or not the URL of the page file of the transition-destination page is included in the URL list of the application configuration information. However, in the sixth embodiment, that operation is not required.

Figure 33:
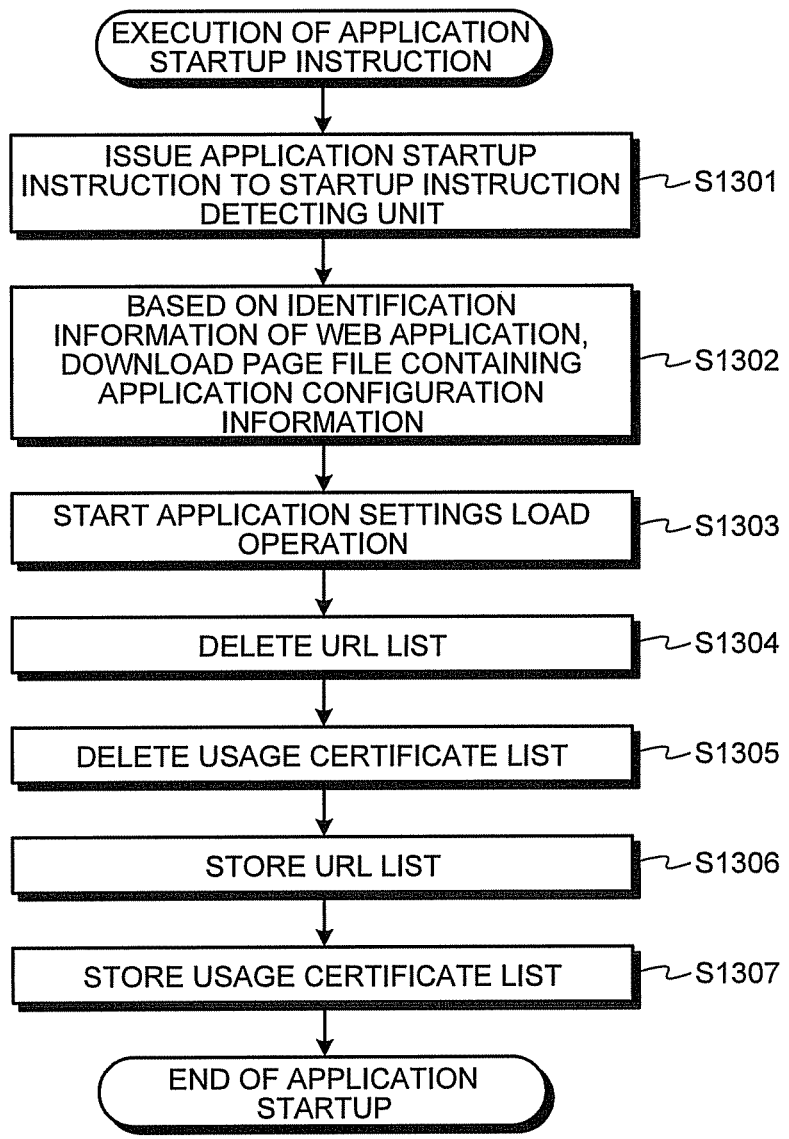
FIG. 33 is a flowchart for explaining a sequence of operations performed at the time of starting a web application according to the sixth embodiment.

FIG. 33 is a flowchart for explaining a sequence of operations performed at the time of starting a web application according to the sixth embodiment. In the sixth embodiment, a web application is started by executing an application startup instruction.

Firstly, in order to update the application configuration information, the application executing unit 210-6 issues an application startup instruction to the startup instruction detecting unit 138. At that time, the application executing unit 210-6 sends the identification information of the web application, such as the URL of the page file, which is specified as the argument of the application startup instruction (Step S1301).

Then, based on the identification information of the web application received from the application executing unit 210-6, the startup instruction detecting unit 138 downloads the page file that contains the application configuration information of that web application (Step S1302). Meanwhile, if the page file containing the application configuration information is provided as a separate configuration file, then the startup instruction detecting unit 138 downloads that configuration file.

Subsequently, the startup instruction detecting unit 138 extracts the application configuration information from the downloaded page file and sends the application configuration information to the application settings loading unit 133 for storing. With that, the application settings loading operation is started (Step S1303), in which the URL list and the usage certificate list corresponding to the web application that was being executed are deleted (Step S1304 and Step S1305), and the URL list and the usage certificate list corresponding to the web application to be newly executed are stored (Step S1306 and Step S1307).

Figure 34:
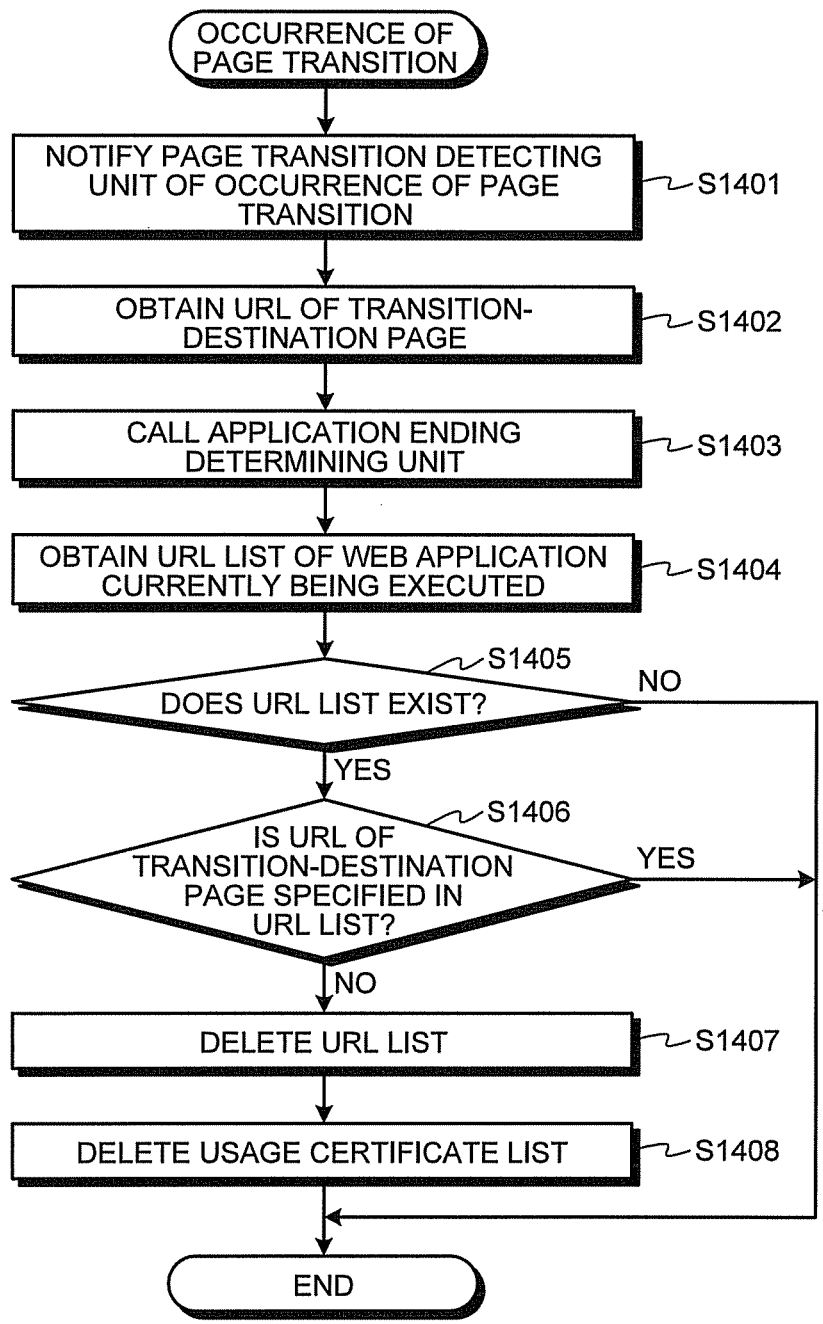
FIG. 34 is a flowchart for explaining a sequence of operations performed at the time of page transition according to the sixth embodiment.

FIG. 34 is a flowchart for explaining a sequence of operations performed at the time of page transition according to the sixth embodiment. As compared to the sequence of operations illustrated in FIG. 9 according to the first embodiment, the sequence of operations illustrated in FIG. 34 differs in the fact that the operations from Step S303 to Step S309 are not performed but an operation at Step S1403 is additionally performed. The operations at Step S1401 and Step S1402 illustrated in FIG. 34 are identical to the operations at Step S301 and Step S302 illustrated in FIG. 9.

In the sixth embodiment, as described above, a special application startup instruction is issued for starting a web-application. Hence, at the time of page transition, there is no need to determine whether or not the web application has started. Consequently, upon obtaining the URL of the transition-destination page, the page transition detecting unit 131-6 does not call the page type selecting unit 132 but directly calls the application termination detecting unit 134 (Step S1403). The subsequent operations, that is, the operations from Step S1404 to Step S1408 illustrated in FIG. 34 are identical to the operations from Step S310 to Step S314 illustrated in FIG. 9.

As described above, according to the sixth embodiment, since a special application startup instruction is issued for starting a web application, the operations at the time of page transition become simpler thereby leading to a reduction in the processing load. Hence, the sixth embodiment can also be implemented in an environment with limited resources.

Meanwhile, in the sixth embodiment, in an identical manner to the first embodiment, it is explained that the application configuration information is specified in a page file. However, alternatively, in an identical manner to the second embodiment, the application configuration information can also be provided as a separate configuration file that is independent of usual page files.

Seventh Embodiment

Explained below is a seventh embodiment. In the first to sixth embodiments, it is assumed that a plurality of page files and media files included in a web application are stored independently in the server device 20 without being packaged. In the configuration in which the page files and the media files are independent of each other; on the one hand, there is a high degree of freedom in the case of updating the web application or dynamically generating page files. However, on the other hand, it requires efforts to distribute the web application data in a collective manner and to install and use the web application in a terminal. For that reason, it is also possible that some or all of a plurality of page files and media files included in a web application are packaged in a single archive file, before storing the archive file in the server device 20. The seventh embodiment is explained as a response to a case when some or all of a plurality of page files and media files included in a web application are packaged in a single archive file, before storing the archive file in the server device 20.

Figure 35:
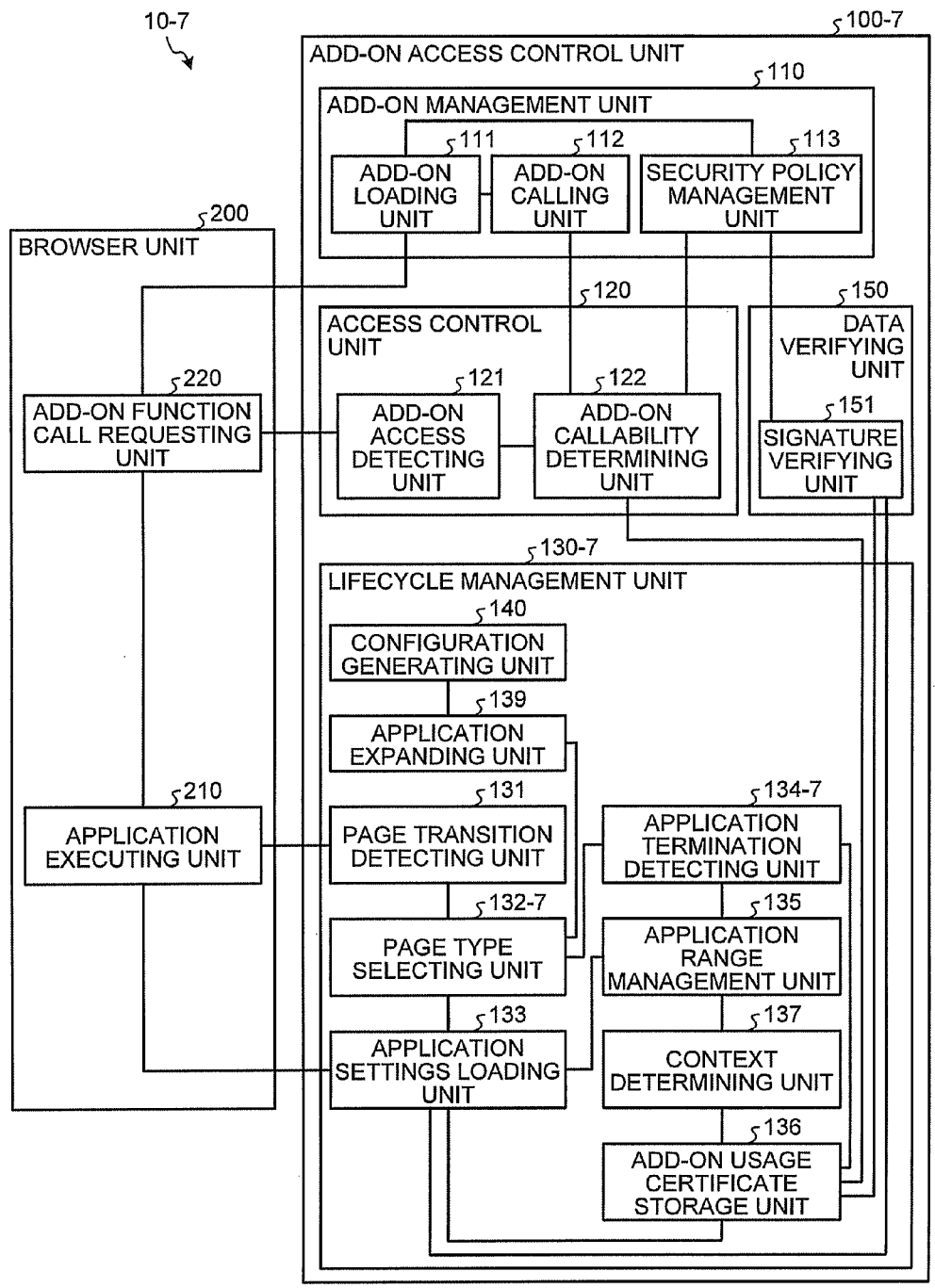
FIG. 35 is a functional block diagram illustrating a functional configuration implemented inside an information processing apparatus according to a seventh embodiment.

FIG. 35 is a functional block diagram illustrating a functional configuration implemented inside an information processing apparatus 10-7 according to the seventh embodiment. As compared to the configuration illustrated in FIG. 28 according to the fifth embodiment, the configuration illustrated in FIG. 35 differs in the fact that a lifecycle management unit 130-7 of an add-on access control unit 100-7 additionally includes an application expanding unit 139 and a configuration generating unit 140. In the following explanation, the constituent elements identical to the first to sixth embodiments are referred to by the same reference numerals and the explanation thereof is not repeated. Thus, the following explanation is given only regarding the characteristics of the seventh embodiment.

The application expanding unit 139 receives the data of an archive file in which a plurality of files are packaged, expands the archive file in those files, and stores those files in the storage unit 13 or the main memory 12. Moreover, the application expanding unit 139 reads the application configuration information specified in a page file (or an independent configuration file, if the application configuration information is provided as that independent configuration file) present in the expanded archive file, calls the configuration generating unit 140 and sends the contents of the application configuration information, and issues a request to the configuration generating unit 140 for dynamically generating the application configuration information. As the format of the archive file, it is possible to use a commonly known format such as the zip format.

The configuration generating unit 140 reads the application configuration information specified in a page file having a specific file name (such as "index.html") from among the files expanded by the application expanding unit 139. Moreover, if the application configuration information is provided as an independent configuration file, the configuration generating unit 140 reads the contents of the configuration file having a specific file name (such as "configuration.dat") from among the files expanded by the application expanding unit 139. Furthermore, the configuration generating unit 140 dynamically generates the URL list by listing the page files included in the archive file, and couples the URL list to the application configuration information.

When a web application is made of only those page files which are included in an archive file, the URL list need not be included in the application configuration information. That is because of the clear fact that the page files packaged in a single archive file belong to the same web application. On the other hand, when the page files not included in an archive file also constitute a web application for which the same security policy is implemented, then the application configuration information contains the URL list and the usage certificate list of the page files not included in the archive file. Hence, the configuration generating unit 140 dynamically generates the URL list by listing the page files included in the archive file, and couples the URL list to the application configuration information, so as to generate a URL list representing the range of a single web application including such page files which are not included in the archive file.

In the seventh embodiment, a page type selecting unit 132-7 not only has the function identical to the page type selecting unit 132 according to the first embodiment but also has a function of determining whether or not the transition-destination page file is an archive file by referring to the MIME type of the transition-destination page file or to the extension of the transition-destination page file. Moreover, when the transition-destination file is an archive file, the page type selecting unit 132-7 sends the data of that file to the application expanding unit 139 and issues a request for expansion of the archive file in which files are packaged. Furthermore, the page type selecting unit 132-7 receives, from the application expanding unit 139, the application configuration information in which the URL list generated by the configuration generating unit 140 is coupled, and issues a store request to the application settings loading unit 133 for storing the application configuration information.

In the seventh embodiment, an application termination detecting unit 134-7 not only has the function of the application termination detecting unit 134 according to the first embodiment but also a function of deleting the data, which is expanded by the application expanding unit 139, at the time of ending the web application.

Figure 36:
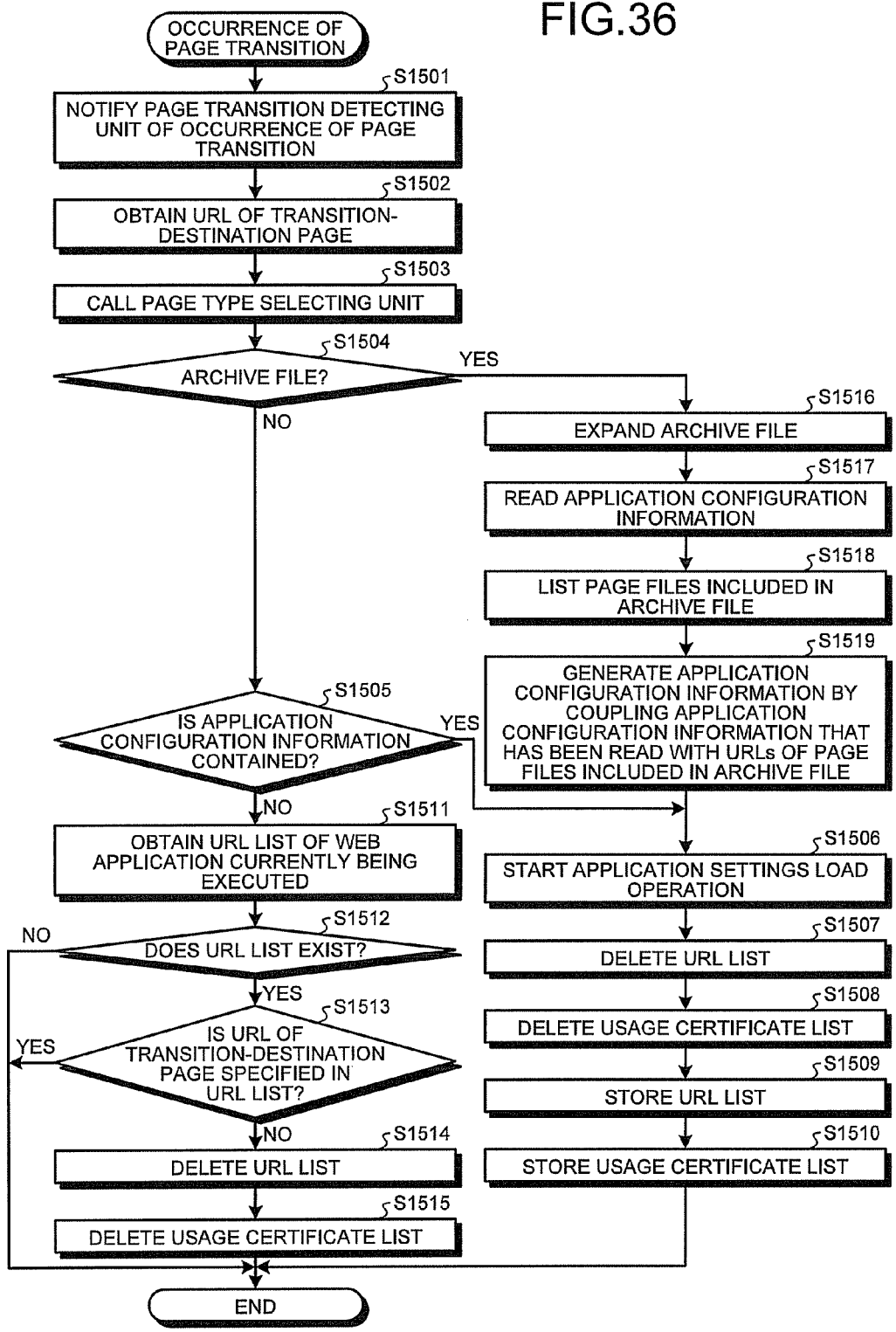
FIG. 36 is a flowchart for explaining a sequence of operations performed at the time of page transition according to the seventh embodiment.

FIG. 36 is a flowchart for explaining a sequence of operations performed at the time of page transition according to the seventh embodiment. As compared to the sequence of operations illustrated in FIG. 9 according to the first embodiment, the sequence of operations illustrated in FIG. 36 differs in the fact that, after the calling of the page type selecting unit 132-7 (Step S1503), an operation of determining whether or not the transition-destination page file is an archive file (Step S1504) is additionally performed and, when the transition-destination page file is an archive file, operations of expanding the archive file and then executing the web application are additionally performed (Step S1516 to Step S1519). The operations from Step S1501 to Step S1503 illustrated in FIG. 36 are identical to the operations from Step S301 to Step S303 illustrated in FIG. 9.

In the seventh embodiment, upon receiving the URL of the transition-destination page from the page transition detecting unit 131, the page type selecting unit 132-7 firstly determines whether or not the transition-destination page file is an archive file by referring to the MIME type of the transition-destination page file or to the extension of the transition-destination page file (Step S1504). If the transition-destination page file is not an archive file (No at Step S1504), then it is determined whether or not the transition-destination page file contains application configuration information (Step S1505). The subsequent operations from Step S1506 to Step S1515 are performed in an identical manner to the operations from Step S305 to Step S314 illustrated in FIG. 9 according to the first embodiment.

On the other hand, if the transition-destination page file is an archive file (Yes at Step S1504); then, in order to start executing the web application stored in the archive file, the page type selecting unit 132-7 sends the data of the archive file to the application expanding unit 139 and issues a request for expanding the archive file. Accordingly, the application expanding unit 139 expands the archive file, which is received from the page type selecting unit 132-7, in a plurality of files and stores those files in the storage unit 13 or the main memory 12 (Step S1516).

Then, from among the files obtained by expansion, the application expanding unit 139 searches for the page file that is initially run in the web application (or searches for an independent configuration file, if the application configuration information is provided as that independent configuration file), reads the application configuration information specified in that page file, and sends the application configuration information as reply to the page type selecting unit 132-7 (Step S1517). Herein, the application configuration information that is read from the page file contains the URL list or the usage certificate list of the page files which constitute the web application but which are not included in the archive file. However, the application configuration information does not include the URLs of the page files that were packaged in the archive file. Hence, application configuration information also containing the page files packaged in the archive file needs to be generated.

There, the page transition selecting unit 132-7 sends the application configuration information read at Step S1517 to the configuration generating unit 140 and issues a request for generating application configuration information. Accordingly, the configuration generating unit 140 firstly lists the page files included in the archive file and obtains the URL of each page file included in the archive file (Step S1518). Then, the configuration generating unit 140 generates application configuration information corresponding to the web application by coupling the application configuration information received from the page type selecting unit 132-7 with the URLs of the page files obtained at Step S1518, and sends the generated application configuration information as reply to the page type selecting unit 132-7 (Step S1519).

Subsequently, the page type selecting unit 132-7 sends the application configuration information, which is generated by the configuration generating unit 140, to the application settings loading unit 133; and issues a request for performing the application settings loading operation. Then, the application settings loading unit 133 performs the operations from Step S1506 to Step S1510 in an identical manner to the operations from Step S305 to Step S309 illustrated in FIG. 9 according to the first embodiment.

As described above, according to the seventh embodiment, if the transition-destination pages are packaged in an archive file; then the application expanding unit 139 expands the archive file, and the configuration generating unit 140 couples the URLs of the page files included in the expanded archive file with application configuration information. As a result, the application configuration information corresponding to the web application is generated. Thus, even when some or all of a plurality of page files and media files included in a web application are packaged in a single archive file, the operation of starting the web application can be performed automatically. Besides, of a plurality of page files and media files included in a web application, only some files may be packaged in an archive file, while the files that change dynamically may not be archived. With that, irrespective of the form in which the page files included in a web application are provided, the access control of add-ons can be performed using the same security policy in the web application. That enables achieving a wider scope for the development of the web application.

Meanwhile, in the seventh embodiment, in an identical manner to the first embodiment, it is explained that the application configuration information is specified in a page file. However, alternatively, in an identical manner to the second embodiment, the application configuration information can also be provided as a separate configuration file that is independent of usual page files.

Eighth Embodiment

Explained below is an eighth embodiment. In the first to seventh embodiments, the usage certificates of add-ons accompany the application configuration information of each web application. In contrast, in the eighth embodiment, the application configuration information is not accompanied by the usage certificates of add-ons, and the access control is performed using only the security policies of add-ons. That spares a web application creator from the efforts of attaching the usage certificates while developing the web application.

Figure 37:
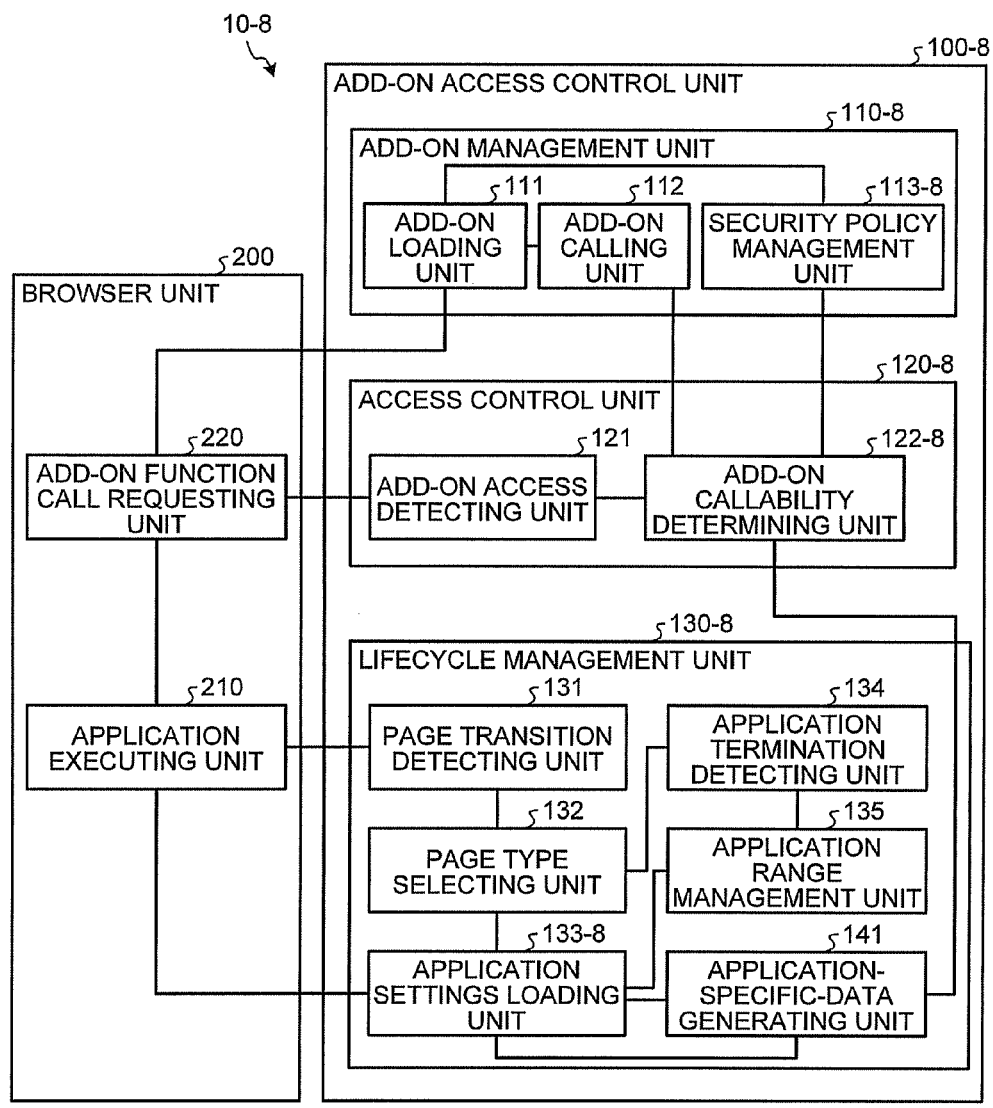
FIG. 37 is a functional block diagram illustrating a functional configuration implemented inside an information processing apparatus according to an eighth embodiment.

FIG. 37 is a functional block diagram illustrating a functional configuration implemented inside an information processing apparatus 10-8 according to the eighth embodiment. As compared to the configuration illustrated in FIG. 15 according to the third embodiment, the configuration illustrated in FIG. 37 differs in the fact that a lifecycle management unit 130-8 of an add-on access control unit 100-8 includes an application-specific data generating unit 141 in place of the add-on usage certificate storage unit 136. In the following explanation, the constituent elements identical to the first to seventh embodiments are referred to by the same reference numerals and the explanation thereof is not repeated. Thus, the following explanation is given only regarding the characteristics of the second embodiment.

In response to a request from an add-on callability determining unit 122-8 of an access control unit 120-8, the application-specific data generating unit 141 generates application-specific data, such as the URL of the page file that contains the application configuration information, which cannot be faked by an application creator.

In the eighth embodiment, a security policy management unit 113-8 of an add-on management unit 110-8 manages the security policy as illustrated in FIG. 38. Herein, FIG. 38 is a diagram illustrating an exemplary data structure of a security policy loaded by the security policy management unit 113-8 according to the eighth embodiment. As compared to the data structure of the security policy illustrated in FIG. 17A, the data stricture of the security policy illustrated in FIG. 38 differs in the fact that application-specific data of target web applications for applying individual security policy elements is included. A single policy element can contain the application-specific data of a plurality of target applications.

In an identical manner to the security policy management unit 113, the security policy management unit 113-8 according to the eighth embodiment has the function of receiving an add-on identifier and loading the security policy of the corresponding add-on in the main memory 12. In addition, the security policy management unit 113-8 according to the eighth embodiment has a function of receiving application-specific data and sending the corresponding security policy element as reply.

FIG. 39 is a flowchart for explaining a sequence of operations performed at the time of calling an add-on according to the eighth embodiment. As compared to the sequence of operations illustrated in FIG. 21 according to the third embodiment; the sequence of operations illustrated in FIG. 39 differs in the fact that, after it is determined that there exists an add-on for which a call request is issued (Yes at Step S1605), additional operations are performed for obtaining application-specific data and obtaining the corresponding security policy element from the security policies managed by the security policy management unit 113-8 (Step S1607 and Step S1608), while the operation of determining whether or not the corresponding usage certificate is present is not performed. The operations from Step S1601 to Step S1606 illustrated in FIG. 39 are identical to the operations from Step S701 to Step S706 illustrated in FIG. 21.

In the eighth embodiment, when it is determined that there exists an add-on for which a call request is issued (Yes at Step S1605); in order to determine whether or not that add-on is allowed to be used in a web application, the add-on callability determining unit 122-8 issues a request to the application-specific data generating unit 141 for obtaining application-specific data. Accordingly, the application-specific data generating unit 141 obtains the application-specific data of the web application, such as the URL of the page file containing the application configuration information, and sends that application-specific data as reply to the add-on callability determining unit 122-8 (Step S1607).

Subsequently, the add-on callability determining unit 122-8 issues a request to the security policy management unit 113-8 for obtaining the security policy element corresponding to the application-specific data obtained by the application-specific data generating unit 141. Accordingly, from among the security policies loaded at the time of startup, the security policy management unit 113-8 obtains the security policy element corresponding to the application-specific data obtained by the application-specific data generating unit 141, and sends that security policy element as reply to the add-on callability determining unit 122-8 (Step S1608).

Then, depending on whether or not a function to be called is included in the security policy element, the add-on callability determining unit 122-8 determines whether or not the add-on for which a call request is issued is callable (Step S1609). The subsequent operations, that is, the operations from Step S1610 to Step S1612 illustrated in FIG. 39 are identical to the operations performed from Step S712 to Step S713 illustrated in FIG. 21.

FIG. 40 is a flowchart for explaining a sequence of operations performed at the time of page transition according to the eighth embodiment. As compared to the sequence of operations illustrated in FIG. 9 according to the first embodiment, the sequence of operations illustrated in FIG. 40 differs in the fact that an operation of generating application-specific data (Step S1708) and an operation of deleting application-specific data (Step S1713) are additionally performed, while the operations of deleting the usage certificate list (Step S307 and Step S314) and the operation of storing the usage certificate list (Step S309) are omitted. The operations from Step S1701 to Step S1707 illustrated in FIG. 40 are identical to the operations from Step S301 to Step S308 (excluding Step S307) illustrated in FIG. 9. Moreover, the operations from Step S1709 to Step S1712 illustrated in FIG. 40 are identical to the operations from Step S310 to Step S313 illustrated in FIG. 9.

In the eighth embodiment, at the time of ending a web application, an application settings loading unit 133-8 calls the application-specific data generating unit 141, and performs an operation of deleting the application-specific data corresponding to the web application that was being executed (Step S1713). Meanwhile, at the time of starting a web application, the application settings loading unit 133-8 calls the application-specific data generating unit 141 and issues a request for generating and storing the corresponding application-specific data (Step S1708).

As described above, according to the eighth embodiment, the application configuration information is not accompanied by the usage certificates of add-ons, and the access control is performed using only the security policy. That spares a web application creator from the efforts of attaching the usage certificates while developing the web application. That enables achieving reduction in the work load of the creator. Moreover, since the security policy data accompanies the add-ons, there is no need to worry about tampering by a web application creator. That is, even in the case of preventing add-ons from being use without authorization from a web application, there is no need to verify the usage certificates of add-ons as described in the fourth embodiment. As a result, unauthorized use of the add-ons can be prevented in an effective manner.

As described above, according to the first to eight embodiments, in each web application, it becomes possible to limit the add-ons that are allowed to be used.

In the information processing apparatuses 10 to 10-8 according to the first to eighth embodiments, respectively; each function of the add-on access control units 100 to 100-8 can be implemented by making the CPU 11 in the information processing apparatuses 10 to 10-8 execute the add-on access control program that is stored in the storage unit 13.

The add-on access control program executed by the CPU 11 in the information processing apparatuses 10 to 10-8 is recorded in the form of an installable or executable file on a computer-readable recording medium such as a compact disk read only memory (CD-ROM), a flexible disk (FD), a compact disk readable (CD-R), or a digital versatile disk (DVD); and is provided as a computer program product.

Alternatively, the add-on access control program executed by the CPU 11 in the information processing apparatuses 10 to 10-8 can be saved as a downloadable file on a computer connected to a network such as the Internet or can be made available for distribution through the network. Still alternatively, the add-on access control program executed by the CPU 11 in the information processing apparatuses 10 to 10-8 can be distributed over a network such as the Internet.

Still alternatively, the add-on access control program executed by the CPU 11 in the information processing apparatuses 10 to 10-8 can be incorporated in advance in the storage unit 13 of the information processing apparatuses 10 to 10-8.

Herein, the add-on access control program executed by the CPU 11 in the information processing apparatuses 10 to 10-8 contains modules for implementing the functions of the constituent elements (the add-on management units 110 to 110-8, the access control units 120 to 120-8, the lifecycle management unit 130 to 130-8, and the like) of the add-on access control units 100 to 100-8. Regarding the actual hardware, for example, the CPU 11 (processor) retrieves the add-on access control program from the storage unit 13 and runs it so that the add-on access control program is loaded in the main memory 12. As a result, the functions of the abovementioned constituent elements are implemented in the main memory 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a browser unit configured to receive, from a server device, page files included in a web application and execute the web application by processing the received page files;
an application range management unit configured to, at the time of starting execution of the web application, receive application range information by reading the application range information from the page file that is initially run in the web application being executed, or by reading the application range information from a configuration file that is different than the page files included in the web application being executed, and store the application range information in a memory, wherein the application range information specifies the page files included in the web application being executed;
a termination detecting unit configured to, when there is a change of the page file being processed by the browser unit, determine whether or not the web application being executed has ended depending on whether or not the page file after the change is included in the application range information stored in the memory;
a usability determining unit configured to, when a call request is issued for an add-on that represents a function not processed by the browser unit, determine whether or not the add-on for which the call request is issued is allowed to be used in the web application being executed; and
an add-on calling unit configured to, when it is determined that the add-on for which the call request is issued is allowed to be used in the web application being executed, call the add-on.

2. The apparatus according to claim 1, further comprising a usage certificate storing unit configured to, at the time of starting execution of the web application, receive a usage certificate that is information representing the add-on that is allowed to be used in the web application and store the usage certificate in the memory unit, wherein
depending on whether or not the usage certificate corresponding to the add-on for which the call request is issued is stored in the memory unit, the usability determining unit determines whether or not the add-on for which the call request is issued is allowed to be used in the web application being executed.

3. The apparatus according to claim 2, wherein
the application range information and the usage certificate are stored in the page file that is initially run in the web application,
at the time of starting execution of the web application, the application range management unit reads the range information from the page file that is initially run in the web application being executed, and then stores the application range information in the memory unit, and
at the time of starting execution of the web application, the usage certificate storing unit reads the usage certificate from the page file that is initially run in the web application being executed, and then stores the usage certificate in the memory unit.

4. The apparatus according to claim 2, wherein
the application range information and the usage certificate are stored in the configuration file,
at the time of starting execution of the web application, the application range management unit reads the application range information from the configuration file of the web application being executed, and then stores the application range information in the memory unit, and
at the time of starting execution of the web application, the usage certificate storing unit reads the usage certificate from the configuration file of the web application being executed, and then stores the usage certificate in the memory unit.

5. The apparatus according to claim 2, wherein
the add-on includes a plurality of add-ons, each including a plurality of functions,
the information processing apparatus further comprising a security policy storing unit configured to receive security policy information, which contains description of a plurality of security policy elements each corresponding to one of the add-ons and each being a combination of functions that are allowed to be used from among the plurality of functions, and store the security policy information in the memory unit,
the usage certificate includes the security policy element that is applied to the web application being executed,
when the usage certificate corresponding to the add-on for which the call request is issued is stored, the usability determining unit determines that, of the add-on for which the call request is issued, the function indicated in the security policy element included in the usage certificate is allowed to be used.

6. The apparatus according to claim 2, further comprising a certificate verifying unit configured to verify validness of the usage certificate by referring to data that is specific to the web application being executed.

7. The apparatus according to claim 1, wherein
the add-on includes a plurality of add-ons, each including a plurality of functions,
the information processing apparatus further comprising a security policy storing unit configured to receive security policy information, which contains description of a plurality of security policy elements each corresponding to one of the add-ons and each being a combination of functions that are allowed to be used from among the plurality of functions and which contains description of a web application to which the security policy elements are applied, and store the security policy information in the memory unit, and when a plurality of security policy elements corresponding to the add-on for which the call request is issued include a security policy element that is applied to the web application being executed, the usability determining unit determines that the function indicated in the security policy element applied to the web application being executed is allowed to be used.

8. The apparatus according to claim 1, further comprising an identifying unit configured to, when the browser unit is performing parallel execution of a plurality of web applications, identify the web application in which the add-on has been called, wherein
the usability determining unit determines whether or not the add-on for which the call request is issued is allowed to be used in the web application identified by the identifying unit.

9. The apparatus according to claim 3, further comprising a start determining unit configured to, when there is a change of the page file being processed by the browser unit and when the page file after the change contains the application range information and the usage certificate, determine that execution of a new web application has started, wherein
when the start determining unit determines that execution of a new web application has started, the application range management unit receives the application range information corresponding to the new web application and stores that application range information in the memory unit.

10. The apparatus according to claim 1, further comprising a start determining unit configured to, when a predetermined instruction that is decided in advance is detected, determine that execution of a new web application has started, wherein
when the start determining unit determines that execution of a new web application has started, the application range management unit receives the application range information corresponding to the new web application and stores that application range information in the memory unit.

11. The apparatus according to claim 1, further comprising:
a file expanding unit configured to, when the browser unit receives an archive file containing a plurality of page files, expand the archive file in the plurality of page files; and
a generating unit configured to generate the application range information containing the plurality of page files obtained by expansion by the file expanding unit as well as containing files not included in the archive file, wherein
the application range management unit receives the application range information generated by the generating unit and stores the application range information in the memory unit.

12. An information processing method implemented in an information processing apparatus including a browser unit configured to receive, from a server device, page files included in a web application and execute the web application by processing the received page files; and a memory unit, the information processing method comprising:
receiving, at the time of starting execution of the web application, application range information by reading the application range information from the page file that is initially run in the web application being executed, or by reading the application range information from a configuration file that is different than the page files included in the web application being executed;

storing the application range information in the memory unit, wherein the application range information specifies the page files included in the web application being executed;

determining, when there is a change of the page file being processed by the browser unit, whether or not the web application being executed has ended depending on whether or not the page file after the change is included in the application range information stored in the memory;

determining, when a call request is issued for an add-on that represents a function not processed by the browser unit, whether or not the add-on for which the call request is issued is allowed to be used in the web application being executed; and calling, when it is determined that the add-on for which the call request is issued is allowed to be used in the web application being executed, the add-on.

13. A computer program product comprising a non-transitory computer-readable medium including programmed instructions for an information processing method for an information processing apparatus including a browser unit configured to receive, from a server device, page files included in a web application and execute the web application by processing the received page files; and a memory unit, wherein the instructions, when executed by a computer, cause the computer to perform:

receiving, at the time of starting execution of the web application, application range information by reading the application range information from the page file that is initially run in the web application being executed, or by reading the application range information from a configuration file that is different than the page files included in the web application being executed;

storing the application range information in the memory unit, wherein the application range information specifies the page files included in the web application being executed;

determining, when there is a change of the page file being processed by the browser unit, whether or not the web application being executed has ended depending on whether or not the page file after the change is included in the application range information stored in the memory;

determining, when a call request is issued for an add-on that represents a function not processed by the browser unit, whether or not the add-on for which the call request is issued is allowed to be used in the web application being executed; and calling, when it is determined that the add-on for which the call request is issued is allowed to be used in the web application being executed, the add-on.

* * * * *